US011568623B2

(12) United States Patent
Ikeda et al.

(10) Patent No.: US 11,568,623 B2
(45) Date of Patent: Jan. 31, 2023

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Motoki Ikeda, Tokyo (JP); Yusuke Muramatsu, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 370 days.

(21) Appl. No.: 16/986,325

(22) Filed: Aug. 6, 2020

(65) Prior Publication Data

US 2021/0056336 A1 Feb. 25, 2021

(30) Foreign Application Priority Data

Aug. 22, 2019 (JP) .............................. JP2019-152169
Oct. 4, 2019 (JP) .............................. JP2019-183923
Feb. 20, 2020 (JP) .............................. JP2020-027618

(51) Int. Cl.

| G06V 10/22 | (2022.01) |
| G06K 9/62 | (2022.01) |
| G06N 3/04 | (2006.01) |
| G06N 3/08 | (2006.01) |
| G06V 10/44 | (2022.01) |
| G06V 30/412 | (2022.01) |
| G06V 30/10 | (2022.01) |

(52) U.S. Cl.
CPC ........... *G06V 10/23* (2022.01); *G06K 9/6253* (2013.01); *G06K 9/6256* (2013.01); *G06N 3/0454* (2013.01); *G06N 3/08* (2013.01); *G06V 10/44* (2022.01); *G06V 30/412* (2022.01); *G06V 30/10* (2022.01)

(58) Field of Classification Search
CPC ...... G06V 10/23; G06V 30/412; G06V 10/44; G06K 9/6253; G06K 9/6256; G06N 3/0454; G06N 3/08
See application file for complete search history.

(56) References Cited

U.S. PATENT DOCUMENTS 5,631,984 A * 5/1997 Graf ..................... H04N 1/4115
382/317
2014/0245123 A1* 8/2014 Pircher ................. G06F 40/169
715/232

(Continued)

FOREIGN PATENT DOCUMENTS

| JP | 2010218106 A | 9/2010 |
| JP | 2017138703 A | 8/2017 |
| JP | 2018055255 A | 4/2018 |

*Primary Examiner* — David Bilodeau
(74) *Attorney, Agent, or Firm* — Rossi, Kimms & McDowell LLP

(57) ABSTRACT

An image processing apparatus obtains a read image of a document including a handwritten character, generates a first image formed by pixels of the handwritten character by extracting the pixels of the handwritten character from pixels of the read image using a first learning model for extracting the pixels of the handwritten character, estimates a handwriting area including the handwritten character using a second learning model for estimating the handwriting area, and performs handwriting OCR processing based on the generated first image and the estimated handwriting area.

20 Claims, 48 Drawing Sheets

(56) References Cited

U.S. PATENT DOCUMENTS

2018/0089835 A1    3/2018  Honda
2019/0303662 A1*  10/2019  Madhani .............. G06V 10/751
2019/0392207 A1*  12/2019  Young ................. G06V 30/162

* cited by examiner

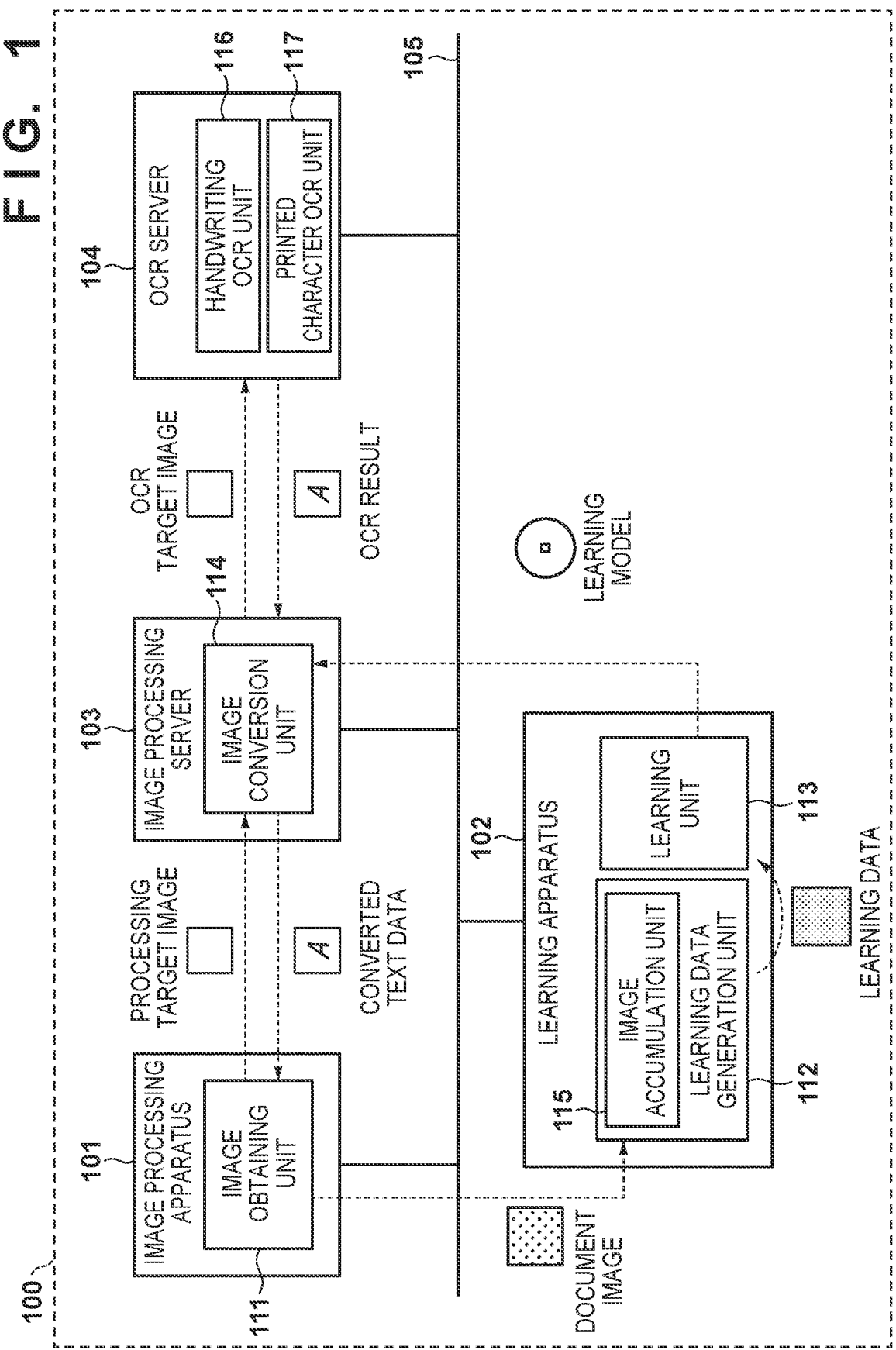

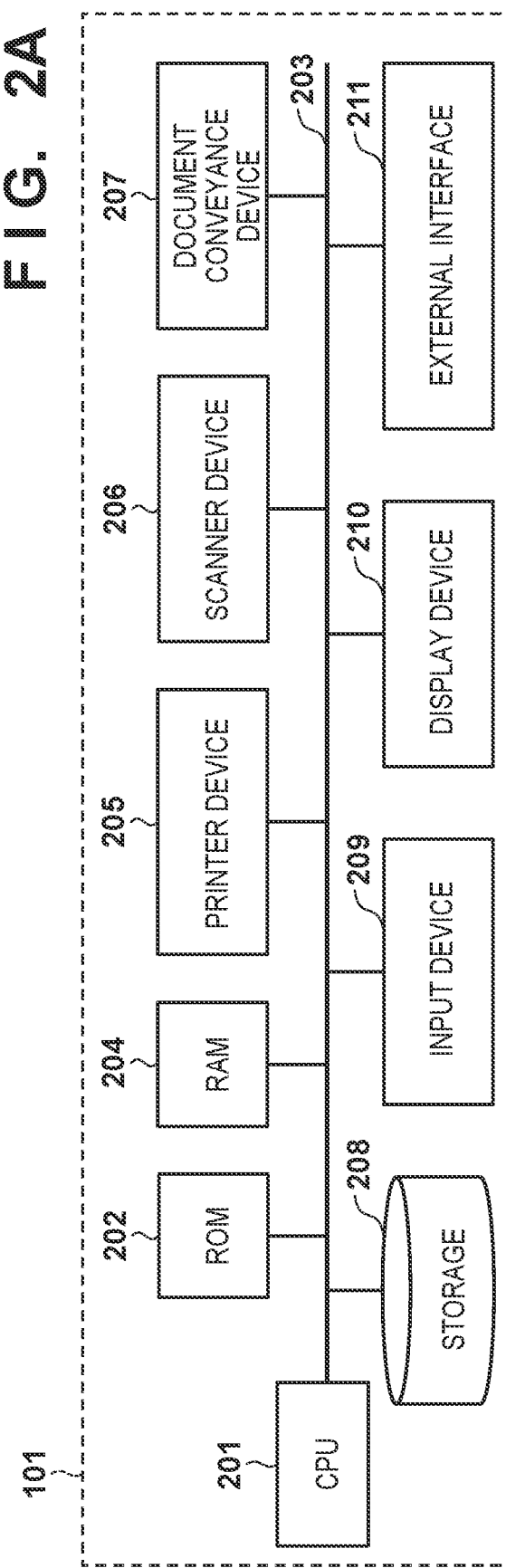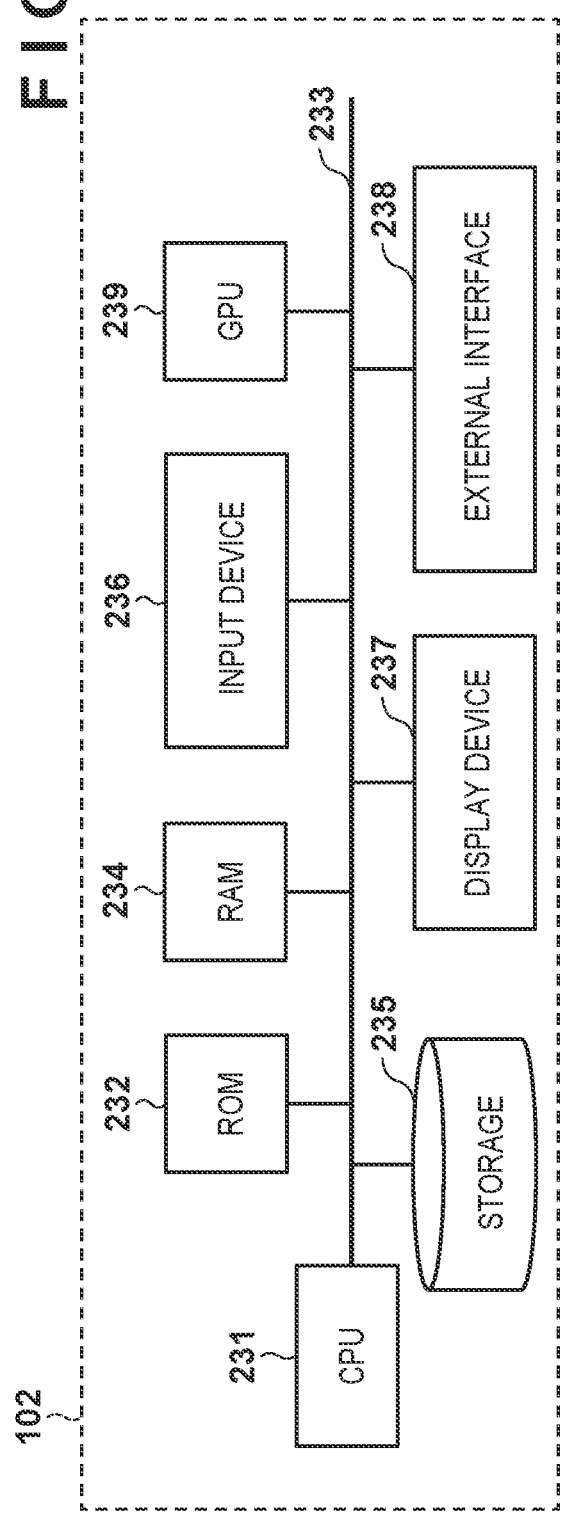

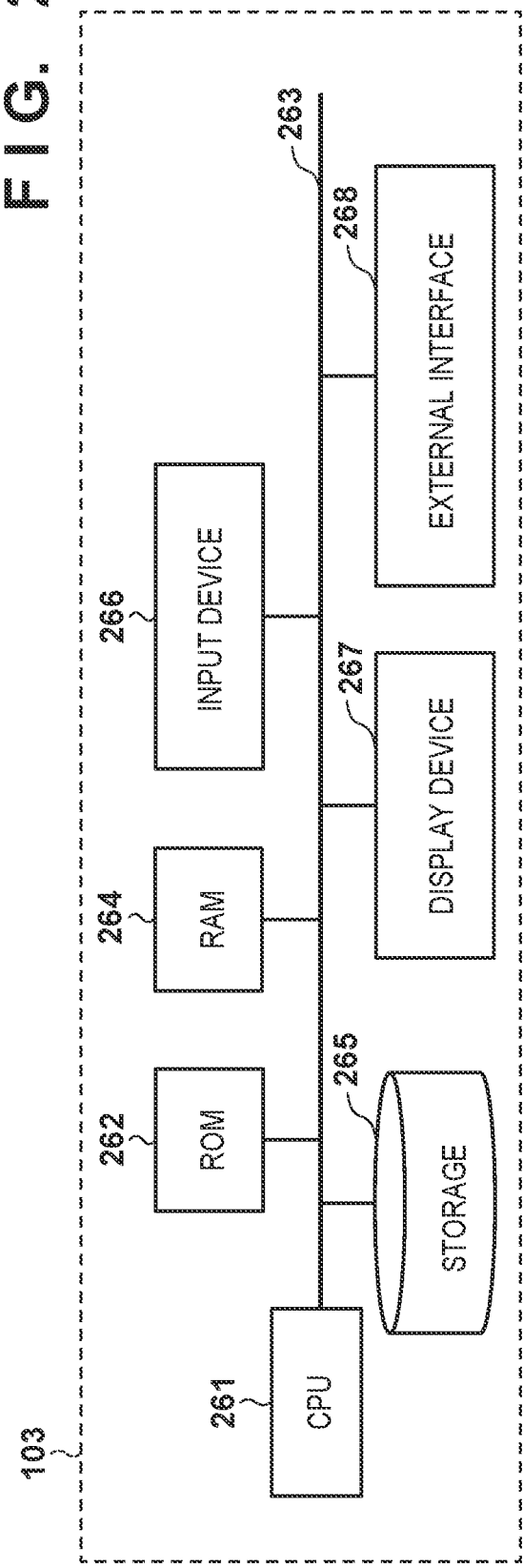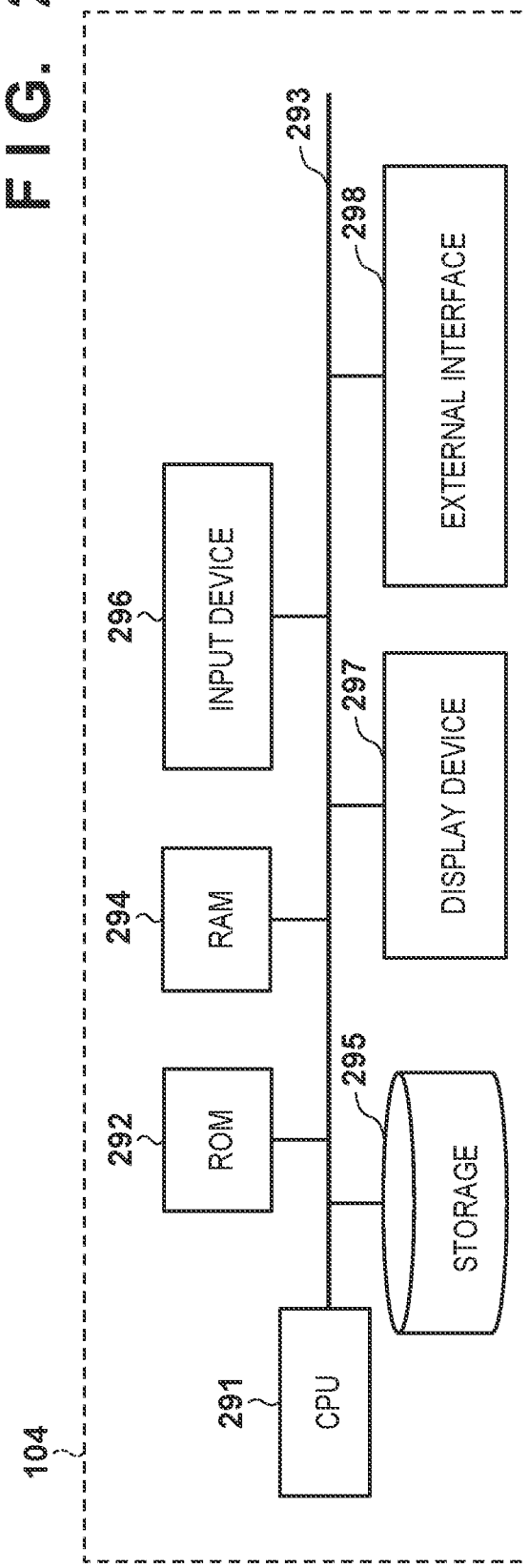

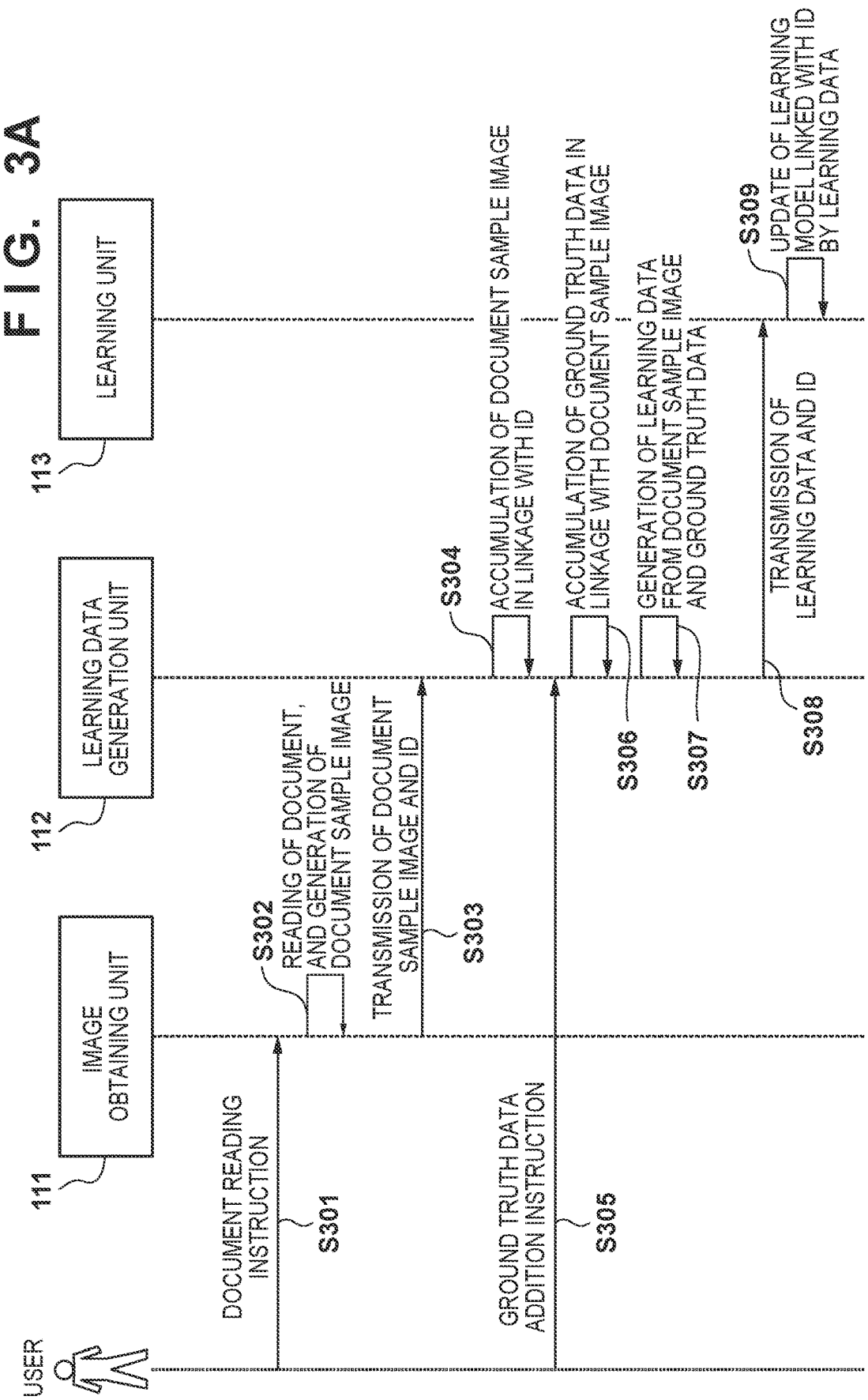

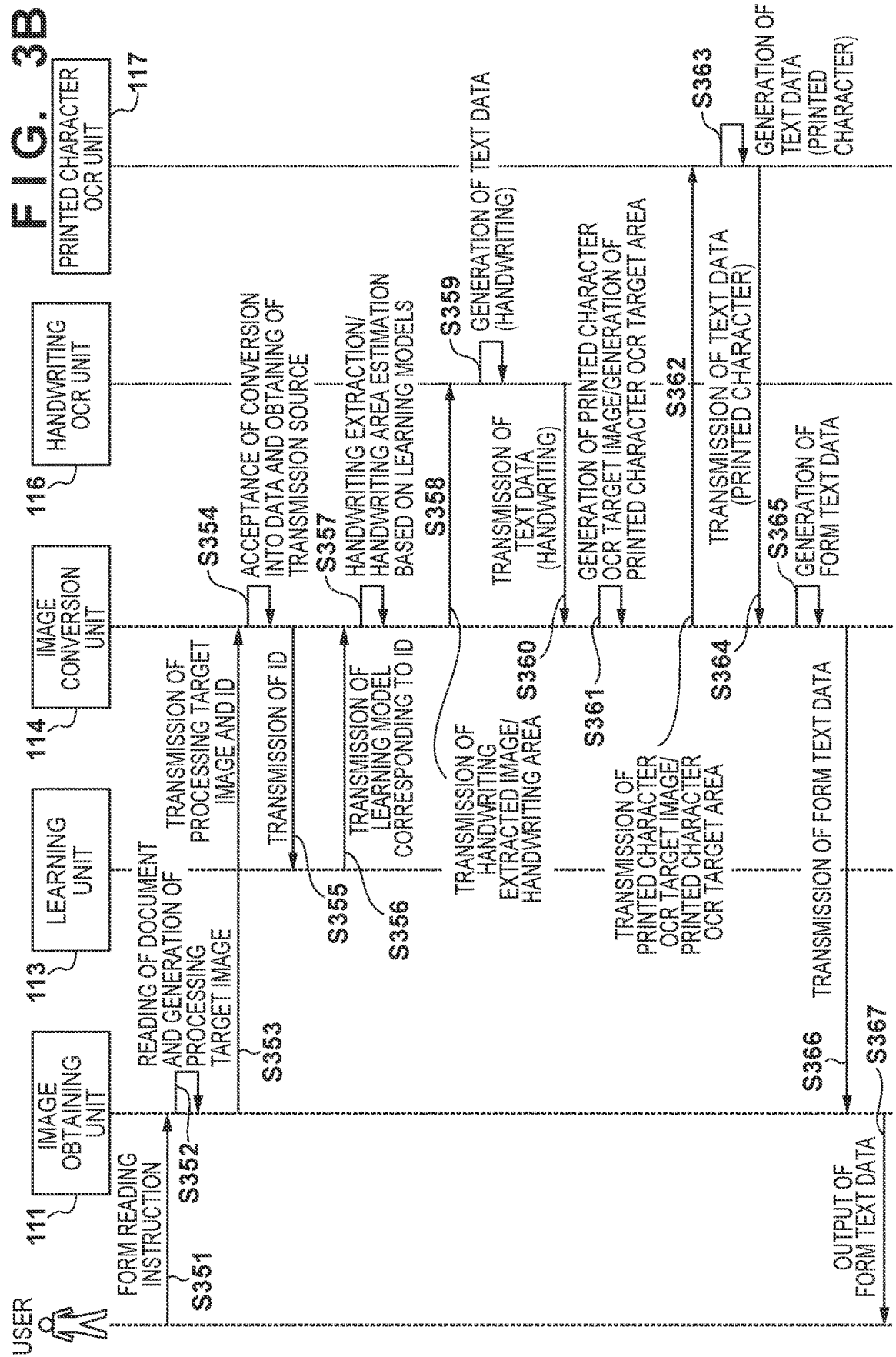

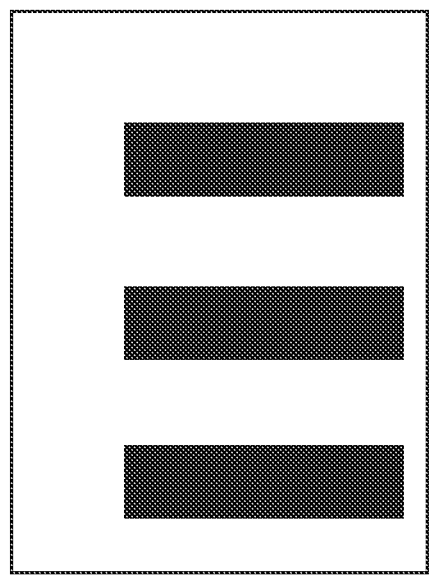

| (KANA) NAME | ヤマダ タロウ 山田 太郎 | CONTACT INFORMATION | 〒 302-8501<br>取手市井山7-5-1<br>☎ 03-3758-2111 |

SCAN AND TRANSMISSION TO LEARNING SERVER

- 500 (window)
- 501 (form area)
  - NAME: 池田 元気
  - ADDRESS: 大田区下丸子10丁目2-5-301 / Please enter address
  - TELEPHONE NUMBER: 03-1234-XXXX
- 502 SCAN
- 503 TRANSMISSION START

FIG. 5B

GROUND TRUTH DATA CREATION

- 520 (window)
- 521 (form area)
  - NAME: 池田 元気
  - ADDRESS: 大田区下丸子10丁目2-5-301 / Please enter address
  - TELEPHONE NUMBER: 03-1234-XXXX
- 522 IMAGE SELECTION
- 523 ENLARGEMENT
- 524 REDUCTION
- 525 EXTRACTION
- 526 ESTIMATION
- 527 SAVE

FIG. 5C

GROUND TRUTH DATA CREATION

| NAME | 池田 元気 |
| ADDRESS | 大田区下丸子10丁目2-5-301<br>Please enter address |
| TELEPHONE NUMBER | 03-1234-XXXX |

- 522: IMAGE SELECTION
- 523: ENLARGE-MENT
- 524: REDUC-TION
- 525: EXTRAC-TION
- 526: ESTIMA-TION
- 527: SAVE

FIG. 5D

SCAN AND PROCESSING OF FORM

| LAST NAME | FIRST NAME |
| 小木 | 才一郎 |

| ADDRESS |
| 東京都 大田区 下丸子1<br>*Please enter address |

| TELEPHONE NUMBER |
| ☎ 03-1234-XXXX |

- 542: SCAN
- 543: TRANSMISSION START

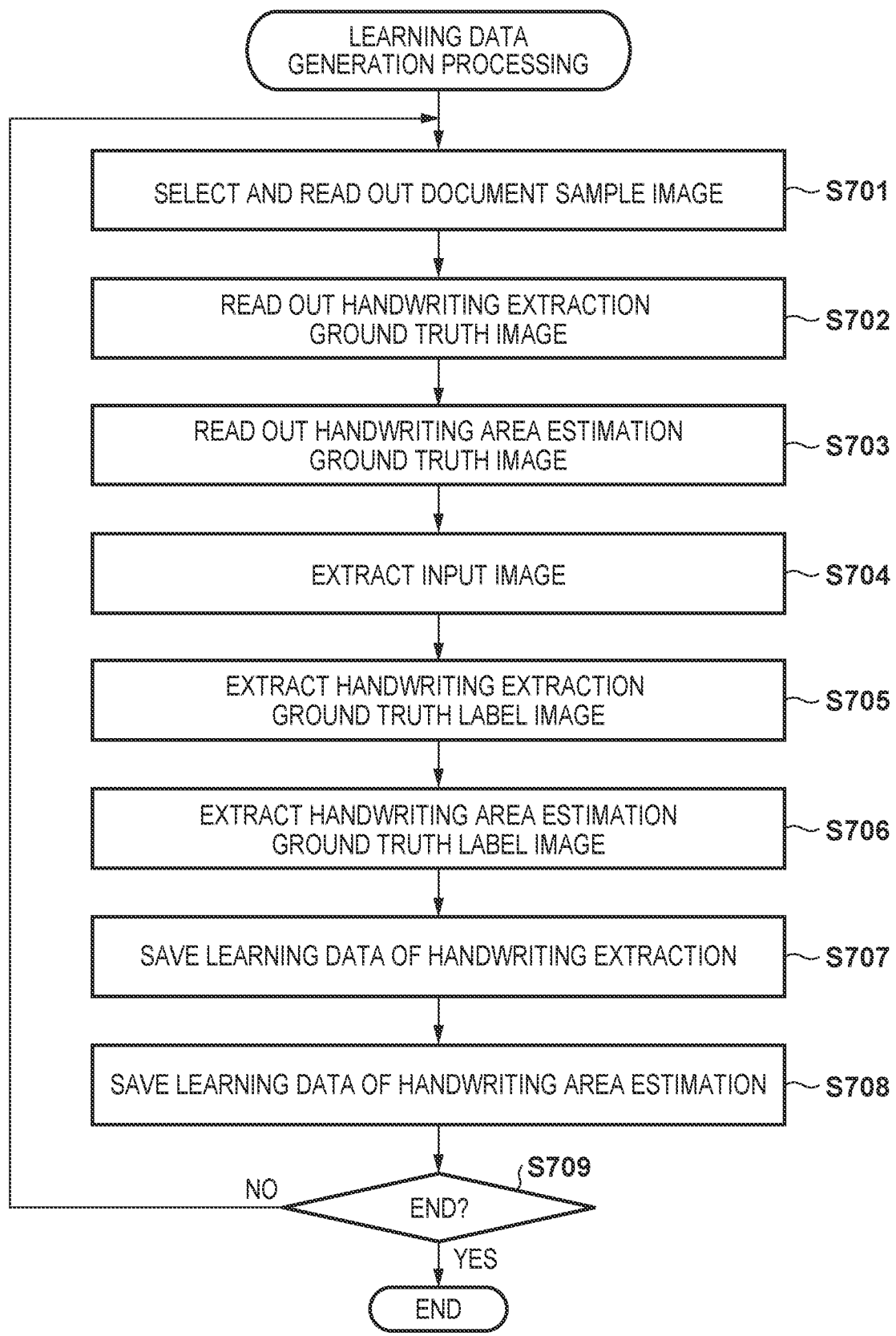

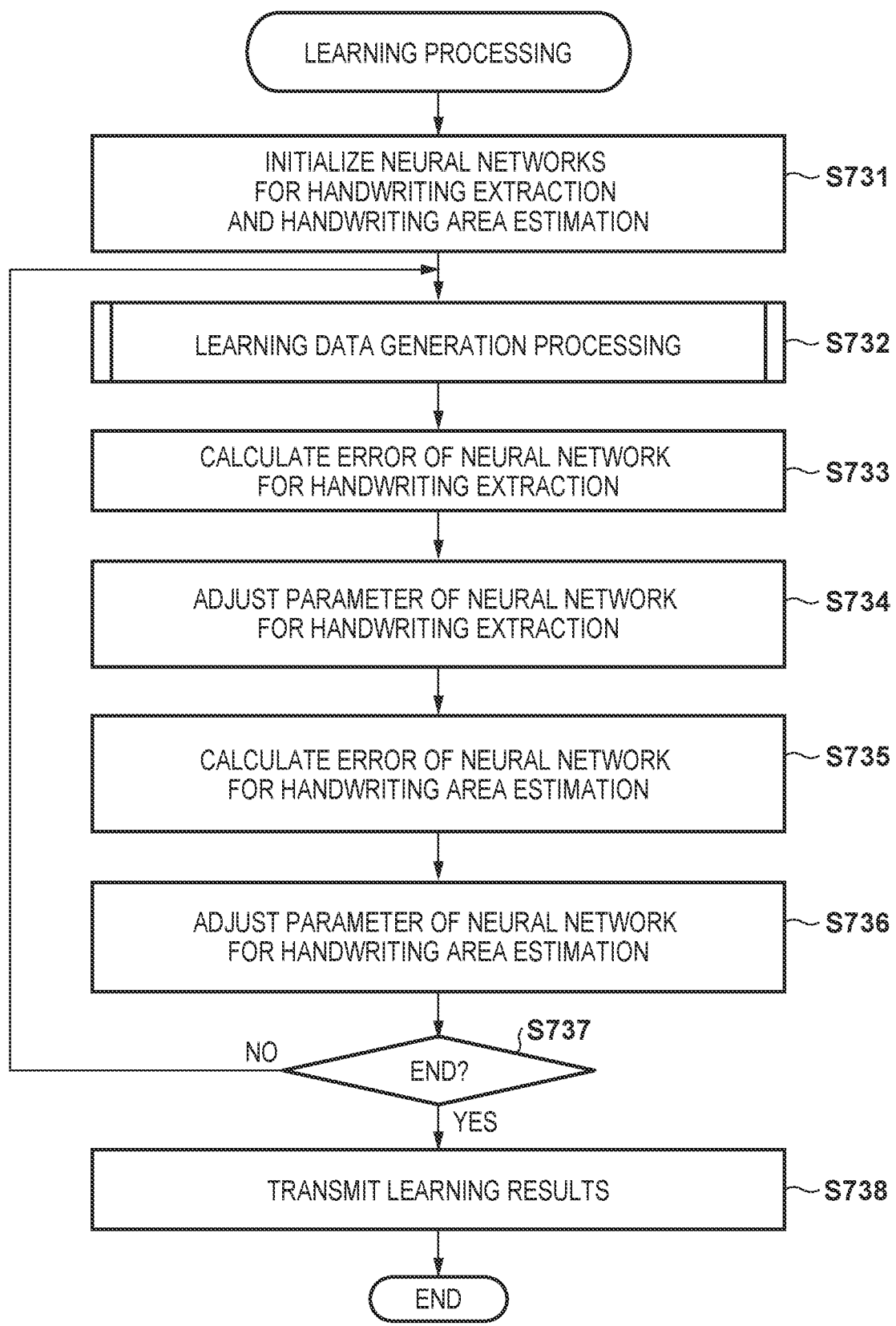

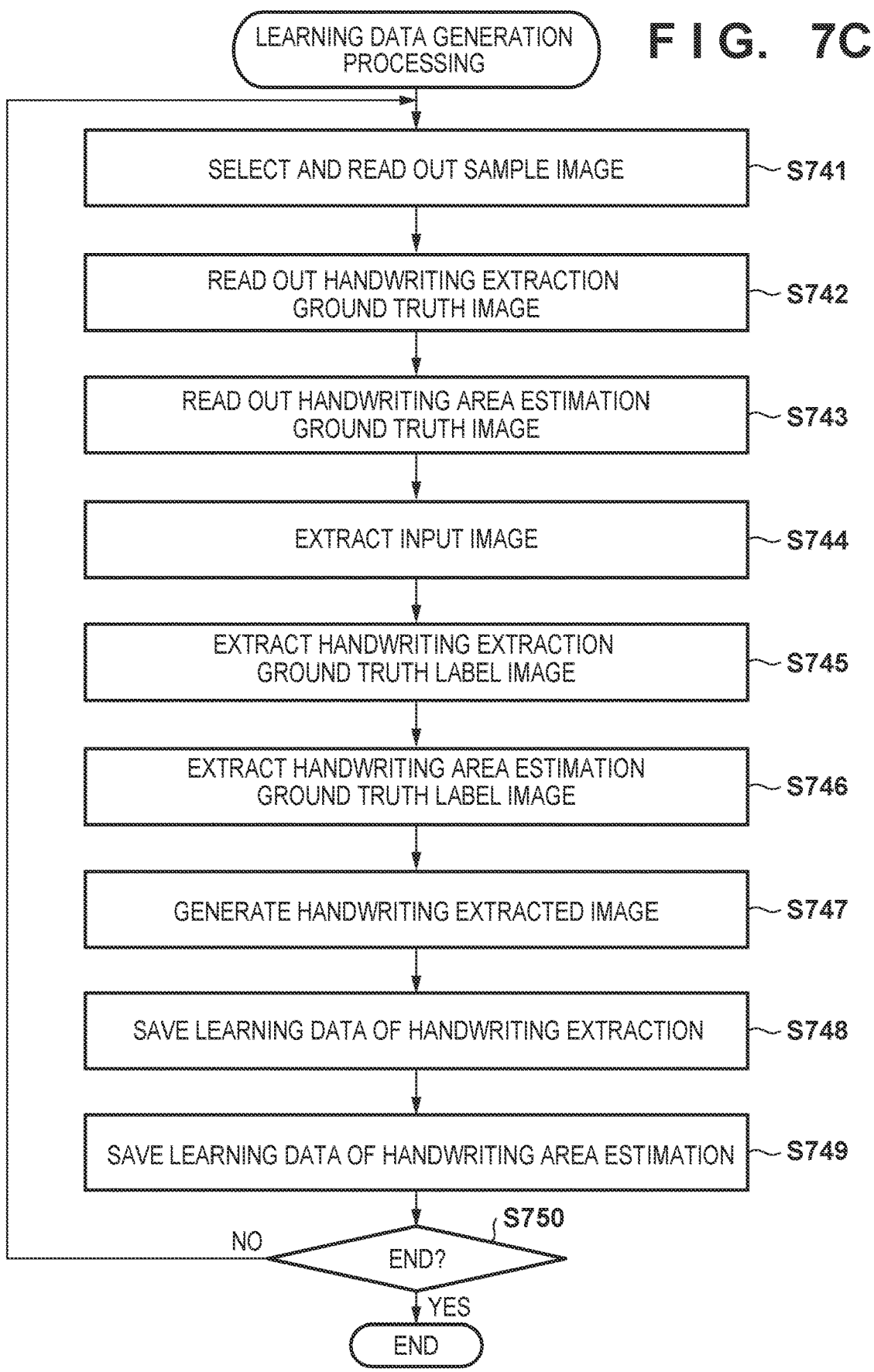

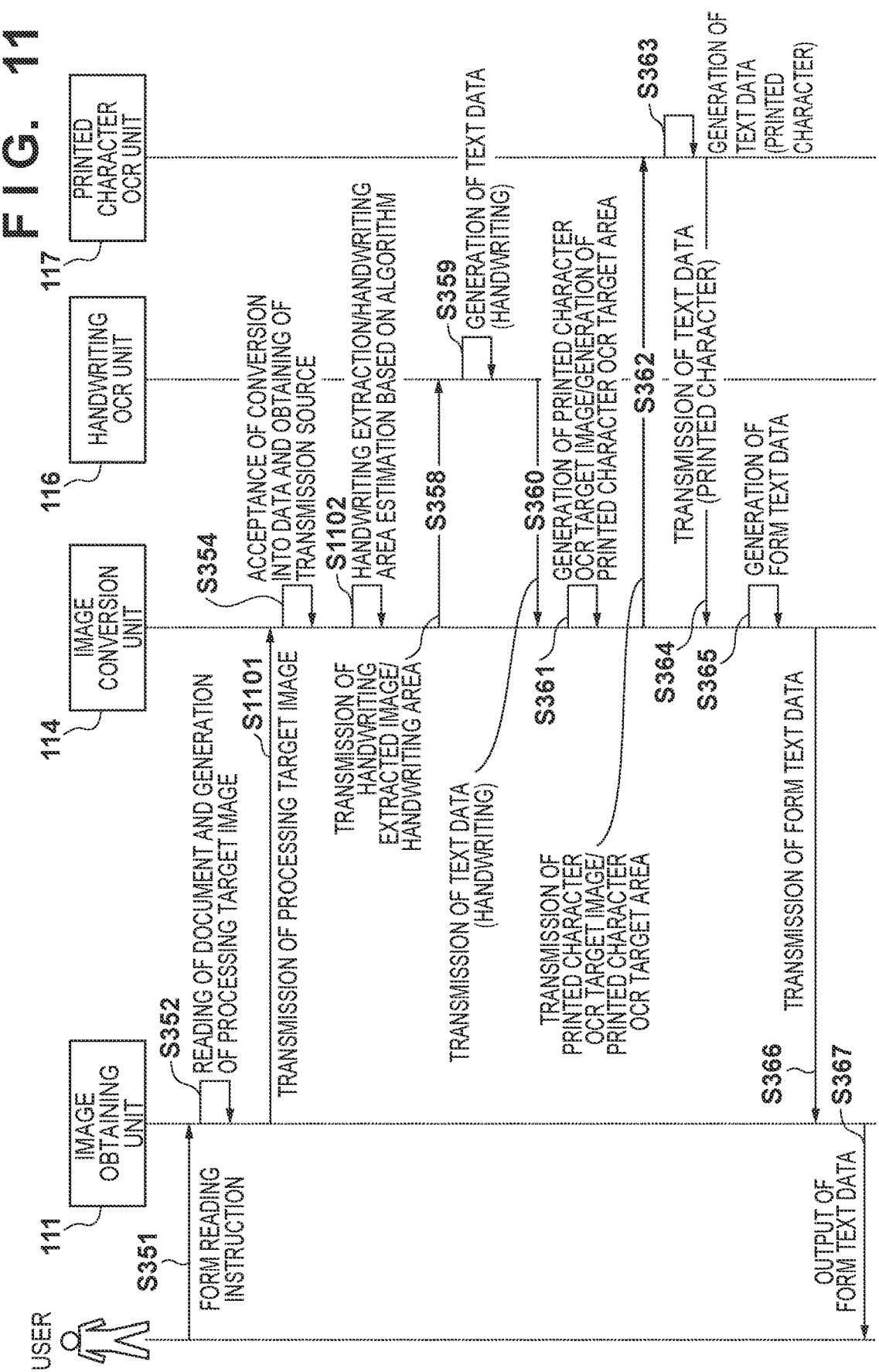

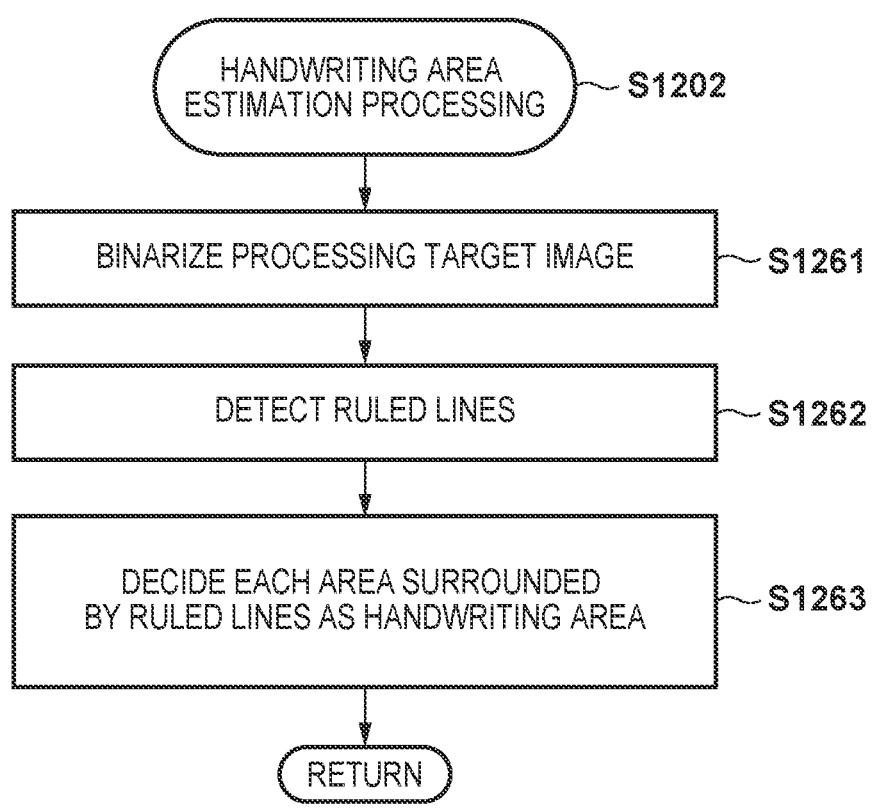

FIG. 14

| KANA | ヤマ　ダ | | タ　ロウ |
|---|---|---|---|
| LAST NAME | 山田 | FIRST NAME | 太郎 |

| TELEPHONE NUMBER | | | |
|---|---|---|---|
| HOME | 03-999-999 | MOBILE | 090-888-8888 |

| STORE NUMBER | MEMBERSHIP NUMBER |
|---|---|
| 0 0 1 | 8 0 5 1 |

SCAN AND TRANSMISSION TO LEARNING SERVER

1600 — (container)
1601 — form area

- NAME: 池田 元気
- ADDRESS: 大田区下丸子10丁目2-5-311 — Please enter address
- TELEPHONE NUMBER: 03-1234-XXXX Buttons:
- 1602 HANDWRITING DOCUMENT
- 1603 FORM DOCUMENT
- 1604 SCAN
- 1605 TRANSMISSION START

FIG. 16B

COMPOSITE AREA DATA CREATION

1650 — (container)
1651 — form area

- ADDRESS: (empty)
- TELEPHONE NUMBER: Please enter phone number

Buttons:
- 1652 IMAGE SELECTION
- 1653 ENLARGE-MENT
- 1654 REDUC-TION
- 1655 INTEGRA-TION
- 1656 SAVE

FIG. 16C

TELEPHONE NUMBER
HOME
MOBILE

STORE NUMBER
MEMBERSHIP NUMBER

ADDRESS
NAME
TELEPHONE NUMBER

ADDRESS
NAME
TELEPHONE NUMBER

```xml
<?xml version="1.0" encoding="utf-8" ?>
<areas>
    <area x="125" y="202" width="233" height="30" />
    <area x="109" y="550" width="244" height="42" />
        ...
    <area x="125" y="700" width="40" height="40" group="0" />
    <area x="165" y="700" width="40" height="40" group="0" />
    <area x="205" y="700" width="40" height="40" group="0" />
        ...
</areas>
```

| LAST NAME オ ギ | FIRST NAME サイイチロウ |
|---|---|
| 小 木 | オ一郎 |

ADDRESS

東京都大田区下丸子X-XX-XX アパートABC 301
*Please enter address

TELEPHONE NUMBER

MOBILE 090-XXXX-XXXX  HOME 03-XXXX-XXXX

| KANA | マ ツ | イ ク ミ |
|---|---|---|
|  |  |  |

FIG. 22H

| LAST NAME | FIRST NAME |
|---|---|
| LONG | RAY |

| TELEPHONE NUMBER |
|---|
| ☎ 03-1234-XXXX |

03-1234-XXXX
Please enter phone number
2200

FIG. 22K

| (KANA) NAME | ヤマ ダ タ ロウ 山田 太郎 | CONTACT INFORMA -TION | 〒 302-8501 取手市白山7-5-1 ☎ 03-3758-2111 |
|---|---|---|---|

- 2405 — APPLICATION FORM
- 2406 — PLEASE REGISTER AS FOLLOWS
- 2407 — ADDRESS
- 2401 — 143-XXXX 東京都 大田区 下丸子1
- 2408 — TELEPHONE NUMBER
- 2402 — 03-1234-XXXX
- 2410 — LAST NAME
- 2411 — FIRST NAME
- 2409 — NAME
- 2403 — 小木
- 2404 — 一郎
- 2400

IMAGE PROCESSING APPARATUS, IMAGE PROCESSING METHOD, AND STORAGE MEDIUM

BACKGROUND

Field

The present disclosure relates to an image processing apparatus, an image processing method, and a storage medium.

Description of the Related Art

In recent years, to cope with a change in working environment along with the spread of computers, documents to be processed in business have been computerised. The targets of computerisation include a form in which handwritten characters are entered. When computerising such handwritten characters, handwriting OCR is used. It is desirable to separate an image of handwritten characters from a scan image obtained by scanning a form in which the handwritten characters are entered, and then input the image to a handwriting OCR engine that executes handwriting OCR. This is because the handwriting OCR engine is configured to recognize handwritten characters, and thus if a character image printed in a specific character font such as a printed character (type) is included, the recognition accuracy decreases.

Japanese Patent Laid-Open No. 2010-218106 describes a technique of determining, based on the luminance characteristic of each pixel in a scan image, whether the pixel forms a handwritten character. If the pixels of handwritten characters are removed (for example, the pixels of handwritten characters are replaced by white pixels) in the scan image, a handwriting removed image is obtained.

Furthermore, if only the pixels of the handwritten characters are extracted and the remaining pixels are removed (for example, the remaining pixels are replaced by white pixels) in the scan image, an image (to be referred to as a "handwriting extracted image" hereinafter) in which only the pixels of the handwritten characters remain can be obtained. Extraction of the pixels of handwritten characters from an input scan image will be referred to as "handwriting extraction" hereinafter. The pixels of the handwritten characters extracted by handwriting extraction will be referred to as "handwriting pixels" hereinafter. That is, a handwriting extracted image obtained by handwriting extraction includes only handwriting pixels. Therefore, by setting the handwriting extracted image as the target of handwriting OCR, erroneous recognition can be reduced.

However, when processing a handwriting extracted image including only extracted handwritten characters, breaks between items or characters entered in a form may be unclear. For example, FIG. 22A shows an example of entry of a name in a form, and FIG. 22B shows a handwriting extracted image extracted from FIG. 22A. Referring to FIG. 22A, the existence of ruled lines makes it possible to know that entered contents are kanji characters "小木 才一郎". However, in FIG. 22B showing the handwriting extracted image, since a break between the characters "木" and "才" is unclear, and "木" and "才" may be recognized as one character "材", and "小材一郎" may be recognized as a result of character recognition processing.

Another example will be described. FIG. 22C shows an example of entry of a name in a form, and FIG. 22D shows a handwriting extracted image extracted from FIG. 22C. Referring to FIG. 22C, it is known that entered contents are "ALI VAIL". However, referring to FIG. 22D, a break between the characters "I" and "V" is unclear, and thus "I" and "V" are close to each other and recognized as a character representing "4" of a Roman numeral. Thus, the result of character recognition processing may be erroneously recognized. If a plurality of items of "001" and "8051" are entered, as shown in FIG. 22E, a handwriting extracted image is as shown in FIG. 22F, and a break between the items is unclear. Then, "0018051" is recognized by handwriting OCR, and it is impossible to recognize which of "001" and "8051" or "0018" and "051" are correct.

Furthermore, if two items of "マツ" and "イクミ" are entered, as shown in FIG. 22G, a handwriting extracted image is recognized as "マツイクミ" by handwriting OCR, and thus it is impossible to recognize which of "マツ" and "イクミ" or "マツイ" and "クミ" are correct.

If two items of "LON" and "GRAY" are entered, as shown in FIG. 22H, a handwriting extracted image is recognized as "LONGRAY" by handwriting OCR, and thus it is impossible to recognize which of "LON" and "GRAY" or "LONG" and "RAY" are correct.

In addition, Japanese Patent Laid-Open No. 2017-138703 discloses a technique of recognizing ruled lines included in an image obtained by reading a form, and extracting an area enclosed inside the ruled lines as an area where handwritten characters are entered.

However, for example, as shown in FIG. 22I or 22J, a note, a symbol, or the like originally printed in a document may be included in the inside of ruled lines. If the technique disclosed in Japanese Patent Laid-Open No. 2017-138703 is used to extract an image in the inside of the ruled lines and perform character recognition, such note 2200 or symbol 2201 is unwantedly included in the result of the character recognition processing together with handwritten characters, and it may be impossible to obtain a recognition result correctly.

SUMMARY

An aspect of the present disclosure is to eliminate the above-mentioned problem with conventional technology.

According to a first aspect of the present disclosure, there is provided an image processing apparatus comprising: at least one processor and at least one memory configured to perform: obtaining a read image of a document including a handwritten character; generating a first image formed by pixels of the handwritten character by extracting the pixels of the handwritten character from pixels of the read image using a first learning model for extracting the pixels of the handwritten character; estimating a handwriting area including the handwritten character using a second learning model for estimating the handwriting area; and performing handwriting OCR processing based on the generated first image and the estimated handwriting area.

According to a second aspect of the present disclosure, there is provided an image processing method comprising: obtaining a read image of a document including a handwritten character; generating a first image formed by pixels of the handwritten character by extracting the pixels of the handwritten character from pixels of the read image using a first learning model for extracting the pixels of the handwritten character; estimating a handwriting area including the handwritten character using a second learning model for estimating the handwriting area; and performing handwriting OCR processing based on the generated first image and the estimated handwriting area.

Further features of the present disclosure will become apparent from the following description of an exemplary embodiment with reference to the attached drawings.

BRIEF DESCRIPTION OF THE DRAWINGS

The accompanying drawings, which are incorporated in and constitute a part of the specification, illustrate an embodiment of the invention and, together with the description, serve to explain the principles of the invention.

FIG. 1 is a block diagram for explaining the configuration of an image processing system;

FIGS. 2A to 2D are block diagrams for respectively explaining the hardware configurations of an image processing apparatus, a learning apparatus, an image processing server, and an OCR server;

FIG. 3A is a sequence chart for explaining a learning sequence in the image processing system;

FIG. 3B is a sequence chart for explaining a use sequence in the image processing system;

FIGS. 4A and 4B depict views each showing an example of a form;

FIG. 4C depicts a view showing an example of a handwriting extraction ground truth image;

FIG. 4D depicts a view showing an example of a handwriting area estimation ground truth image;

FIGS. 5A to 5D depict views each showing an example of a screen displayed in each apparatus of the image processing system according to the first embodiment;

FIG. 7A is a flowchart for explaining learning data generation processing by the learning apparatus according to the first embodiment;

FIG. 7B is a flowchart for explaining learning processing by the learning apparatus;

FIG. 7C is a flowchart for explaining learning data generation processing by the learning apparatus according to the sixth embodiment;

FIG. 11 is a sequence chart for explaining a use sequence in the image processing system according to the second embodiment;

FIG. 12C is a flowchart for describing the procedure of handwriting area estimation processing according to the second embodiment;

FIG. 14 depicts a view showing an example of a form image;

FIGS. 16A to 16F depict views each showing an example of a screen displayed in each apparatus of the image processing system according to the fifth embodiment;

FIG. 17 depicts a view of an example of composite area definition information;

FIGS. 22A to 22L depict views showing examples of scan images and examples of handwriting extracted images extracted from the scan images;

FIG. 24 depicts a view showing an example of a form.

DESCRIPTION OF THE EMBODIMENT

Figures 4E, 4F, 4G, 4H:
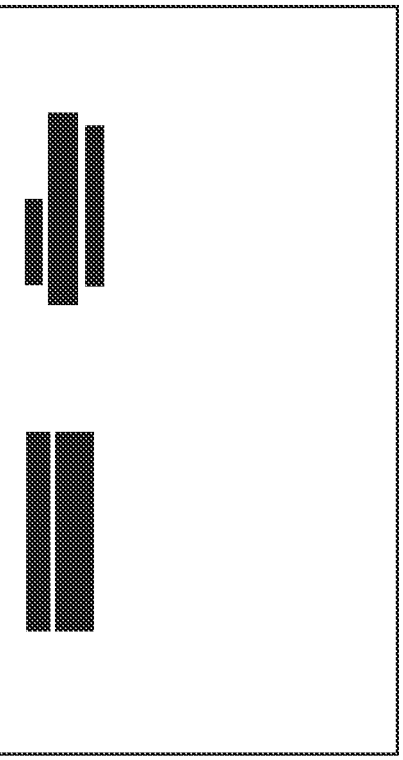
FIG. 4E depicts a view showing an example of a form.
FIG. 4F depicts a view showing a handwriting extracted image of the form shown in FIG. 4E.
FIG. 4G depicts a view showing an example of a handwriting extraction ground truth image.
FIG. 4H depicts a view showing an example of a handwriting area estimation ground truth image.

Embodiments of the present disclosure will be described hereinafter in detail, with reference to the accompanying drawings. It is to be understood that the following embodiments are not intended to limit the claims of the present disclosure, and that not all of the combinations of the aspects that are described according to the following embodiments are necessarily required with respect to the means to solve the problems according to the present disclosure.

Extraction of the pixels of a handwritten character from a scan image will be referred to as "handwriting extraction" hereinafter. The pixels of a handwritten character extracted by handwriting extraction will be referred to as "handwriting pixels" hereinafter. An image obtained by leaving the pixels of a handwritten character and removing the remaining pixels by handwriting extraction will be referred to as a "handwriting extracted image" hereinafter. Execution of optical character recognition (OCR) for the handwriting extracted image will be referred to as "handwriting OCR" hereinafter. A handwritten character recognized by handwriting OCR is converted into text (data).

Furthermore, estimation of an area including a handwritten character will be referred to as "handwriting area estimation" hereinafter. An area obtained by handwriting area estimation will be referred to as a "handwriting area" hereinafter. A handwriting area in a scan image can be recognized by handwriting OCR and converted into text.

First Embodiment

A first embodiment shows an example of forming handwriting extraction and handwriting area estimation using neural networks.

FIG. 1 is a block diagram showing the configuration of an image processing system. An image processing system 100 is formed by an image processing apparatus 101, a learning apparatus 102, an image processing server 103, and an OCR server 104. The image processing apparatus 101, the learning apparatus 102, the image processing server 103, and the OCR server 104 are connected to each other via a network 105.

The image processing apparatus 101 is a digital multi function peripheral such as an MFP (Multi Function Peripheral) or the like, and has a print function and a scan function (functions of an image obtaining unit 111). The image processing apparatus 101 generates image data (to be referred to as a "document sample image" hereinafter) by scanning a document such as a form. The image processing apparatus 101 obtains a plurality of document sample images by scanning a plurality of documents. These documents include a handwritten document. The image processing apparatus 101 transmits the document sample images to the learning apparatus 102 via the network 105. Furthermore, when converting a form into text, the image processing apparatus 101 obtains image data (to be referred to as a "processing target image" hereinafter) as a processing target by scanning a document including a handwritten character (handwritten symbol or handwritten figure). Then, the image processing apparatus 101 transmits the obtained processing target image to the image processing server 103 via the network 105.

The learning apparatus 102 functions as an image accumulation unit 115 that accumulates the document sample images generated by the image processing apparatus 101. The learning apparatus 102 also functions as a learning data generation unit 112 that generates learning data from the thus accumulated images. The learning data is data to be used to cause each of the neural networks for handwriting extraction and handwriting area estimation to perform learning. The learning apparatus 102 functions as a learning unit 113 that performs learning of each neural network using the generated learning data. Learning processing of the learning unit 113 generates a learning result (a parameter of each neural network and the like). The learning apparatus 102 transmits the learning result (learning model) of each neural network to the image processing server 103 via the network 105. An example of a machine learning method using a neural network is deep learning using a multilayer neural network.

The image processing server 103 functions as an image conversion unit 114 that converts the processing target image. The image conversion unit 114 generates an image as a target of handwriting OCR from the processing target image. That is, the image conversion unit 114 performs handwriting extraction for the processing target image generated by the image processing apparatus 101. At this time, the image processing apparatus 101 extracts (specifies) handwriting pixels (pixel positions) in the processing target image by inference by the neural network for handwriting pixel extraction using the learning result generated by the learning apparatus 102, thereby obtaining a handwriting extracted image. Furthermore, the image processing server 103 performs handwriting area estimation for the processing target image generated by the image processing apparatus 101. The image processing apparatus 101 estimates (specifies) an area, where a handwritten character is entered, in the processing target image by inference by the neural network using the learning result generated by the learning apparatus 102. This obtains a handwriting area. The estimated handwriting area is represented as position information indicating the position of the area where the handwritten character string is entered. For example, the handwriting area is expressed as information formed by a specific pixel position (for example, the upper left coordinates of the handwritten character area) of the area and the width and height from the specific pixel position. A plurality of handwriting areas may be obtained in accordance with the number of items entered in a form. The handwriting extracted image is an image obtained by extracting only handwriting pixels in the processing target image. On the other hand, the handwriting area is an area obtained by partitioning each entry in the processing target image. Therefore, it is possible to divide handwriting into individual entries and process them by deciding partial areas on the handwriting extracted image based on the handwriting areas. Then, the image conversion unit 114 transmits the handwriting extracted image and the pieces of position information of the handwriting areas to the OCR server 104. This instructs the OCR server 104 to set each handwriting area on the handwriting extracted image as a target area of handwriting OCR. Furthermore, the image conversion unit 114 generates an image (to be referred to as a "printed character image (type image)" hereinafter) by removing the handwriting pixels included in the handwriting extracted image from the processing target image. Then, the image conversion unit 114 generates position information of an area (to be referred to as a "printed character area (type area)" hereinafter), on the printed character image, including a printed character as a target of printed character OCR (type OCR). Generation of the position information of the printed character area will be described later. Then, the image conversion unit 114 transmits the printed character image and the position information of the printed character area to the OCR server 104. This instructs the OCR server 104 to perform printed character OCR for each printed character area on the printed character image. The image conversion unit 114 receives a handwriting OCR result and a printed character OCR result from the OCR server 104. The image conversion unit 114 integrates these results and transmits, as text data, the thus obtained data to the image processing apparatus 101. This text data will be referred to as "form text data" hereinafter.

The OCR server 104 has functions of a handwriting OCR unit 116 and a printed character OCR unit 117. Upon receiving the handwriting extracted image and the position information of the handwriting area, the OCR server 104 performs OCR processing for the handwriting area in the handwriting extracted image, thereby obtaining text data (OCR result). The handwriting OCR unit 116 transmits the text data to the image processing server 103. Upon receiving the printed character image and the position information of the printed character area, the OCR server 104 performs OCR processing for the printed character area in the printed character image, thereby obtaining text data. The printed character OCR unit 117 transmits the text data to the image processing server 103.

<Learning Sequence>

A learning sequence in this system will be described. FIG. 3A is a sequence chart showing the learning sequence in the image processing system.

In step S301 (to be referred to as S301 or the like in the following description), if the user issues a document reading instruction, the image obtaining unit 111 generates a document sample image by reading a document (S302).

The document sample image generated as described above is transmitted to the learning data generation unit 112 (S303). Note that at this time, ID information is added to the document sample image. The ID information is, for example, information for identifying the image processing apparatus 101 functioning as the image obtaining unit 111. Note that examples of the ID information are user identification information for identifying a user who operates the image processing apparatus 101 and group identification information for identifying a group to which the user belongs.

Upon receiving the image and the ID information, the learning data generation unit 112 accumulates the document sample image in the image accumulation unit 115 (S304).

If the user instructs the learning apparatus 102 to add ground truth data to the document sample image (S305), the learning data generation unit 112 obtains the ground truth data. Then, the learning data generation unit 112 accumulates the ground truth data in the image accumulation unit 115 in linkage with the document sample image (S306). The ground truth data is data to be used for learning of a neural network. A method of adding ground truth data will be described later. Then, the learning data generation unit 112 generates learning data based on the thus accumulated data (S307). At this time, the learning data generation unit 112 may generate learning data using only the document sample image based on specific ID information. After that, the learning data generation unit 112 transmits the learning data to the learning unit 113 (S308). If the learning data generation unit 112 generates the learning data using only the image based on the specific ID information, the learning data generation unit 112 transmits the ID information together with the learning data. The learning unit 113 performs learning processing based on the received learning data, and updates the learning model (S309). The learning unit 113 may hold the learning model for each piece of ID information, and perform learning using only corresponding learning data. By linking the ID information and the learning model with each other, it is possible to create a learning model specialized in a specific use environment.

<Use Sequence>

A use sequence in this system will be described. FIG. 3B is a sequence chart showing the use sequence in the image processing system.

In S351, if the user issues a document (form) reading instruction, the image obtaining unit 111 reads a document to generate a processing target image (S352). The read image is, for example, a form 400 or 450 shown in FIG. 4A or 4B. Each of these forms includes a name input field (a last name input field 401 and a first name input field 402 or a full name input field 451), an address input field 403 or 452, and a telephone number input field 404 or 453, in which a name, an address, and a telephone number are handwritten. However, the arrangement of these input fields (the layout of each form) is different for each form since it is decided by a form creation source (atypical form).

The processing target image read as described above is transmitted to the image conversion unit 114 (S353). Note that at this time, ID information is preferably added to the transmission data.

Upon receiving the data, the image conversion unit 114 accepts an instruction to convert the processing target image into text (S354). At this time, the image conversion unit 114 stores the image obtaining unit 111 as a data return destination. After accepting a handwritten character processing instruction, the image conversion unit 114 requests latest learning models of the learning unit 113 (S355). In response to this, the learning unit 113 transmits the latest learning models (a learning model for handwriting pixel extraction and that for handwriting area estimation) to the image conversion unit 114 (S356). If the ID information is designated in the request from the image conversion unit 114, the learning model corresponding to the ID information is transmitted. The image conversion unit 114 performs handwriting extraction and handwriting area estimation for the processing target image based on the obtained learning model for handwriting pixel extraction and that for handwriting area estimation (S357). Then, the image conversion unit 114 transmits a thus generated handwriting extracted image and position information of a handwriting area to the handwriting OCR unit 116 (S358). The handwriting OCR unit 116 performs handwriting OCR processing for each partial area corresponding to the handwriting area on the handwriting extracted image, thereby obtaining text data (handwriting) (S359). The handwriting OCR unit 116 transmits the obtained text data (handwriting) to the image conversion unit 114 (S360). Subsequently, the image conversion unit 114 generates a printed character image and position information of a printed character area from the processing target image (S361). Then, the image conversion unit 114 transmits the printed character image and the position information of the printed character area to the printed character OCR unit 117 (S362). The printed character OCR unit 117 performs printed character OCR processing for the printed character image, thereby obtaining text data (printed character) (S363). Then, the printed character OCR unit 117 transmits the obtained text data (printed character) to the image conversion unit 114 (S364). After that, the image conversion unit 114 generates form text data based on at least the text data of the handwriting OCR result and the text data of the printed character OCR result (S365). The image conversion unit 114 transmits the form text data to the image obtaining unit 111 (S366). Upon obtaining the form text data, the image obtaining unit 111 presents a use screen of the form text data to the user (S367). After that, the image obtaining unit 111 outputs the form text data in accordance with the application purpose of the form text data. For example, the image obtaining unit 111 outputs the form text data by transmitting to a separate external business system (not shown) or by printing it.

Figures 21A, 21B:
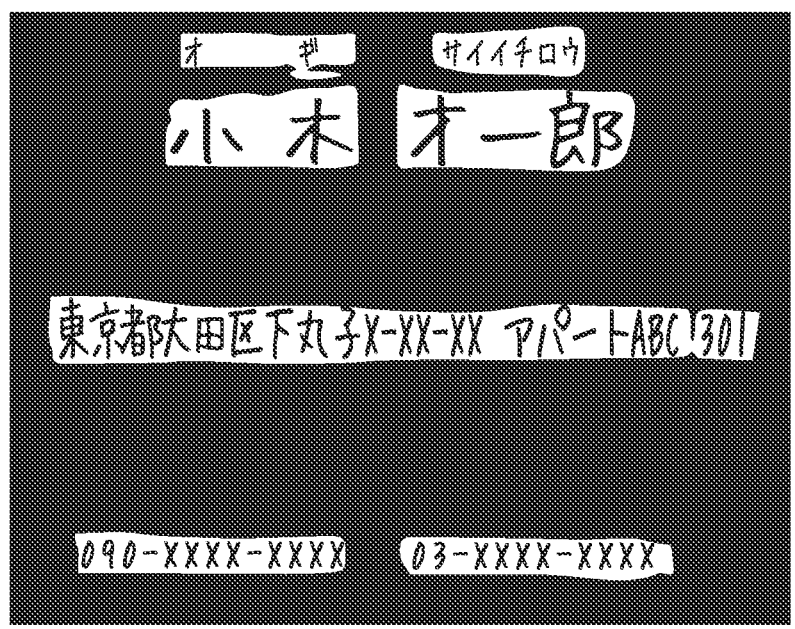
FIG. 21A depicts a view showing an example of a processing target image.
FIG. 21B depicts a view showing an example of a result of applying a neural network for handwriting extraction and a neural network for handwriting area estimation.

Note that in S357 of the use sequence, an example of a result of inference using the neural network for handwriting extraction and that for handwriting area estimation will be described. FIG. 21A shows an example of the processing target image. FIG. 21B shows an example of the result of inference using the neural network for handwriting extraction and that for handwriting area estimation. In FIG. 21B, extracted handwritten characters (character portions) are estimated by the neural network for handwriting extraction, and handwriting areas (white hatched portions) are estimated by the neural network for handwriting area estimation. Note that since whether each pixel forms a handwriting area is estimated, a connection element obtained by connecting pixels determined to form a handwriting area is not rectangular. However, as will be described later, a rectangle circumscribing the connection element is processed as a handwriting area in step S954.

<Apparatus Arrangement>

To implement the above-described system, each apparatus has the following configuration. FIG. 2A is a block diagram showing the configuration of the image processing apparatus 101. FIG. 2B is a block diagram showing the configuration of the learning apparatus 102. FIG. 2C is block diagram showing the configuration of the image processing server 103. FIG. 2D is a block diagram showing the configuration of the OCR server.

As shown in FIG. 2A, the image processing apparatus 101 includes a CPU 201, a ROM 202, a RAM 204, a printer device 205, a scanner device 206, a document conveyance device 207, a storage 208, an input device 209, a display device 210, and an external interface 211. The respective devices are connected to each other via a bus 203 so as to be able to communicate with each other.

The CPU 201 is a controller for comprehensively controlling the image processing apparatus 101. The CPU 201 activates an OS (Operating System) by a boot program stored in the ROM 202. A controller program stored in the storage 208 is executed on this OS. The controller program is a program for controlling the image processing apparatus 101. The CPU 201 comprehensively controls the respective devices connected by the data bus 203. The RAM 204 operates as the main memory or the temporary storage area such as a work area of the CPU 201.

The printer device 205 prints image data on a paper sheet (print material or sheet). There are an electrophotographic printing method using a photosensitive drum and a photosensitive belt, an inkjet method of directly printing an image on a paper sheet by discharging ink from a small nozzle array, and the like and the printer device 205 may adopt any method. The scanner device 206 scans on a document such as a sheet using an optical reading apparatus such as a CCD to obtain electrical signal data, and converts it to generate image data. Furthermore, the document conveyance device 207 such as an ADF (Automatic Document Feeder) conveys, to the scanner device 206, documents placed on a document table on the document conveyance device 207 one by one.

The storage 208 is a readable/writable nonvolatile memory such as an HDD or SSD. Various data such as the above-described controller program is recorded in the storage 208. The input device 209 is an input device formed from a touch panel and hard keys. The input device 209 accepts an operation instruction from the user. Then, the input device 209 transmits instruction information including an instruction position to the CPU 201. The display device 210 is a display device such as an LCD or CRT. The display device 210 displays display data generated by the CPU 201. The CPU 201 determines whether any operation is performed based on the instruction information received from the input device 209 and the display data displayed on the display device 210. Then, in accordance with a determination result, the CPU 201 controls the image processing apparatus 101, and also generates new display data and displays it on the display device 210.

The external interface 211 transmits/receives various data including image data to/from an external device via a network such as a LAN, a telephone line, or close proximity wireless communication like infrared communication. The external interface 211 receives PDL data from an external device such as the learning apparatus 102 or a PC (not shown). The CPU 201 interprets the PDL data received by the external interface 211, thereby generating an image. The generated image is printed by the printer device 205 or stored in the storage 208. Furthermore, the external interface 211 receives image data from an external device such as the image processing server 103. The received image data is printed by the printer device 205, stored in the storage 208, or transmitted to another external device by the external interface 211.

The learning apparatus 102 shown in FIG. 2B includes a CPU 231, a ROM 232, a RAM 234, a storage 235, an input device 236, a display device 237, an external interface 238, and a GPU 239. The respective units can transmit/receive data to/from each other via a bus 233.

The CPU 231 is a controller for controlling the overall learning apparatus 102. The CPU 231 activates an OS by a boot program stored in the ROM 232 as a nonvolatile memory. A learning data generation program and a learning program stored in the storage 235 are executed on this OS. The CPU 231 executes the learning data generation program to generate learning data. Furthermore, the CPU 231 executes the learning program to perform learning processing with respect to the neural network for handwriting extraction and that for handwriting area estimation, thereby generating and updating learning models. The CPU 231 controls the respective units via a bus such as the bus 233.

The RAM 234 operates as the main memory or the temporary storage area such as a work area of the CPU 231. The storage 235 is a readable/writable nonvolatile memory, and records the above-described learning data generation program and learning program.

The input device 236 is an input device formed from a pointing device, a keyboard, and the like. The display device 237 is similar to the display device 210 described with reference to FIG. 2A.

The external interface 238 is similar to the external interface 211 described with reference to FIG. 2A.

The GPU 239 is an image processing processor, and performs generation of image data and learning of the neural networks in cooperation with the CPU 231.

The image processing server 103 shown in FIG. 2C includes a CPU 261, a ROM 262, a RAM 264, a storage 265, an input device 266, a display device 267, and an external interface 268. The respective units can transmit/receive data to/from each other via a bus 263.

The CPU 261 is a controller for controlling the overall image processing server 103. The CPU 261 activates an OS by a boot program stored in the ROM 262 as a nonvolatile memory. An image processing server program stored in the storage 265 is executed on this OS. The CPU 261 executes the image processing server program to perform handwriting extraction and handwriting area estimation for the processing target image. The CPU 261 controls the respective units via a bus such as the bus 263.

The RAM 264 operates as the main memory or the temporary storage area such as a work area of the CPU 261. The storage 265 is a readable/writable nonvolatile memory, and records the above-described image processing program.

The input device 266 is similar to the input device 236 described with reference to FIG. 2B. The display device 267 is similar to the display device 210 described with reference to FIG. 2A.

The external interface 268 is similar to the external interface 211 described with reference to FIG. 2A.

The OCR server 104 shown in FIG. 2D includes a CPU 291, a ROM 292, a RAM 294, a storage 295, an input device 296, a display device 297, and an external interface 298. The respective units can transmit/receive data to/from each other via a data bus 293.

The CPU 291 is a controller for controlling the overall OCR server 104. The CPU 291 activates an OS by a boot program stored in the ROM 292 as a nonvolatile memory. An OCR server program stored in the storage 295 is executed on this OS. The CPU 291 executes the OCR server program to recognize handwritten characters and printed characters of a handwriting extracted image and a printed character image and convert them into text. The CPU 291 controls the respective units via a bus such as the bus 293.

The RAM 294 operates as the main memory and the temporary storage area such as a work area of the CPU 291. The storage 295 is a readable/writable nonvolatile memory, and records the above-described OCR server program.

The input device 296 is similar to the input device 236 described with reference to FIG. 2B. The display device 297 is similar to the display device 210 described with reference to FIG. 2A.

The external interface 298 is similar to the external interface 211 described with reference to FIG. 2A.

<Operation Screen>

The user instruction indicated in S301 is issued on the following operation screen. FIG. 5A depicts a view showing a learning document scan screen.

A learning document scan screen 500 is an example of a screen displayed on the display device 210. As shown in FIG. 5A, the learning document scan screen 500 includes a preview area 501, a scan button 502, and a transmission start button 503.

The scan button 502 is a button for starting to read a document set in the scanner device 206. Upon completion of the scan, a document sample image is generated and displayed in the preview area 501. By setting another document in the scanner device 206 and pressing the scan button 502 again, a plurality of document sample images can be held together.

When the document is read, it is possible to instruct the transmission start button 503. When the transmission start button 503 is instructed, the document sample image is transmitted to the learning apparatus 102.

The user instruction indicated in S305 is issued on the following operation screens. FIG. 5B depicts a view showing a handwriting extraction ground truth data creation screen. FIG. 5C depicts a view showing a handwriting area estimation ground truth data creation screen. The user performs an operation based on display contents of the handwriting extraction ground truth data creation screen and the handwriting area estimation ground truth data creation screen, thereby creating ground truth data.

A handwriting extraction ground truth data creation screen 520 is an example of a screen displayed on the display device 237. As shown in FIG. 5B, the handwriting extraction ground truth data creation screen 520 includes an image display area 521, an image selection button 522, an enlargement button 523, a reduction button 524, an extraction button 525, an estimation button 526, and a save button 527.

The image selection button 522 is a button for selecting the document sample image received from the image processing apparatus 101 and accumulated in the image accumulation unit 115. If the image selection button 522 is instructed, a selection screen (not shown) is displayed to make it possible to select the document sample image. When the document sample image is selected, the selected document sample image is displayed in the image display area 521. The user operates the document sample image displayed in the image display area 521 to create ground truth data.

The enlargement button 523 and the reduction button 524 are buttons for enlarging and reducing the display of the image display area 521, respectively. When the enlargement button 523 or the reduction button 524 is instructed, the document sample image displayed in the image display area 521 can be enlarged or reduced and displayed so as to readily create ground truth data.

The extraction button 525 or the estimation button 526 is a button for selecting handwriting extraction or handwriting area estimation for which ground truth data is to be created. When one of the buttons is selected, the selected button is highlighted. When the extraction button 525 is selected, a state of creating ground truth data of handwriting extraction is obtained. If this button is selected, the user performs the following operation to create ground truth data of handwriting extraction. As shown in FIG. 5B, the user operates a mouse cursor via the input device 236 to trace and select handwritten characters in the document sample image displayed in the image display area 521. Upon receiving this operation, the learning data generation unit 112 records pixel positions selected by the above operation on the document sample image. That is, ground truth data of handwriting extraction includes the positions of pixels corresponding to handwriting on the document sample image. On the other hand, when the estimation button 526 is selected, a state of creating ground truth data of handwriting area estimation is obtained. If this button is selected, the user performs the following operation to create ground truth data of handwriting area estimation. As indicated by a dotted line frame in FIG. 5C, the user operates the mouse cursor via the input device 236 to select, in the document sample image displayed in the image display area 521, an area (within the input field without including ruled lines) surrounded by the ruled lines in which handwritten characters are entered. That is, this is an operation of selecting an area for each input field of the form. Upon receiving this operation, the learning data generation unit 112 records the area selected by the above operation. That is, ground truth data of handwriting area estimation includes an area (an area where handwriting can be made) within an input field on the document sample image (an area where handwriting is made will be referred to as a "handwriting area" hereinafter).

The save button 527 is a button for saving the created ground truth data. The ground truth data of handwriting extraction is accumulated as the following image in the image accumulation unit 115. The image has the same size (width and height) as that of the document sample image. The pixels of the handwritten character positions selected by the user have a value (for example, 255) (the same applies to the following) indicating handwriting. The remaining pixels have a value (for example, 0) (the same applies to the following) indicating not handwriting. Such image as the ground truth data of handwriting extraction will be referred to as a "handwriting extraction ground truth image" hereinafter. FIG. 4C shows an example of the handwriting extraction ground truth image. The ground truth data of handwriting area estimation is accumulated as the following image in the image accumulation unit 115. The image has the same size (width and height) as that of the document sample image. Pixels corresponding to the handwriting area selected by the user have a value (for example, 255) (the same applies to the following) indicating a handwriting area. The remaining pixels have a value (for example, 0) (the same applies to the following) indicating not a handwriting area. Such image as the ground truth data of handwriting area estimation will be referred to as a "handwriting area estimation ground truth image" hereinafter. FIG. 4D shows an example of the handwriting area estimation ground truth image.

The user instruction indicated in S351 is issued on the following operation screen. FIG. 5D depicts a view showing a form processing screen. As shown in FIG. 5D, a form processing screen 540 includes a preview area 541, a scan button 542, and a transmission start button 543.

The scan button 542 is a button for starting to read a document set in the scanner device 206. Upon completion of the scan, a processing target image is generated and displayed in the preview area 541.

When the document is read, it is possible to instruct the transmission start button 543. When the transmission start button 543 is instructed, the processing target image is transmitted to the image processing server 103.

<Document Sample Image Generation Processing>

Figure 6B:
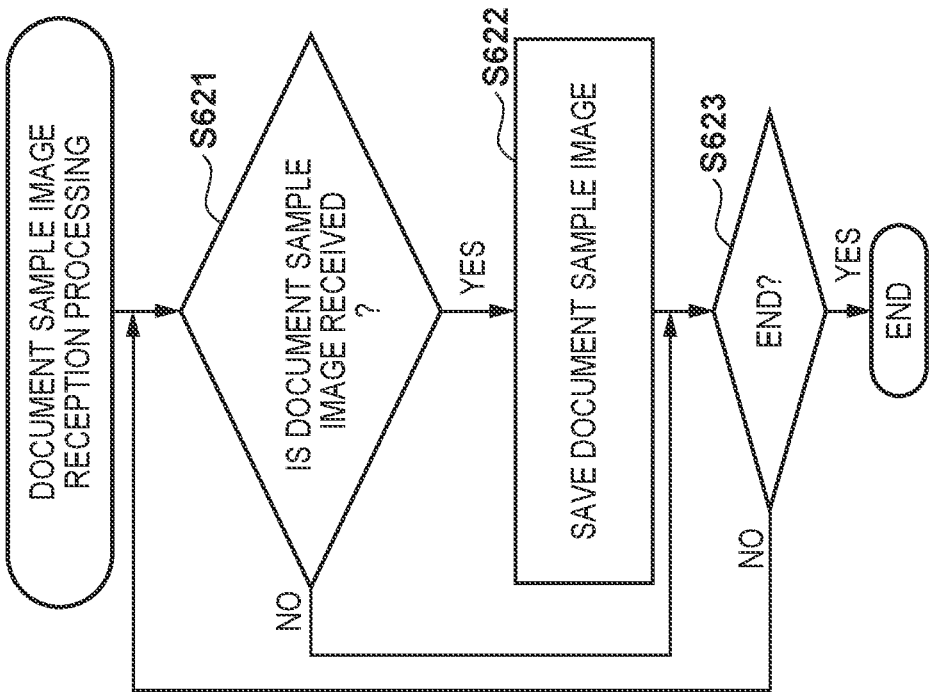
FIG. 6B is a flowchart for explaining sample image reception processing by the learning apparatus.
Figure 6A:
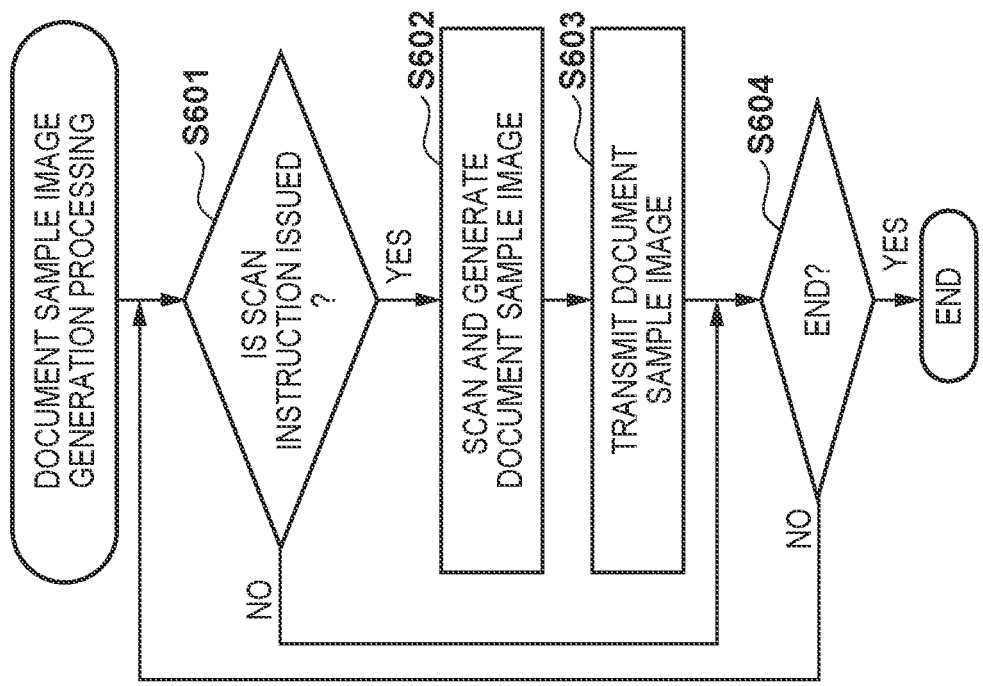
FIG. 6A is a flowchart for explaining sample image generation processing by the image processing apparatus.

Document sample image generation processing by the image processing apparatus 101 will be described next. FIG. 6A is a flowchart for describing the procedure of the document sample image generation processing. This processing is implemented when the CPU 201 reads out the controller program recorded in the storage 208, deploys it in the RAM 204, and executes it. This starts when the user operates the input device 209 of the image processing apparatus 101.

In step S601, the CPU 201 determines whether a document scan instruction is issued. If the user performs, via the input device 209, a predetermined operation (instruction to the scan button 502) of scanning a document, YES is determined and the process transitions to step S602; otherwise, NO is determined and the process transitions to step S604.

In step S602, the CPU 201 controls the scanner device 206 and the document conveyance device 207 to scan the document and generate a document sample image. The document sample image is generated as grayscale image data.

In step S603, the CPU 201 transmits the document sample image generated in step S602 to the learning apparatus 102 via the external interface 211.

In step S604, the CPU 201 determines whether the processing ends. If the user performs a predetermined operation of ending the document sample image generation processing, YES is determined and the processing ends; otherwise, NO is determined and the process returns to step S601.

With the above processing, the image processing apparatus 101 generates a document sample image and transmits it to the learning apparatus 102. A plurality of document sample images are obtained in accordance with the user operation and the number of documents placed in the document conveyance device 207.

<Document Sample Image Reception Processing>

Document sample image reception processing by the learning apparatus 102 will be described next. FIG. 6B is a flowchart for describing the procedure of the document sample image reception processing. This processing is implemented when the CPU 231 reads out the learning data generation program recorded in the storage 235, deploys it in the RAM 234, and executes it. This starts when the user turns on the power of the learning apparatus 102.

In step S621, the CPU 231 determines whether a document sample image is received. If image data is received via the external interface 238, the CPU 231 determines YES and the process transitions to step S622; otherwise, the CPU 231 determines NO and the process transitions to step S623.

In step S622, the CPU 231 records the received document sample image in a predetermined area of the storage 235.

In step S623, the CPU 231 determines whether the processing ends. If the user performs a predetermined operation of ending the document sample image reception processing, for example, the user turns off the power of the learning apparatus 102, YES is determined and the processing ends; otherwise, NO is determined and the process returns to step S621.

<Ground Truth Data Generation Processing>

Figure 6C:
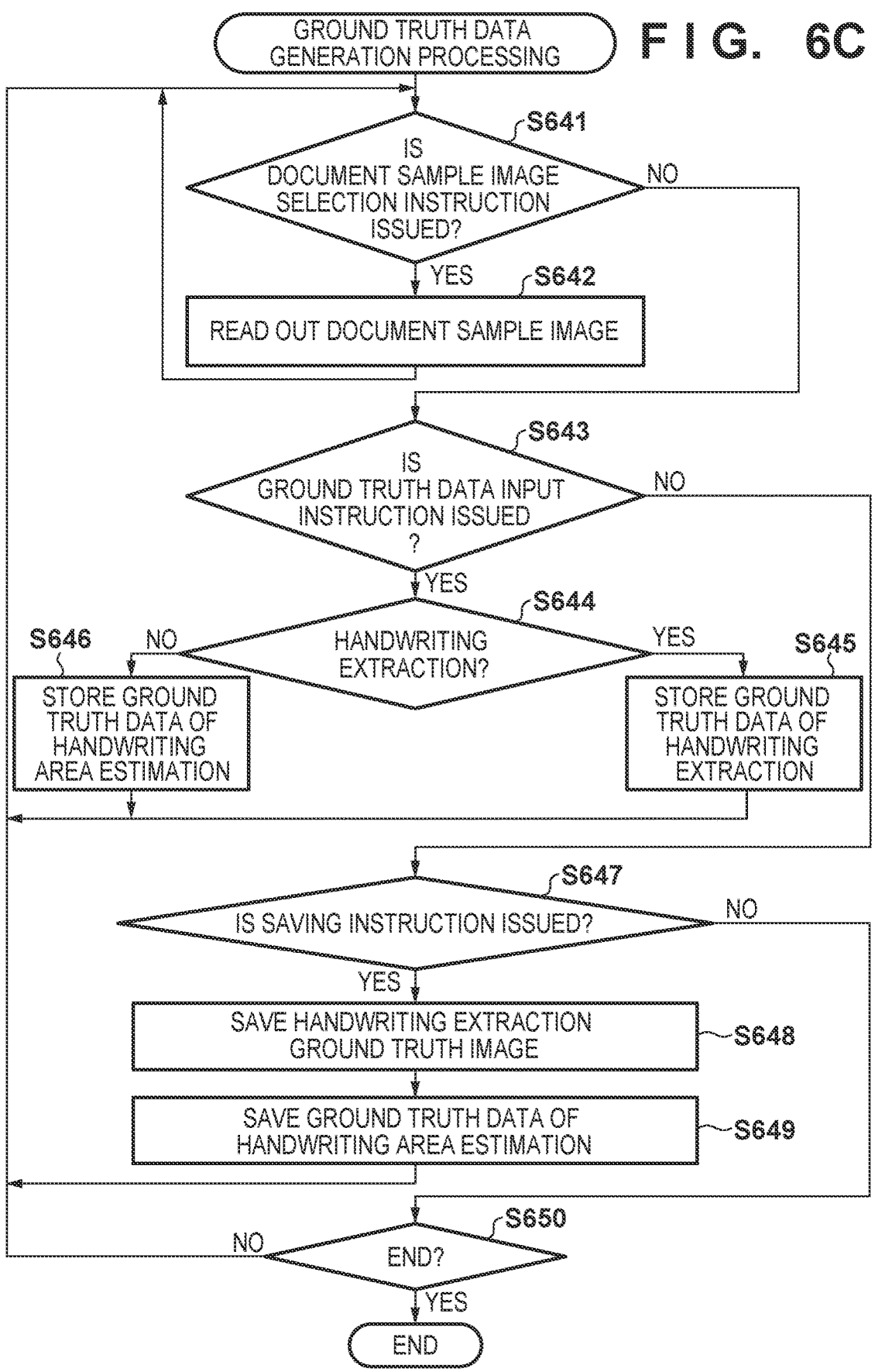
FIG. 6C is a flowchart for explaining ground truth data generation processing by the learning apparatus.

Ground truth data generation processing by the learning apparatus 102 will be described next. FIG. 6C is a flowchart for describing the procedure of the ground truth data generation processing.

This processing is implemented by the learning data generation unit 112 of the learning apparatus 102. This starts when the user performs a predetermined operation via the input device 236 of the learning apparatus 102.

In step S641, the CPU 231 determines whether a document sample image selection instruction is issued. If the user performs, via the input device 236, a predetermined operation (instruction to the image selection button 522) of selecting the document sample image, YES is determined and the process transitions to step S642; otherwise, NO is determined, the process transitions to step S643.

In step S642, the CPU 231 reads out, from the storage 235, the document sample image selected by the user in step S641, and outputs it to the user (displays it in the image display area 521).

In step S643, the CPU 231 determines whether the user issues a ground truth data input instruction. If the user performs an operation of tracing handwritten characters on the document sample image or designating an area where handwritten characters are entered, via the input device 236, as described above, YES is determined and the process transitions to step S644; otherwise, NO is determined and the process transitions to step S647.

In step S644, the CPU 231 determines whether the ground truth data input by the user is ground truth data of handwriting extraction. If the user performs an operation of instructing to create ground truth data of handwriting extraction (the user selects the extraction button 525), the CPU 231 determines YES and the process transitions to step S645; otherwise, that is, if the ground truth data input by the user is ground truth data of handwriting area estimation (the user selects the estimation button 526), the process transitions to step S646.

In step S645, the CPU 231 temporarily stores, in the RAM 234, the ground truth data of handwriting extraction input by the user. As described above, the ground truth data of handwriting extraction includes position information of pixels corresponding to handwriting in the document sample image.

In step S646, the CPU 231 temporarily stores, in the RAM 234, the ground truth data of handwriting area estimation input by the user. As described above, the ground truth data of handwriting area estimation includes area information corresponding to a handwriting area on the document sample image.

In step S647, the CPU 231 determines whether ground truth data saving instruction is issued. If the user performs a predetermined operation (instruction to the save button 527) of saving the ground truth data via the input device 236, YES is determined and the process transitions to step S648; otherwise, NO is determined and the process transitions to step S650.

In step S648, the CPU 231 generates a handwriting extraction ground truth image and saves it as ground truth data of handwriting extraction. The CPU 231 generates a handwriting extraction ground truth image, as follows. The CPU 231 generates, as a handwriting extraction ground truth image, an image of the same size as that of the document sample image read out in step S642. All the pixels of this image are set to have a value indicating not handwriting. Next, with reference to the position information temporarily stored in the RAM 234 in step S645, the values of pixels at corresponding positions on the handwriting extraction ground truth image are changed to a value indicating handwriting. The thus generated handwriting extraction ground truth image is saved in a predetermined area of the storage 235 in association with the document sample image read out in step S642.

In step S649, the CPU 231 generates a handwriting area estimation ground truth image, and saves it as ground truth data of handwriting area estimation. The CPU 231 generates a handwriting area estimation ground truth image, as follows. The CPU 231 generates, as a handwriting area estimation ground truth image, an image of the same size as that of the document sample image read out in step S642. All the pixels of this image are set to have a value indicating not a handwriting area. Next, with reference to the area information temporarily stored in the RAM 234 in step S646, the values of pixels within a corresponding area on the handwriting area estimation ground truth image are changed to a value indicating a handwriting area. The thus generated handwriting area estimation ground truth image is saved in a predetermined area of the storage 235 in association with the document sample image read out in step S642.

In step S650, the CPU 231 determines whether the processing ends. If the user performs a predetermined operation of ending the ground truth data generation processing, YES is determined and the processing ends; otherwise, NO is determined and the process returns to step S641.

<Learning Data Generation Processing>

Learning data generation processing by the learning apparatus 102 will be described next. FIG. 7A is a flowchart for describing the procedure of the learning data generation processing. This processing is implemented by the learning data generation unit 112 of the learning apparatus 102. This starts when the user performs a predetermined operation via the input device 209 of the image processing apparatus 101.

In step S701, the CPU 231 selects the document sample image stored in the storage 235 and reads it out. Since the plurality of document sample images are recorded in the storage 235 by the processing in step S622 of the flowchart shown in FIG. 6B, the CPU 231 randomly selects one of these images.

In step S702, the CPU 231 reads out the handwriting extraction ground truth image stored in the storage 235. Since the handwriting extraction ground truth image associated with the document sample image read out in step S701 is stored in the storage 235 by the processing in step S648, the CPU 231 reads out that handwriting extraction ground truth image.

In step S703, the CPU 231 reads out the handwriting area estimation ground truth image stored in the storage 235. Since the handwriting area estimation ground truth image associated with the document sample image read out in step S701 is stored in the storage 235 by the processing in step S649, the CPU 231 reads out that handwriting area estimation ground truth image.

In step S704, the CPU 231 extracts part (for example, vertical size×horizontal size=256×256) of the document sample image read out in step S701, thereby generating an input image to be used for learning data. An extraction position is randomly decided.

In step S705, the CPU 231 extracts part of the handwriting extraction ground truth image read out in step S702, thereby generating a ground truth label image (supervisory data and ground truth image data) to be used for learning data of handwriting extraction. This ground truth label image will be referred to as a "handwriting extraction ground truth label image" hereinafter. The position and size when extracting the ground truth label image from the handwriting extraction ground truth image in step S705 are the same as those when extracting the input image from the document sample image in step S704.

In step S706, the CPU 231 extracts part of the handwriting area estimation ground truth image read out in step S703, thereby generating a ground truth label image (to be referred to as a "handwriting area estimation ground truth label image" hereinafter) to be used for learning data of handwriting area estimation. The extraction position and size are the same as the position and size when extracting the input image from the document sample image in step S704.

Figure 8A:
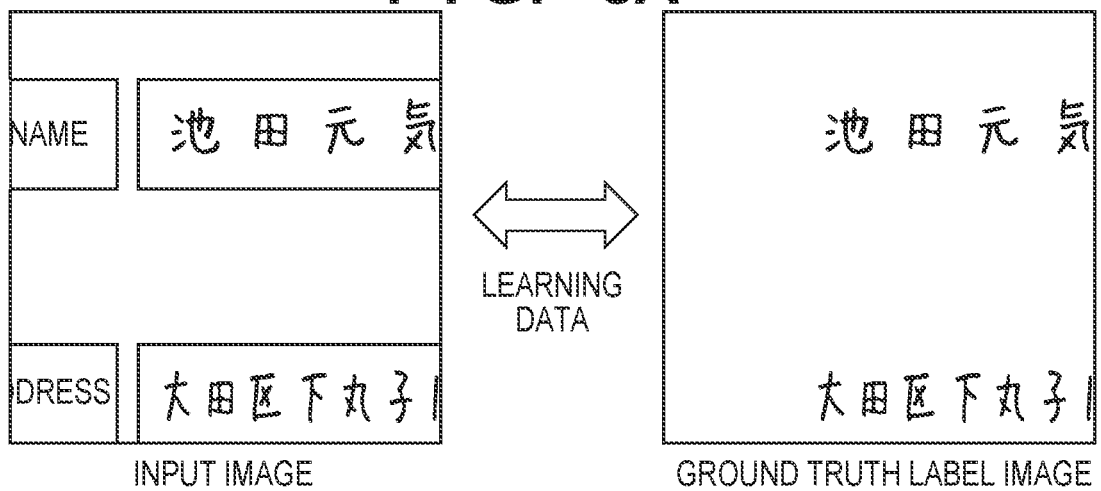
FIG. 8A depicts a view showing an example of the structure of learning data of handwriting extraction.

In step S707, the CPU 231 associates the input image generated in step S704 with the handwriting extraction ground truth label image generated in step S706, and saves them as learning data of handwriting extraction in a predetermined area of the storage 235. In this example, learning data shown in FIG. 8A is saved.

Figure 8B:
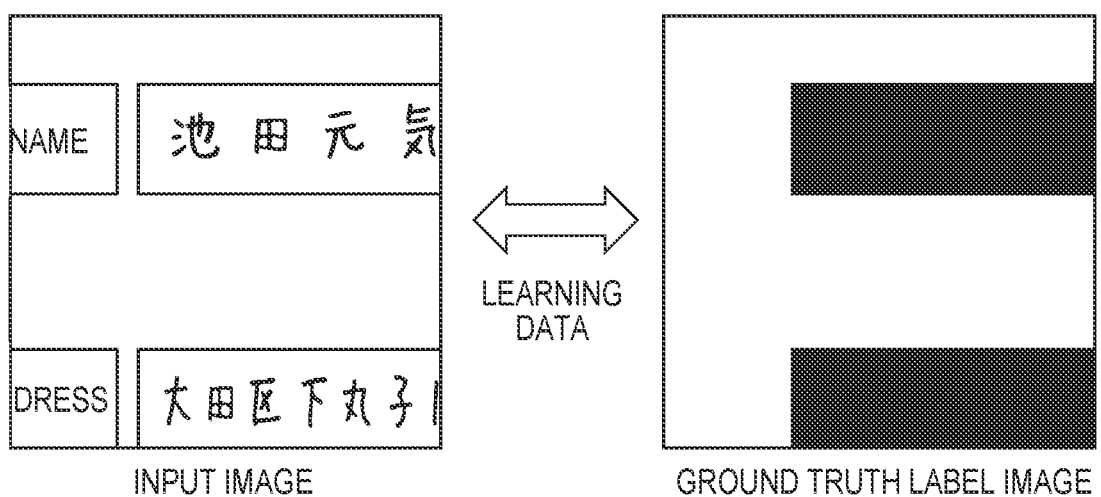
FIG. 8B depicts a view showing an example of the structure of learning data of handwriting area estimation.

In step S708, the CPU 231 associates the input image generated in step S704 with the handwriting area estimation ground truth label image generated in step S707, and saves them as learning data of handwriting area estimation in a predetermined area of the storage 235. In this example, learning data shown in FIG. 8B is saved.

In step S709, the CPU 231 determines whether the learning data generation processing ends. If a predetermined number (decided by, for example, user designation via the input device 236 of the learning apparatus 102 at the start of this flowchart) of learning data is generated, the CPU 231 determines YES and the processing ends; otherwise, the CPU 231 determines NO and the process returns to step S701.

With the above processing, the learning data of the neural network for performing handwriting extraction and the learning data of the neural network for performing handwriting area estimation are generated. To improve the flexibility of each neural network, the learning data may be processed. For example, the input image is magnified with a magnification randomly selected and decided within a predetermined range (for example, 50% to 150%). The handwriting extraction ground truth label image and the handwriting area estimation ground truth label image are similarly magnified. Alternatively, the input image is rotated by a rotation angle randomly selected and decided within a predetermined range (for example, −10 degree to 10 degree). The handwriting extraction ground truth label image and the handwriting area estimation ground truth label image are similarly rotated. In consideration of magnification and rotation, when extracting the input image in step S704, the handwriting extraction ground truth label image in step S705, and the handwriting area estimation ground truth label image in step S706, these images are extracted in a larger size (for example, vertical size×horizontal size=512×512). Then, after magnification and rotation, extraction is performed from a central portion so as to obtain the final sizes (for example, vertical size×horizontal size=256×256) of the input image, the handwriting extraction ground truth label image, and the handwriting area estimation ground truth label image. Alternatively, the luminance of each pixel of the input image may be changed and processed. That is, the luminance of the input image is changed using gamma correction. A gamma value is randomly selected and decided within a predetermined range (for example, 0.1 to 10.0).

<Learning Processing>

Learning processing by the learning apparatus 102 will be described next. FIG. 7B is a flowchart for describing the procedure of the learning processing. This processing is implemented by the learning unit 113 of the learning apparatus 102. This starts when the user performs a predetermined operation via the input device 236 of the learning apparatus 102. Note that in this example, a mini-batch method is used for learning of each neural network.

In step S731, the CPU 231 initializes each of the neural network for handwriting extraction and that for handwriting area estimation. That is, the CPU 231 performs initialization by creating two neural networks and randomly deciding the values of parameters included in the neural networks. Various structures can be used as the structures of the neural networks. For example, the form of FCN (Fully Convolutional Networks) as a known technique can be adopted. For the neural network for handwriting area estimation, for example, the form of YOLO (You Only Look Once) as a known technique can be adopted.

In step S732, the CPU 231 obtains learning data. The CPU 231 executes the learning data generation processing shown in the flowchart of FIG. 7A to obtain a predetermined number (a mini-batch size, for example, 10) of learning data.

In step S733, the CPU 231 calculates an error of the neural network for handwriting extraction. That is, an input image included in each learning data of handwriting extraction is input to the neural network for handwriting extraction, and an output is obtained. The output is an image of the same image size as that of the input image, in which pixels determined as handwriting as a prediction result have a value indicating handwriting and the remaining pixels have a value indicating not handwriting. Then, the difference between the output and a handwriting extraction ground truth label image included in the learning data is evaluated to obtain an error. For this evaluation processing, a cross entropy can be used as an index.

In step S734, the CPU 231 adjusts the parameter of the neural network for handwriting extraction. That is, based on the error calculated in step S733, the parameter value of the neural network for handwriting extraction is changed by a back-propagation method.

In step S735, the CPU 231 calculates an error of the neural network for handwriting area estimation. That is, an input image included in each learning data of handwriting area estimation is input to the neural network for handwriting area estimation, and an output is obtained. The output is an image of the same image size as that of the input image, in which pixels determined as a handwriting area as a prediction result have a value indicating a handwriting area and the remaining pixels have a value indicating not a handwriting area. Then, the difference between the output and a handwriting area estimation ground truth label image included in the learning data is evaluated to obtain an error. For the index of this evaluation processing, a cross entropy can be used, similar to handwriting extraction.

In step S736, the CPU 231 adjusts the parameter of the neural network for handwriting area estimation. That is, based on the error calculated in step S735, the parameter value of the neural network for handwriting area estimation is changed by the back-propagation method.

In step S737, the CPU 231 determines whether learning ends. This is done, as follows. The CPU 231 determines whether the processes in steps S732 to S736 are performed a predetermined number of times (for example, 60,000 times). This predetermined number can be decided when the user inputs an operation at the start of this flowchart. If the processes are performed the predetermined number of times, YES is determined and the process transitions to step S738; otherwise, the process returns to step S732, and learning of the neural networks continues.

In step S738, the CPU 231 transmits, as learning results, to the image processing server 103, the parameters of the neural networks for handwriting extraction and handwriting area estimation, which have been adjusted in steps S734 and S736.

<Processing of Requesting Conversion of Form into Text>

Figure 9A:
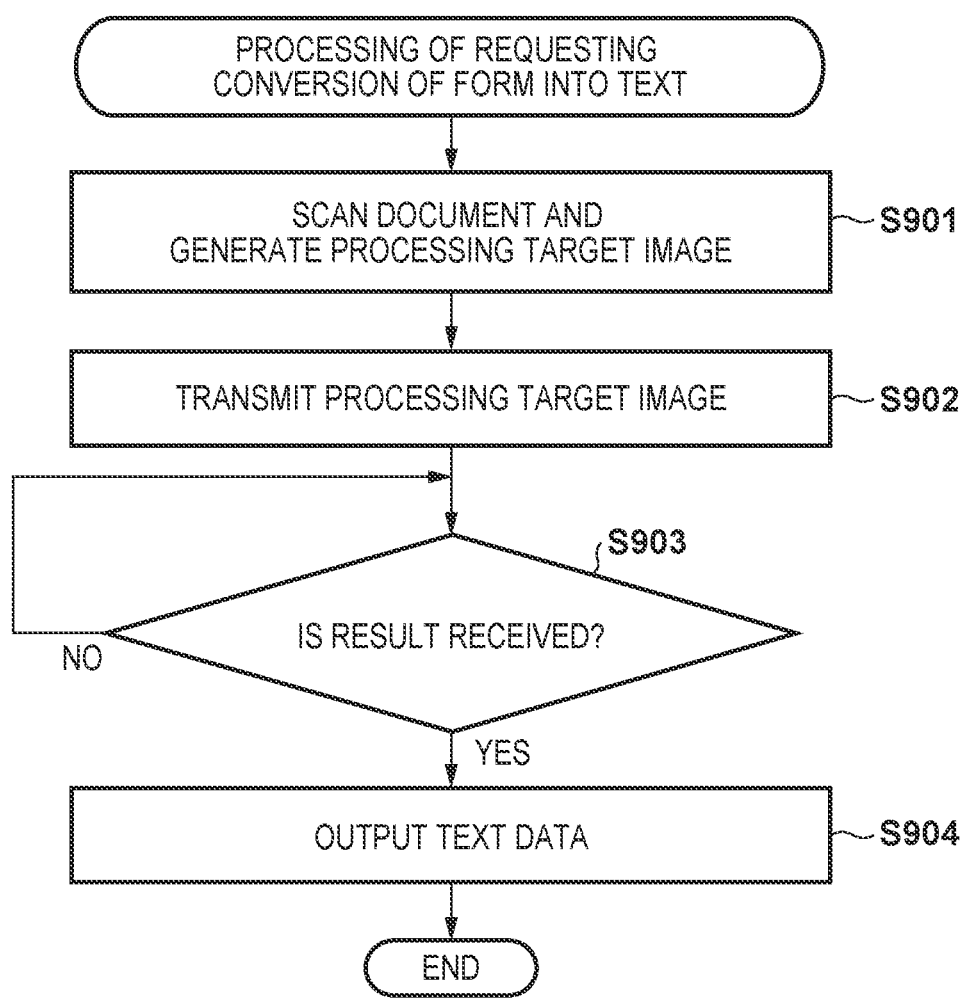
FIG. 9A is a flowchart for explaining processing in which the image processing apparatus requests the image processing server to convert a form into text according to the first embodiment.

Processing of requesting conversion of a form into text by the image processing apparatus 101 will be described next. The image processing apparatus 101 scans a form in which handwriting is made, and generates a processing target image. Then, the image processing apparatus 101 transmits the processing target image data to the image processing server 103, and requests conversion of the form into text. FIG. 9A is a flowchart for describing the procedure of the processing of requesting conversion of the form into text. This processing is implemented when the CPU 201 of the image processing apparatus 101 reads out the controller program recorded in the storage 208, deploys it in the RAM 204, and executes it. This starts when the user performs a predetermined operation via the input device 209 of the image processing apparatus 101.

In step S901, the CPU 201 controls the scanner device 206 and the document conveyance device 207 to scan a document, thereby generating a processing target image. The processing target image is generated as grayscale image data.

In step S902, the CPU 201 transmits the processing target image generated in step S901 to the image processing server 103 via the external interface 211.

In step S903, the CPU 201 determines whether a processing result is received from the image processing server 103. If a processing result is received from the image processing server 103 via the external interface 211, YES is determined and the process transitions to step S904; otherwise, NO is determined and the processing step of step S903 is repeated.

In step S904, the CPU 201 outputs form text data generated by recognizing handwritten characters and printed characters included in the processing result received from the image processing server 103, that is, the processing target image generated in step S901. For example, the CPU 201 can transmit, via the external interface 211, the form text data to a transmission destination set by operating the input device 209 by the user.

<Processing of Converting Form into Text>

Figure 9B:
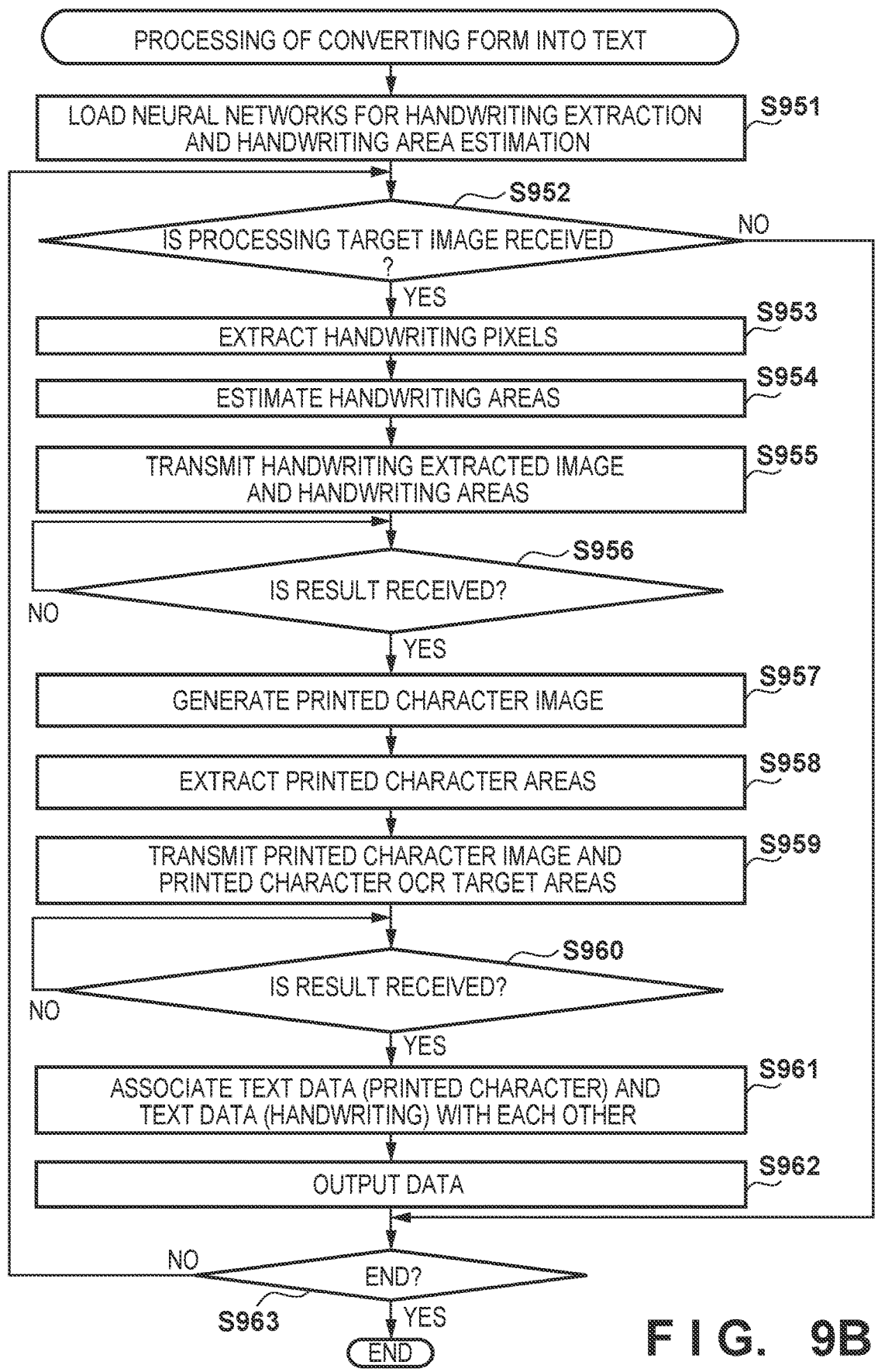
FIG. 9B is a flowchart for explaining processing of converting a form into text by the image processing server according to the first embodiment.
Figure 10A:
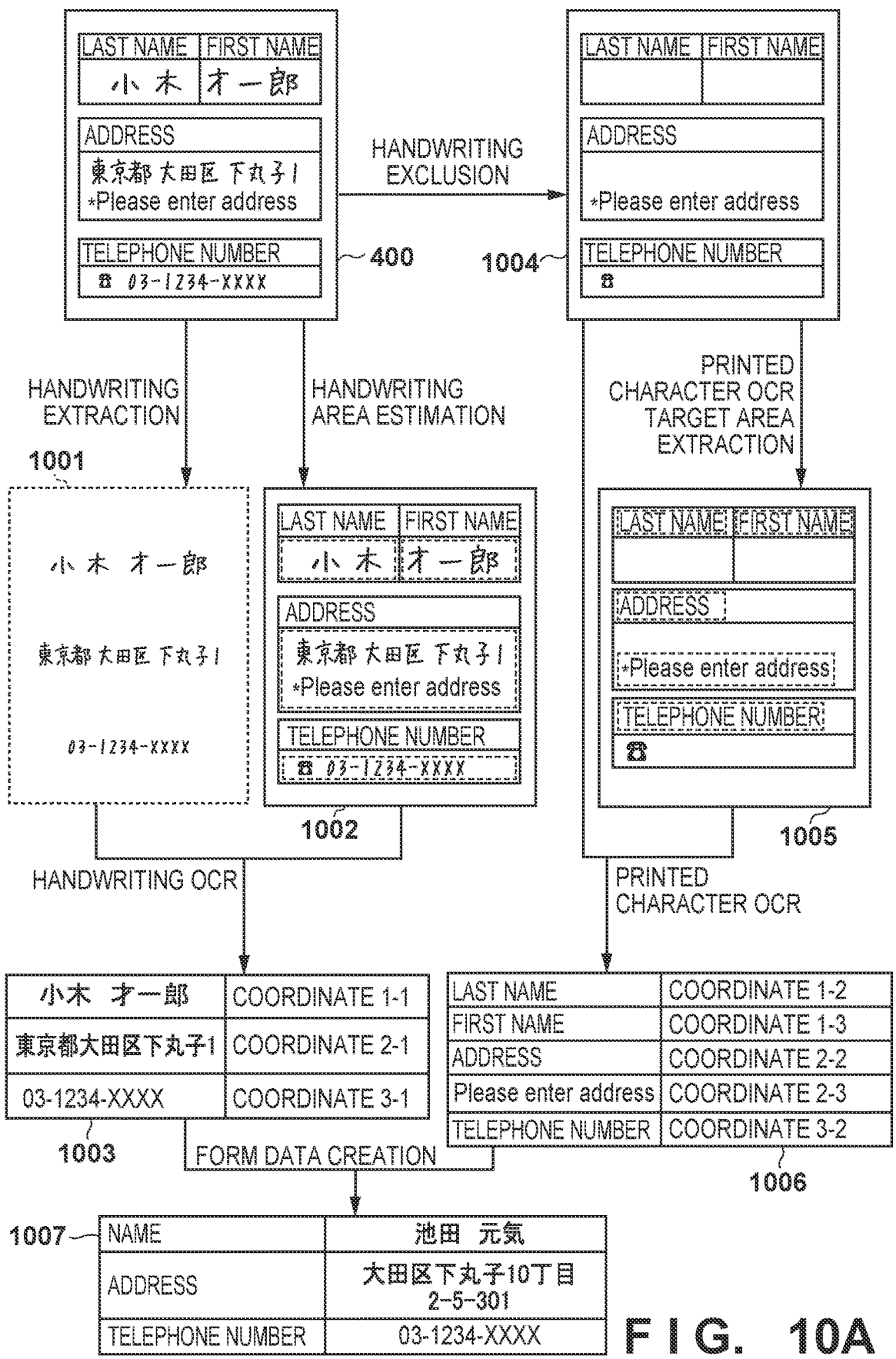
FIG. 10A depicts a view for explaining an overview of data generation processing in the processing of converting a form into text by the image processing server according to the first embodiment.

Processing of converting a form into text by the image processing server 103 will be described next. FIG. 9B is a flowchart for describing the procedure of the processing of converting the form into text. FIG. 10A depicts a view showing an overview of data generation processing in the processing of converting the form into text. The image processing server 103 functioning as the image conversion unit 114 receives the processing target image from the image processing apparatus 101, and performs OCR for the printed characters or handwritten characters included in the scan image data, thereby obtaining text data. OCR for the printed characters is executed by the printed character OCR unit 117. OCR for the handwritten characters is executed by the handwriting OCR unit 116. The processing of converting the form into text is implemented when the CPU 261 reads out the image processing server program stored in the storage 265, deploys it in the RAM 264, and executes it. This starts when the user turns on the power of the image processing server 103.

In step S951, the CPU 261 loads the neural network for performing handwriting extraction and the neural network for performing handwriting area estimation. The CPU 261 creates the same neural networks as those in S731 of the flowchart shown in FIG. 7B. In S738, the learning results (the parameter of the neural network for performing handwriting extraction and the parameter of the neural network for performing handwriting area estimation) transmitted from the learning apparatus 102 are reflected on the created neural networks.

In step S952, the CPU 261 determines whether the processing target image is received from the image processing apparatus 101. If the processing target image is received via the external interface 268, YES is determined and the process transitions to step S953; otherwise, NO is determined and the process transitions to step S963. As an example, assume that the form 400 shown in FIG. 10A (the form 400 shown in FIG. 4A) is received as the processing target image.

In step S953, the CPU 261 extracts handwriting pixels from the processing target image received from the image processing apparatus 101. The CPU 261 inputs the processing target image to the neural network for performing handwriting extraction, which has been created in step S951, to estimate handwriting pixels. As an output from the neural network, the following image data is obtained. That is, image data of the same image size as that of the processing target image, in which a value indicating handwriting is recorded in each pixel determined as handwriting as a prediction result and a value indicating not handwriting is recorded in each pixel determined as not handwriting is obtained. Then, pixels at the corresponding positions as those of the pixels with the value indicating the handwriting in the image data are extracted from the processing target image and a handwriting extracted image is generated. This obtains a handwriting extracted image 1001 shown in FIG. 10A. As shown in FIG. 10A, an image including only handwriting is obtained.

In step S954, the CPU 261 estimates handwriting areas from the processing target image received from the image processing apparatus 101. The CPU 261 inputs the processing target image to the neural network for performing handwriting area estimation, which has been created in step S951, to estimate handwriting areas. As an output from the neural network, the following image data is obtained. Image data of the same image size as that of the processing target image, in which a value indicating a handwriting area is recorded in each pixel determined as a handwriting area as a prediction result and a value indicating not a handwriting area is recorded in each pixel determined as not a handwriting area is obtained. In S305 (FIG. 3A), the user creates ground truth data of handwriting area estimation for each input field of the form in consideration of a ruled line frame (input field). Since the neural network for performing handwriting area estimation learns the ground truth data, pixels indicating a handwriting area are output for each input field (input items). Note that the output from the neural network for handwriting area estimation is a prediction result for each pixel, and the predicted area is not always correctly rectangular, and is thus difficult to process. Therefore, a circumscribed rectangle including this area is set. A known technique can be applied to implement setting of a circumscribed rectangle. Each circumscribed rectangle can be expressed as information formed from the upper left end point on the processing target image and the width and height. The thus obtained rectangle information group is set as a handwriting area. The handwriting areas estimated for the processing target image (form 400) are indicated as an example by dotted line frames in 1002 of FIG. 10A.

In step S955, the CPU 261 transmits the handwriting extracted image generated in step S953 and the handwriting areas generated in step S954 to the handwriting OCR unit 116 via the external interface 268. Then, the CPU 261 causes the handwriting OCR unit 116 to execute, for each estimated handwriting area, handwriting OCR on the handwriting extracted image including only the handwritten characters. A known technique can be applied to implement handwriting OCR. By performing handwriting OCR on the handwriting extracted image for each handwriting area, for example, a situation is restricted, in which print contents such as a printed character or mark in each handwriting input field are unwantedly targeted by handwriting OCR, as shown in the address input field 403 or the telephone number input field 404 in FIG. 4A. Connection of characters or items is restricted by estimating, as different handwriting areas, even adjacent items like the last name input field 401 and the first name input field 402, and performing handwriting OCR.

In step S956, the CPU 261 determines whether a handwriting OCR result is received from the handwriting OCR unit 116. The handwriting OCR result is text data obtained by recognizing handwritten characters included in the handwriting areas by the handwriting OCR unit 116. If the handwriting OCR result is received from the handwriting OCR unit 116 via the external interface 268, YES is determined and the process transitions to step S957; otherwise, the processing in step S956 is repeated. With the above processing, the CPU 261 obtains text data by recognizing the handwriting areas (coordinate information) and handwritten characters included in them. The CPU 261 stores the data as a handwriting information table 1003 in the RAM 264.

In step S957, the CPU 261 generates a printed character image by removing handwriting from the processing target image based on the output from the neural network for handwriting extraction, which has been obtained in step S953. The CPU 261 changes, to white (RGB=(255, 255, 255)), pixels at the corresponding positions as those of pixels, in the processing target image, each having a pixel value indicating handwriting in the image data output from the neural network. Thus, a printed character image 1004 shown in FIG. 10A is obtained.

In step S958, the CPU 261 extracts printed character areas from the printed character image generated in step S957. The CPU 261 extracts, as a printed character area, each partial area including printed characters on the printed character image. The partial area indicates a group (object) of print contents, for example, a character line formed from a plurality of characters, a sentence formed from a plurality of character lines, or an object such as a figure, photo, table, or graph. As a method of extracting the partial area, for example, the following method can be adopted. The printed character image is binarized in white and black to generate a binary image. A portion (connected black pixels) in which black pixels are connected in the binary image is extracted, and a rectangle circumscribing the extracted portion is created. By evaluating the shape and size of the rectangle, a rectangle group as a character or part of a character can be obtained. For the rectangle group, the distance between the rectangles is evaluated, and rectangles having the distance equal to or shorter than a predetermined threshold are integrated, thereby obtaining the rectangle group as a character. If the rectangles, having the similar sizes, of characters are arranged nearby, these rectangles can be integrated to obtain a rectangle group of a character line. If rectangles with similar short side lengths of character lines are arranged at equal intervals, these rectangles can be integrated to obtain a rectangle group of a sentence. A rectangle including an object such as a figure, photo, table, or graph other than a character, line, and sentence can also be obtained. Rectangles (rectangles of objects such as a figure and photo) other than those of characters are excluded from the extracted rectangles. The remaining rectangles are set as printed character areas. In 1005 of FIG. 10A, the printed character areas extracted for the printed character image are exemplified by dotted line frames. In this processing step, a plurality of printed character areas can be extracted from a background sample image.

In step S959, the CPU 261 transmits, to the printed character OCR unit 117 via the external interface 268, the processing target image generated in step S957 and the printed character areas obtained in step S958 to execute printed character OCR. A known technique can be applied to implement printed character OCR.

In step S960, the CPU 261 determines whether a printed character OCR result is received from the printed character OCR unit 117. The printed character OCR result is text data obtained by recognizing printed characters included in the printed character areas by the printed character OCR unit 117. If the printed character OCR result is received from the printed character OCR unit 117 via the external interface 268, YES is determined and the process transitions to step S961; otherwise, the processing in step S960 is repeated. With the above processing, text data is obtained by recognizing printed character areas (coordinate information) and printed characters included in them. The CPU 261 stores the text data as a printed character information table 1006 in the RAM 264.

In step S961, the CPU 261 integrates the handwriting OCR result and the printed character OCR result respectively received from the handwriting OCR unit 116 and the printed character OCR unit 117. The CPU 261 estimates the relationship between the handwriting OCR result and the printed character OCR result by evaluating the positional relationship between the original handwriting areas and printed character areas and the semantic relationship between the text data as the handwriting OCR result and the printed character OCR result. This estimation processing is performed based on the handwriting information table 1003 and the printed character information table 1006. Then, a handwriting area in the last name input field 401 is specified as a handwriting area having the shortest distance to a printed character area in a last name heading 411. In addition to the distance, the positional relationship between the handwriting area and the printed character area in the vertical/horizontal direction may also be considered. If the text data as the handwriting OCR result of the handwriting area is a character string including the last name of the name, this can be specified as the last name of the name. Therefore, the printed character OCR result and the handwriting OCR result are evaluated as the relationship of the pair of the item and value concerning the last name of the name. Similarly, with respect to the first name of the name, the relationship between the handwriting OCR result and the printed character OCR result is evaluated based on the distance between the printed character area and the handwriting area and the fact that the handwriting OCR result includes a character string including the first name of the name, thereby evaluating the relationship of the pair of the item and value concerning the first name of the name. The last name and the first name can be integrated to make a pair of the item and value of the name. Similarly, with respect to an address, the relationship between the handwriting OCR result and the printed character OCR result is evaluated based on the distance between the printed character area and the handwriting area and the fact that the handwriting OCR result includes a place name. With respect to a telephone number, the relationship between the handwriting OCR result and the printed character OCR result is evaluated based on the distance between the printed character area and the handwriting area and the fact that the handwriting OCR result is formed from numbers. The handwriting OCR result and the printed character OCR result are integrated as one or more pairs of items and values, thereby generating form text data 1007.

In step S962, the CPU 261 transmits the generated form data to the image obtaining unit 111.

In step S963, the CPU 261 determines whether the processing ends. If the user performs a predetermined operation of, for example, turning off the power of the image processing server 103, YES is determined and the processing ends; otherwise, NO is determined and the process returns to step S952.

As described in this example, a handwriting extracted image including only handwriting is generated from a scan image of a form including handwriting. On the other hand, handwriting areas are estimated from the scan image. Handwriting in the handwriting extracted image can be recognized by handwriting OCR for each handwriting area, and converted into text. This can reduce deterioration in recognition accuracy of handwriting OCR caused by inclusion of print contents such as a printed character or mark in the target of handwriting OCR. Furthermore, since handwriting OCR is performed for each of input items distinguished by input frames, it is possible to reduce unnecessary connection of characters or items.

In this example, the handwriting extracted image generated from the processing target image and the handwriting areas are transmitted to the handwriting OCR unit. The present disclosure, however, is not limited to this. A plurality of partial images may be generated by extracting a handwriting extracted image for each handwriting area, and transmitted.

Note that in this example, handwriting extraction is performed for the processing target image to generate a handwriting extracted image. The present disclosure, however, is not limited to this. Handwriting extraction may be performed limited to an area estimated by handwriting area estimation. Even in this case, an image as the target of handwriting OCR is a handwriting area indicating an input item, and includes only handwriting pixels.

Note that this example has explained the example in which the neural network for handwriting area estimation performs 2-class classification of pixel values into a value indicating a handwriting area and a value indicating not a handwriting area. The present disclosure, however, is not limited to this. For example, handwriting areas may be classified into a plurality of classes and estimated. For example, in accordance with input contents, classification (multi-class classification) may be performed into, for example, a handwriting area where a name is entered, a handwriting area where an address is entered, a handwriting area where a telephone number is entered, and an area that is not a handwriting area. In this case, when creating a handwriting area estimation ground truth image, pixels of each handwriting area included as ground truth data have values indicating contents of a classification target. For example, a value of "255" indicates the handwriting area of the name, a value of "127" indicates the handwriting area of the address, a value of "64" indicates the handwriting area of the telephone number, a value of 0 indicates other handwriting areas. The neural network is made to refer to the thus created handwriting area estimation ground truth image at the time of learning. In step S955 of FIG. 9B, regardless of the class (name/address/telephone number) of the handwriting area estimated by the neural network for handwriting area estimation, handwriting extraction image is inputted to the handwriting OCR for every estimated handwriting area. In step S961, the form text data 1007 can be generated in consideration of the contents estimated by handwriting area estimation in addition to the semantic relationship between handwriting OCR and printed character OCR.

Second Embodiment

The second embodiment 2 will describe a case of adopting a method different from that in the first embodiment as another method of handwriting extraction and handwriting area estimation. In this embodiment, handwriting extraction and handwriting area estimation are implemented not by neural networks but by rule-based algorithm design. The configuration of an image processing system according to the second embodiment is the same as in the first embodiment except for characteristic portions. Therefore, the same reference numerals denote similar components and a detailed description thereof will be omitted.

<Image Processing System>

A learning processing system according to the second embodiment will be described. The image processing system is formed by the image processing apparatus 101, the image processing server 103, and the OCR server 104, all of which are shown in FIG. 1.

<Use Sequence>

A use sequence in this system will be described. FIG. 11 is a sequence chart showing the use sequence in the image processing system according to the second embodiment.

Processes in S351 and S352 are the same steps as those denoted by the same reference symbols in the sequence chart shown in FIG. 3B.

A processing target image generated by reading a form document by the image obtaining unit 111 is transmitted to the image conversion unit 114 (S1101).

Processing in S354 is the same step as that denoted by the same reference symbol in the sequence chart shown in FIG. 3B.

The image conversion unit 114 performs handwriting extraction and handwriting area estimation for the processing target image based on the algorithm design (S1102).

Processes in S358 to S367 are the same steps as those denoted by the same reference symbols in the sequence chart shown in FIG. 3B.

<Processing of Converting Form into Text>

Figure 12A:
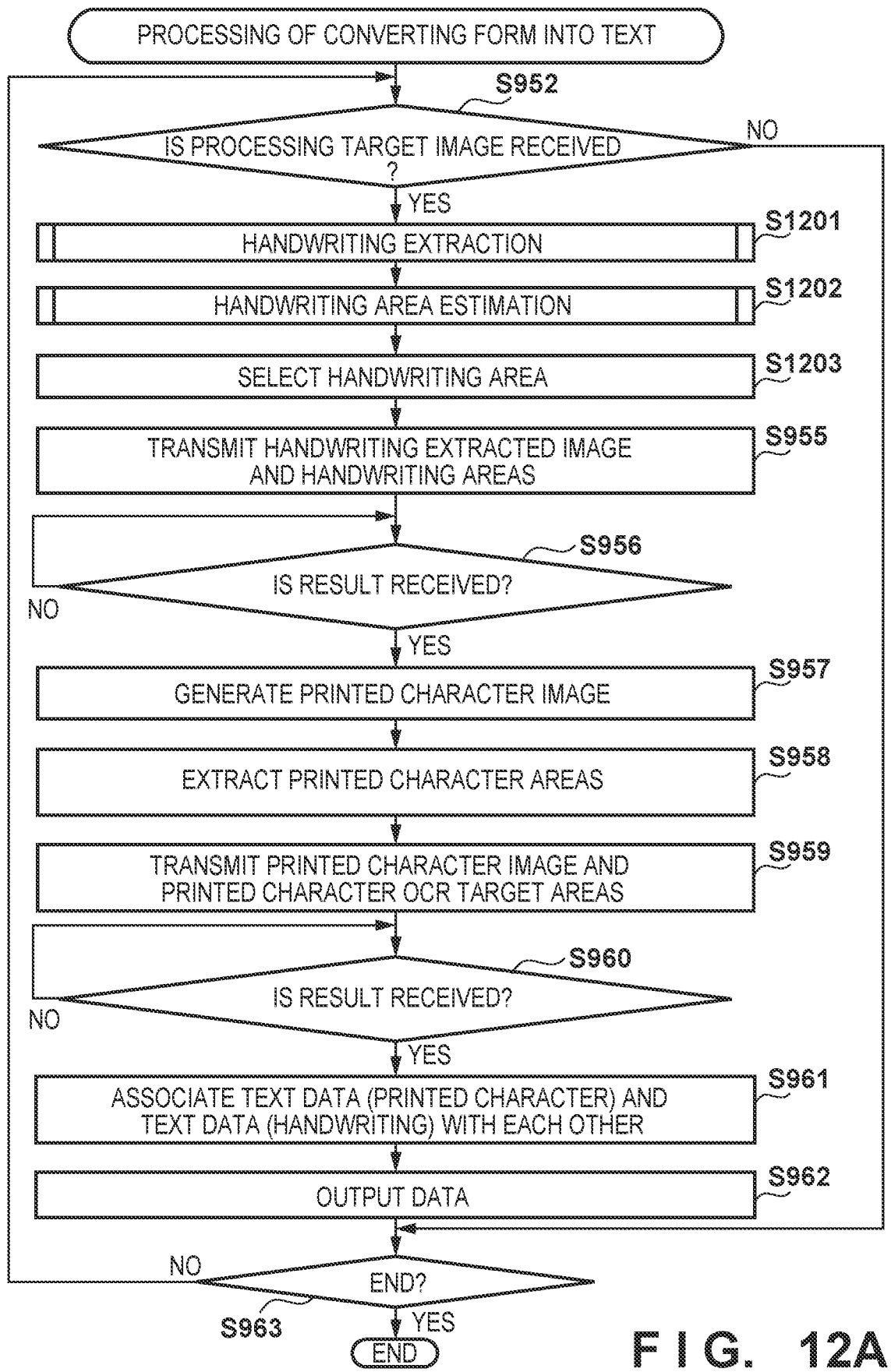
FIG. 12A is a flowchart for describing the procedure of processing of converting a form into text according to the second embodiment.

Processing of converting a form into text by the image processing server 103 according to the second embodiment will be described. FIG. 12A is a flowchart for describing the procedure of the processing of converting the form into text according to the second embodiment. This processing is implemented when the CPU 261 reads out the image processing server program recorded in the storage 265, deploys it in the RAM 264, and executes it. This starts when the user turns on the power of the image processing server 103.

Processing in step S952 is the same processing step as that denoted by the same reference symbol in the flowchart shown in FIG. 9B. In this example, if YES is determined in step S952, the process transitions to step S1201.

In step S1201, the CPU 261 executes handwriting extraction processing to extract handwriting pixels from the processing target image received from the image processing apparatus 101. This handwriting extraction processing will be described with reference to FIG. 12B.

Figure 12B:
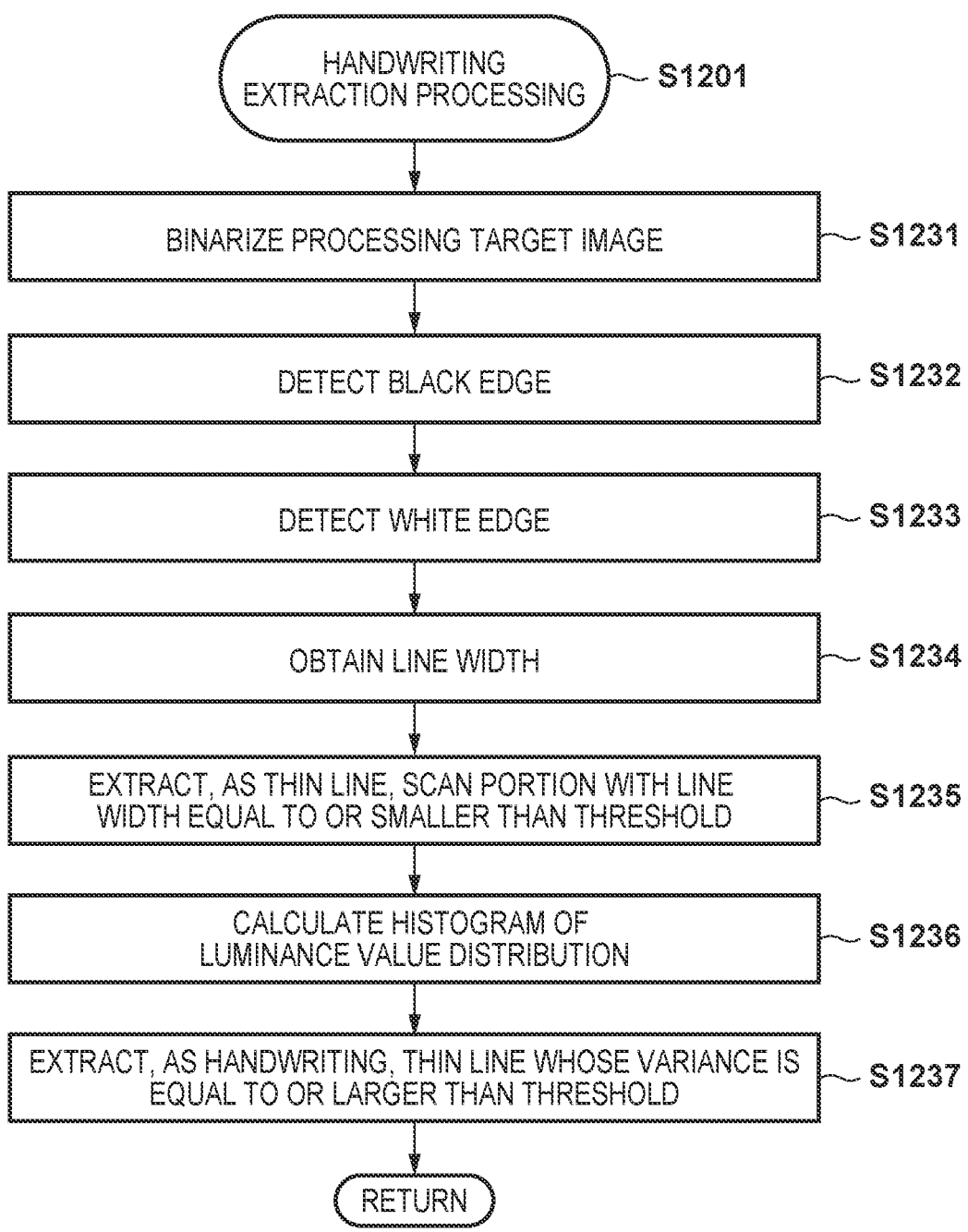
FIG. 12B is a flowchart for describing the procedure of handwriting extraction processing according to the second embodiment.

FIG. 12B is a flowchart for describing the procedure of handwriting extraction processing according to the second embodiment.

In step S1231, the CPU 261 binarizes the processing target image to obtain a binary image.

In step S1232, the CPU 261 raster-scans the binary image to detect the boundary (black edge) portion between a white pixel and a black pixel.

In step S1233, the CPU 261 scans each black edge detected in step S1232 in the horizontal and vertical directions to detect the boundary (white edge) between the black pixel and white pixel. A scan is executed until a white edge is detected in one of the horizontal and vertical directions.

In step S1234, with respect to the black edge and the white edge, the CPU 261 confirms, as a line width, a pixel count between the black edge and the white edge.

In step S1235, the CPU 261 extracts, as a thin line, a scan portion where the line width obtained in step S1234 is equal to or smaller than a threshold. This extracts a plurality of printed or handwritten thin lines.

In step S1236, the CPU 261 calculates a histogram for each thin line from a pixel group corresponding to the thin line on the processing target image.

In step S1237, the CPU 261 estimates, as a handwritten thin line, a thin line whose variance of the histogram calculated in step S1236 is equal to or larger than a threshold (a variance in luminance is large). This is generally a method using the fact that a variation in luminance tends to occur in a handwritten thin line, as compared with a printed thin line. Only pixels corresponding to the handwriting on the processing target image are extracted to generate a handwriting extracted image.

Referring back to the flowchart shown in FIG. 12A, in step S1202, the CPU 261 executes handwriting area estimation processing to estimate a handwriting area from the processing target image received from the image processing apparatus 101. The handwriting area estimation processing will be described with reference to FIG. 12C.

FIG. 12C is a flowchart for describing the procedure of handwriting area estimation processing according to the second embodiment.

In step S1261, the CPU 261 binarizes the processing target image to obtain a binary image.

In step S1262, the CPU 261 detects ruled lines (straight lines) in the horizontal and vertical directions from the binary image. This can be implemented by applying a known technique, for example, by evaluating and detecting the width and height of the connection portion of the black pixels included in the binary image.

In step S1263, the CPU 261 decides, as a handwriting area, each area surrounded by the detected ruled lines.

Referring back to the flowchart shown in FIG. 12A, in step S1203, the CPU 261 evaluates the handwriting extracted image obtained in step S1201 and each handwriting area obtained in step S1202. That is, the CPU 261 evaluates, for each handwriting area obtained in step S1202, the number of black pixels (colored pixels) included in a corresponding area on the handwriting extracted image, and excludes the area where the number of black pixels is equal to or smaller than a threshold. The handwriting areas obtained in step S1202 are areas each surrounded by the ruled lines, and may include an area including printed characters. Thus, this processing step excludes the area including printed characters from the handwriting areas by performing evaluation using the handwriting extracted image including only handwriting pixels.

Processes in steps S955 to S963 are the same processing steps as those denoted by the same reference symbols in the flowchart shown in FIG. 9B.

As described in the second embodiment, handwriting extraction and handwriting area estimation can be implemented not by the neural networks but by the rule-based algorithm design. In general, since the method using the neural networks tends to be large in processing calculation amount, a relatively expensive processing processor (CPU or GPU) is used. When such calculation resource cannot be prepared due to the cost or the like, the method described in the second embodiment is effective.

Third Embodiment

The third embodiment will describe a method of correcting a handwriting area with reference to a handwriting extracted image in addition to the method of the processing of converting the form into text, which has been described in the first embodiment. As shown in FIG. 14, handwriting may cross a ruled line in a form as shown by a reference numeral 1400. To cope with this, in the first embodiment, the neural network is made to learn learning data including ground truth data in which an area (input field) surrounded by ruled lines where handwritten characters are entered is set as a handwriting area, and a handwriting area is estimated using the neural network. Therefore, a portion of the handwriting, which crosses the ruled line, may not be included in a handwriting area or may be mixed in another handwriting area. In addition, since handwritten characters are not always entered over the input field, the handwriting area estimated for the handwriting (handwriting pixels) may be uselessly large (may have a wide margin). To cope with this, the third embodiment will describe a method of correcting the handwriting area. Note that the configuration of an image processing system according to the third embodiment is the same as that according to the first embodiment except for characteristic portions. Therefore, the same reference numerals denote similar components and a detailed description thereof will be omitted.

<Processing of Converting Form into Text>

Figure 13A:
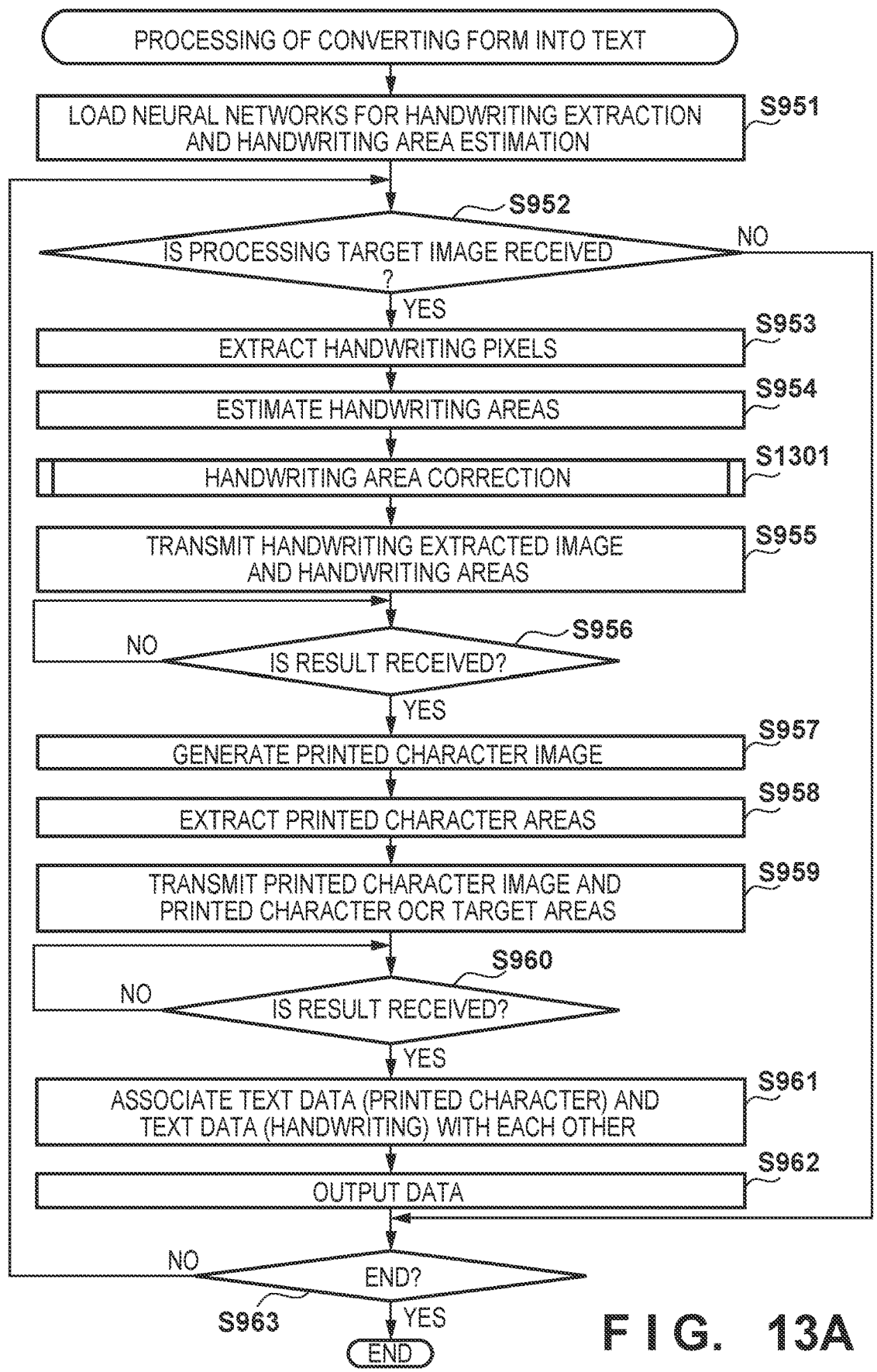
FIG. 13A is a flowchart for describing the procedure of processing of converting a form into text according to the third embodiment.

Processing of converting a form into text by the image processing server 103 according to the third embodiment will be described. FIG. 13A is a flowchart for describing the procedure of the processing of converting the form into text according to the third embodiment. This processing is implemented when the CPU 261 reads out the image processing server program recorded in the storage 265, deploys it in the RAM 264, and executes it. This starts when the user turns on the power of the image processing server 103.

Processes in steps S951 to S954 are the same processing steps as those denoted by the same reference symbols in the flowchart shown in FIG. 9B.

Figure 13B:
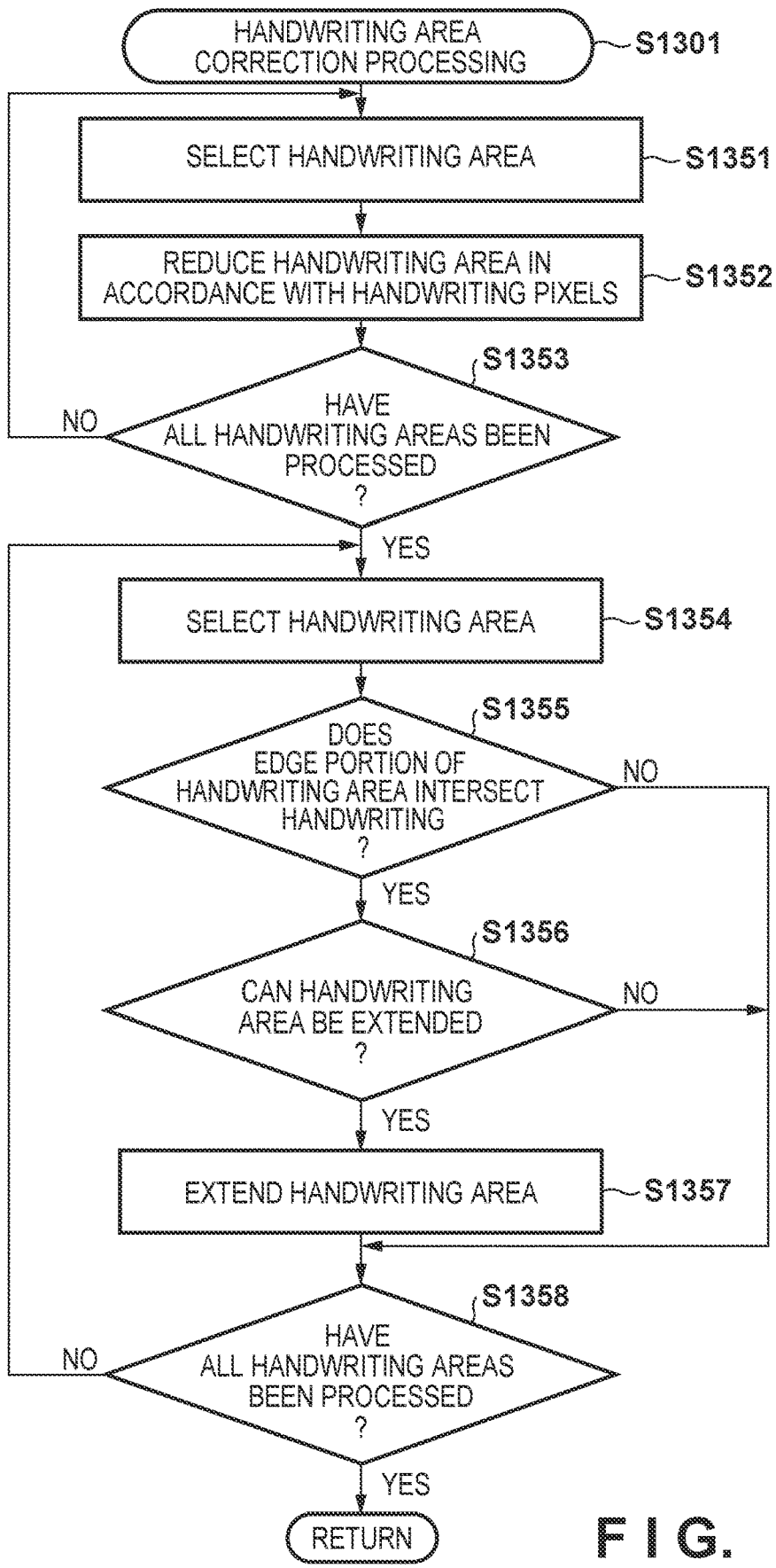
FIG. 13B is a flowchart for describing the procedure of handwriting area correction processing according to the third embodiment.

In step S1301, the CPU 261 executes handwriting area correction processing to correct handwriting areas estimated in step S954 with reference to a handwriting extracted image generated in step S953. This handwriting area correction processing will be described with reference to FIG. 13B. FIG. 13B is a flowchart for describing the procedure of the handwriting area correction processing according to the third embodiment.

In step S1351, the CPU 261 selects one of the handwriting areas estimated in step S954.

In step S1352, the CPU 261 reduces the handwriting area selected in step S1351 in accordance with handwriting pixels. That is, the CPU 261 refers to a pixel group corresponding to the handwriting area on the handwriting extracted image. The CPU 261 calculates a circumscribed rectangle including all the handwriting pixels included in the pixel group. Then, the CPU 261 updates the handwriting area by the area of the circumscribed rectangle (the CPU 261 may update the handwriting area by a rectangle slightly larger than the circumscribed rectangle). This can remove, from the handwriting area, an excess margin with respect to handwriting included in the handwriting area.

In step S1353, the CPU 261 determines whether all the handwriting areas have been processed. If the processing in step S1353 has been performed for all the handwriting areas estimated in step S954, the CPU 261 determines YES and the process transitions to step S1354; otherwise, NO is determined, the process transitions to step S1351, and the next handwriting area is selected and processed.

In step S1354, the CPU 261 selects one of the handwriting areas estimated in step S954 again.

In step S1355, the CPU 261 determines whether the edge portion of the handwriting area intersects handwriting. That is, the CPU 261 determines whether handwriting pixels exist in the edge portion of the handwriting area and other handwriting pixels connecting to those handwriting pixels exist outside the handwriting area. If these pixels exist, YES is determined and the process transitions to step S1356; otherwise, NO is determined and the process transitions to step S1358.

In step S1356, the CPU 261 determines whether the handwriting area can be extended. That is, the CPU 261 determines whether the handwriting area does not intersect another handwriting area when extending the handwriting area to include handwriting (a handwriting extraction pixel group) intersecting the edge portion of the handwriting area detected in step S1355. If the handwriting area does not intersect another handwriting area, YES is determined and the process transitions to step S1357; otherwise, NO is determined and the process transitions to step S1358.

In step S1357, the CPU 261 extends the handwriting area so as to include the handwriting intersecting the edge portion of the handwriting area detected in step S1355.

In step S1358, the CPU 261 determines whether all the handwriting areas have been processed. If the processing in step S1355, S1356, or S1357 has been performed for all the handwriting areas estimated in step S954, the CPU 261 determines YES and the processing ends; otherwise, the CPU 261 determines NO, the process transitions to step S1354, and the next handwriting area is selected and processed.

As described in the third embodiment, it is possible to correct each estimated handwriting area in accordance with the extracted handwriting pixels. This can remove the unnecessary margin, thereby reducing the load of processing and data transmission for handwriting OCR. Furthermore, even if handwriting exceeds an input frame, it is possible to reduce a situation in which the exceeding portion is excluded from the target of handwriting OCR or is mixed in another input item, thereby improving the handwriting OCR recognition rate.

Note that the handwriting extracted image obtained in step S953 in the first and the third embodiments is the same as that obtained in step S1201 in the second embodiment. Furthermore, the handwriting areas obtained in step S954 in the first and third embodiments are the same as those obtained in step S1202 in the second embodiment. Therefore, the third embodiment has been described as the difference from the first embodiment. However, the method of correcting the handwriting areas with reference to the handwriting extracted image, which has been described in the third embodiment, can also be applied to the method according to the second embodiment.

Fourth Embodiment

The fourth embodiment will describe a case of adopting a method different from that in the first embodiment as another method of handwriting area estimation. In the fourth embodiment, ground truth data to be used for learning of the neural network for performing handwriting area estimation is created under a condition different from that in the first embodiment, thereby making it possible to perform more advanced estimation. The configuration of an image processing system according to the fourth embodiment is the same as in the first embodiment except for characteristic portions. Therefore, the same reference numerals denote similar components and a detailed description thereof will be omitted.

<Operation Screen>

Creation of learning data of handwriting area estimation according to the fourth embodiment will be described. FIG. 14 depicts a view showing an example of display of the image display area 521 on the handwriting area estimation ground truth data creation screen shown in FIG. 5C in the first embodiment. In the fourth embodiment, the user issues a handwriting area estimation ground truth data creation instruction by operating the input device 236 with reference to the screen shown in FIG. 5C, similar to the first embodiment. In the first embodiment, the user issues an operation instruction to select an area (input field) surrounded by ruled lines where handwritten characters are entered in the document sample image displayed in the image display area 521. In the fourth embodiment, the user issues an operation instruction, as follows, thereby creating handwriting area estimation ground truth data.

The user issues an operation instruction so that ground truth data includes entered handwriting within an input field (the area of the ground truth data includes no ruled lines), and has a minimum margin (example: portions of "ヤマダ", "山田" and "太郎" in FIG. 14). Even in the same input field, different ground truth data are created for semantically different input contents (example: portions of "03-999-999" and "090-8888-8888" in FIG. 14).

Only if handwriting crosses a ruled line, ground truth data is created by allowing the ground truth data to exceed the input field (by allowing the area of the ground truth data to include the ruled line) (example: "タロウ" shown by the reference numeral 1400 in FIG. 14).

Among the ruled lines, digit lines are allowed to be included in the area of the ground truth data, and ground truth data is created so that the handwritten numerical values divided by digit lines are included in the same ground truth data (example: "001" and "8051"). The digit lines are ruled lines as nonlinear solid lines such as vertical dotted lines for dividing numerical values.

After issuing an operation instruction to create handwriting area estimation ground truth data under this condition, the save button 527 is instructed, thereby generating a handwriting area estimation ground truth image. The learning apparatus 102 can learn the neural network for performing handwriting area estimation using the handwriting area estimation ground truth image as part of learning data.

As described in the fourth embodiment, an image conversion system according to the fourth embodiment can create handwriting area estimation ground truth data under various conditions. Handwriting area estimation ground truth data can be created to include entered handwriting within an input field (the area of the ground truth data includes no ruled line) and have a minimum margin. This causes the neural network to estimate a handwriting area that falls within an input field and includes no excess margin. Only if handwriting crosses a ruled line, ground truth data can be created by allowing the ground truth data to exceed an input field. This causes the neural network to estimate a handwriting area so as to include a portion exceeding the input field among pixels of the handwriting. It is also possible to create ground truth data so that the handwritten numerical values divided by digit lines are included in the same ground truth data. This causes the neural network to perform estimation so that a plurality of entered numerical values divided by digit lines are included as one item in one handwriting area.

Fifth Embodiment

The fifth embodiment will describe a case of adopting a method different from those in the first, third and fourth embodiments as a method of creating learning data of handwriting extraction and handwriting area estimation. In the fifth embodiment, learning data is created by image composition. This processing can efficiently create learning data. The configuration of an image processing system according to the fifth embodiment is the same as in the first, third or fourth embodiment except for characteristic portions. Therefore, the same reference numerals denote similar components and a detailed description thereof will be omitted.

<Image Processing System>

A learning processing system according to this example will be described. The configuration of the image processing system is the same as that shown in FIG. 1 in the first embodiment.

The image processing apparatus 101 uses a scan function to scan a document in which only handwriting is made on a white sheet, thereby generating image data (to be referred to as a "foreground sample image" hereinafter). A plurality of documents are scanned to obtain a plurality of foreground sample images. On the other hand, the image processing apparatus 101 prints an electronic document (form) to output a print document. Furthermore, the image processing apparatus 101 scans the print document (no handwriting) to generate image data (to be referred to as a "background sample image" hereinafter). A plurality of print documents are scanned to obtain a plurality of background sample images. The image processing apparatus 101 transmits the foreground sample images and the background sample images to the learning apparatus 102 via the network 105.

The learning apparatus 102 functions as the image accumulation unit 115 that accumulates the foreground sample images and the background sample images generated by the image processing apparatus 101. The learning apparatus 102 also functions as the learning data generation unit 112 that generates learning data from the thus accumulated images. The learning data generation unit 112 generates learning data to be used to learn the neural network for performing handwriting extraction and that for performing handwriting area estimation. The learning apparatus 102 functions as the learning unit 113 that performs learning of the neural networks using the generated learning data. Learning of the learning unit 113 generates learning results (parameters of neural networks and the like). The learning apparatus 102 transmits the learning results (learning models) to the image processing server 103 via the network 105.

<Learning Sequence>

Figure 15A:
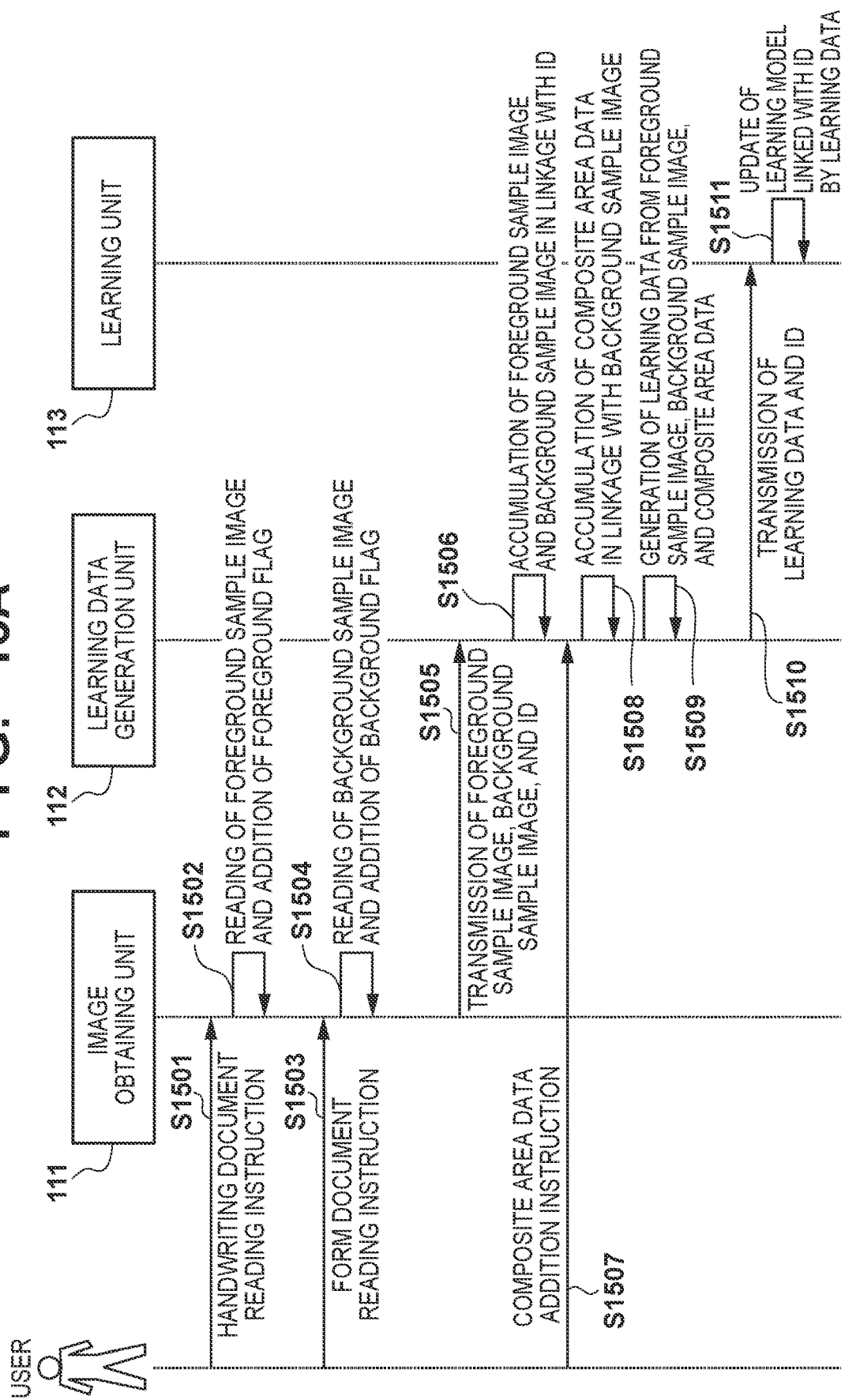
FIG. 15A is a sequence chart showing the learning sequence in the image processing system according to the fifth embodiment.

A learning sequence in this system will be described. FIG. 15A is a sequence chart showing the learning sequence in the image processing system according to the fifth embodiment.

If the user issues, in S1501, an instruction to read a document including only handwriting, the image obtaining unit 111 reads this document to generate a foreground sample image (S1502). Then, the image is added with a foreground flag. If the user issues, in S1503, an instruction to read a print document of a form, the image obtaining unit 111 reads the document to generate a background sample image (S1504). Then, the image is added with a background flag.

The foreground sample image and background sample image read as described above are transmitted to the learning data generation unit 112 (S1505). Note that at this point, each of the foreground sample image and the background sample image is added with ID information. This ID information is, for example, information for identifying the image processing apparatus 101 functioning as the image obtaining unit 111. Note that as the ID information, user identification information for identifying the user who operates the image processing apparatus 101 or group identification information for identifying a group to which the user belongs may be used.

If the images are transmitted, the learning data generation unit 112 accumulates the images in the image accumulation unit 115 (S1506).

If the user issues a composite area data addition instruction to the learning apparatus 102 (S1507), the learning data generation unit 112 obtains the composite area data, and accumulates it in the image accumulation unit 115 (S1508). As will be described later, the learning data generation unit 112 composites the foreground sample image and the background sample image to generate learning data. The above-described composite area data indicates an area where a handwriting sample is composited on the background sample image in the composition processing. To generate learning data, composite area data is created in advance. A method of adding the composite area data will be described later.

The learning data generation unit 112 generates learning data based on the thus accumulated data (S1509). At this time, the learning data generation unit 112 may generate learning data using only images based on specific ID information. After that, the learning data generation unit 112 transmits the learning data to the learning unit 113 (S1510). If the learning data is generated using only the images based on the specific ID information, the learning data generation unit 112 transmits the ID information together with the learning data. The learning unit 113 updates a learning model based on the received learning data (S1511). The learning unit 113 may hold a learning model for each piece of ID information, and perform learning using only corresponding learning data. By linking the ID information and the learning model with each other, it is possible to create a learning model specialized in a specific use environment.

<Operation Screen>

The user instructions indicated in steps S1501 and S1503 are issued in the following operation screen. FIG. 16A depicts a view showing a learning document scan screen according to the fifth embodiment.

A learning document scan screen 1600 is an example of a screen displayed on the display device 210. As shown in FIG. 16A, the learning document scan screen 1600 includes a preview area 1601, image attribute designation buttons 1602 and 1603, a scan button 1604, and a transmission start button 1605.

The scan button 1604 is a button for starting to read a document set in the scanner device 206. Upon completion of the scan, a preview of the read image is displayed in the preview area 1601. By setting another document in the scanner device 206 and pressing the scan button 1604 again, a plurality of image data can be held together.

The image attribute designation buttons 1602 and 1603 are buttons each for designating the attribute of the read image. If the image attribute designation button (handwriting document) 1602 is selected, the read image is added with a foreground flag. If the image attribute designation button (form document) 1603 is selected, the read image is added with a background flag. The currently selected button is highlighted to be identifiable.

If the image is read and the image type is selected, the transmission start button 1605 can be selected.

If the transmission start button 1605 is selected, the read image added with the selected image attribute is transmitted to the learning apparatus 102.

The user instruction indicated in step S1507 is issued in the following operation screen. FIGS. 16B, 16C, 16D, 16E, and 16F depict views each showing a composite area data creation screen.

A composite area data creation screen 1650 is an example of a screen displayed on the display device 267. As shown in FIG. 16B, the composite area data creation screen 1650 includes an image display area 1651, an image selection button 1652, an enlargement button 1653, a reduction button 1654, an integration button 1655, and a save button 1656.

The image selection button 1652 is a button for selecting the background sample image received from the image processing apparatus 101 and accumulated in the image accumulation unit 115. If the image selection button 1652 is instructed, a selection screen (not shown) is displayed and the user can select the background sample image. If the background sample image is selected, this image is displayed in the image display area 1651. The user operates the background sample image displayed in the image display area 1651 to create composite area data.

The enlargement button 1653 and the reduction button 1654 are buttons for enlarging and reducing the display of the image display area 1651, respectively. When the enlargement button 1653 or the reduction button 1654 is instructed, the background sample image displayed in the image display area 1651 can be enlarged or reduced and displayed so as to readily create composite area data.

The user creates composite area data by performing the following operation. As indicated by dotted line frames in FIG. 16B, the user operates the mouse cursor via the input device 236 to select an area (input field) surrounded by ruled lines in the background sample image displayed in the image display area 1651. This selected area is a composite area (composite area data). That is, the user instructs to composite part of the foreground sample image in the composite area on the background sample image when generating learning data by the learning data generation unit 112, as will be described later. Note that, as shown in FIG. 16C, even in one input field, if a plurality of items are included, a plurality of pieces of composite area data may be created in the input field.

The integration button 1655 is a button for grouping the plurality of created composite areas. As indicated by dotted lines in FIG. 16D, for example, composite area data is created for each of a plurality of input fields (numerical value input fields) divided by digit lines. Then, if this composite area data is selected by operating the mouse cursor via the input device 236 and the integration button 1655 is instructed in this state, the plurality of pieces of selected composite area data are recorded as a group. As will be described later, when generating handwriting area estimation ground truth data, the grouped composite areas are integrated and processed as one ground truth data.

As described above, the user can create a plurality of composite areas for each background sample image in accordance with the existence of input fields. Note that as shown in FIGS. 16E and 16F, there can be some forms in which input fields are not surrounded by ruled lines. In this case, as indicated by dotted lines in FIGS. 16E and 16F, areas where an entry person may enter characters are selected.

The save button 1656 is a button for saving the created composite area data. The composite area data is recorded as one data in the XML format for the background sample image as a creation target (the composite area data saved in the XML format will be referred to as "composite area definition information" hereinafter). FIG. 17 shows an example of the composite area definition information. Details of the composite area definition information will be described later. The composite area definition information is accumulated in the image accumulation unit 115 in linkage with the corresponding background sample image.

<Sample Image Generation Processing>

Figure 18A:
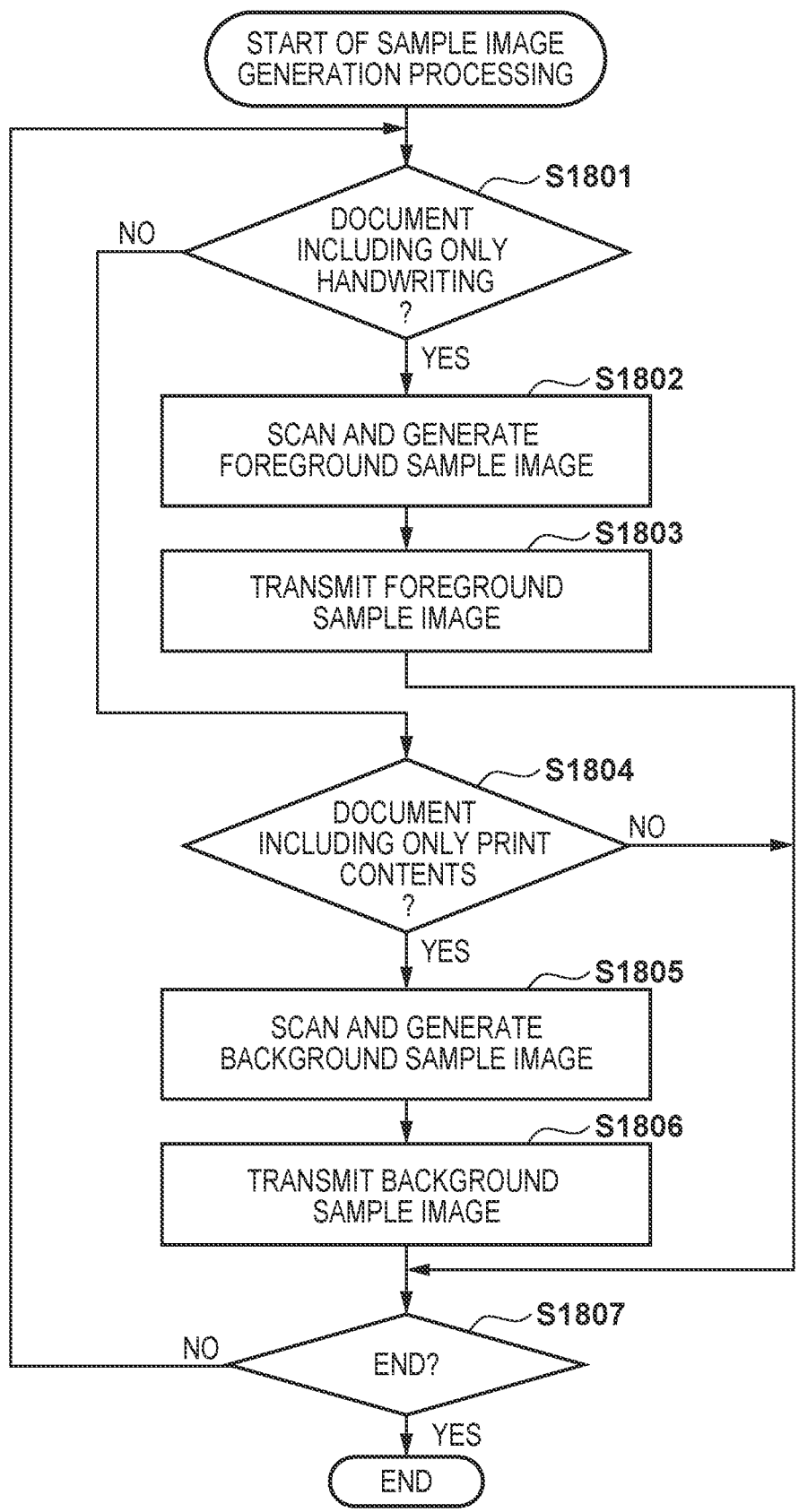
FIG. 18A is a flowchart for describing the procedure of sample image generation processing.

Sample image generation processing by the image processing apparatus 101 will be described next. FIG. 18A is a flowchart for describing the procedure of the sample image generation processing. This processing is implemented when the CPU 201 reads out the controller program recorded in the storage 208, deploys it in the RAM 204, and executes it. This starts when the user operates the input device 209 of the image processing apparatus 101.

In step S1801, the CPU 201 determines whether an instruction to scan a document including only handwriting is issued. If the user performs, via the input device 209, a predetermined operation (instruction to the scan button 1604 and selection of the image attribute designation button 1602) of scanning a document including only handwriting, YES is determined and the process transitions to step S1802; otherwise, NO is determined and the process transitions to step S1804.

In step S1802, the CPU 201 controls the scanner device 206 and the document conveyance device 207 to scan the document, thereby generating a foreground sample image. This document is obtained when a person handwrites a sentence or figure (a line segment, an arrow, or the like) on a white sheet, and includes only handwriting. Especially, the document is obtained by entering a sentence or figure in a form. The foreground sample image is generated as grayscale image data.

In step S1803, the CPU 201 transmits the foreground sample image generated in step S1802 to the learning apparatus 102 via the external interface 211. At this time, the CPU 201 transmits the image data by adding information (foreground flag) indicating a foreground sample image.

In step S1804, the CPU 201 determines whether an instruction to scan a document including only print contents is issued. If the user performs, via the input device 209, a predetermined operation (instruction to the scan button 1604 and selection of the image attribute designation button (form document) 1603) of scanning a document including only print contents, YES is determined and the process transitions to step S1805; otherwise, NO is determined and the process transitions to step S1807.

In step S1805, the CPU 201 controls the scanner device 206 and the document conveyance device 207 to scan the document, thereby generating a background sample image. This document is obtained by printing a form or the like on a sheet, and includes only print contents. The background sample image is generated as grayscale image data.

In step S1806, the CPU 201 transmits the background sample image generated in step S1805 to the learning apparatus 102 via the external interface 211. At this time, the CPU 201 transmits the image data by adding information (background flag) indicating a background sample image.

In step S1807, the CPU 201 determines whether the processing ends. If the user performs a predetermined operation of ending the sample image generation processing, YES is determined and the processing ends; otherwise, NO is determined and the process returns to step S1801.

With the above processing, the image processing apparatus 101 generates a foreground sample image and a background sample image and transmits them to the learning apparatus 102. A plurality of foreground sample images and a plurality of background sample images are obtained in accordance with a user operation and the number of documents placed in the document conveyance device 207.

<Sample Image Reception Processing>

Figure 18B:
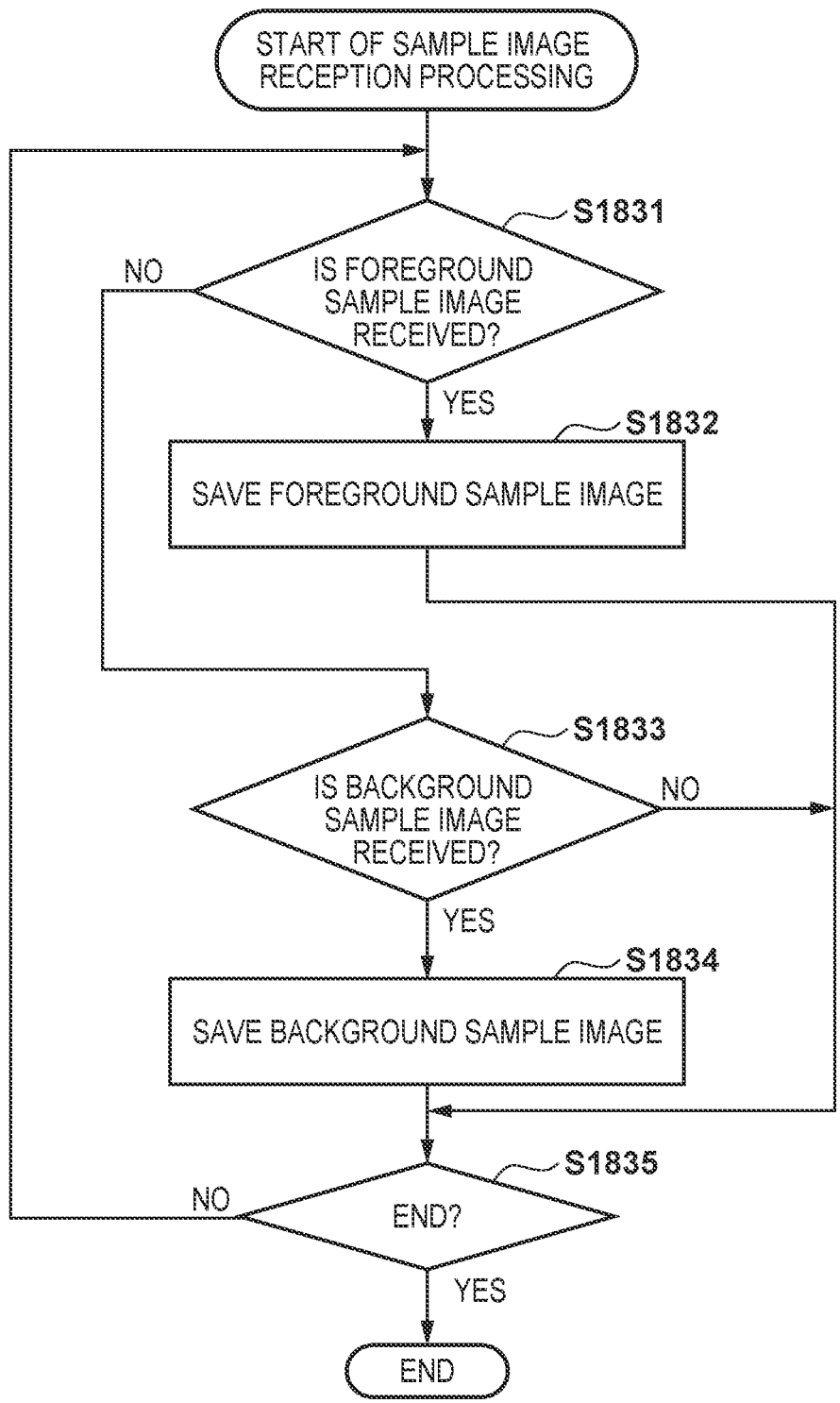
FIG. 18B is a flowchart for describing the procedure of sample image reception processing.

Sample image reception processing by the learning apparatus 102 will be described next. FIG. 18B is a flowchart for describing the procedure of the sample image reception processing. This processing is implemented when the CPU 231 reads out the learning data generation program recorded in the storage 235, deploys it in the RAM 234, and executes it. This starts when the user turns on the power of the learning apparatus 102.

In step S1831, the CPU 231 determines whether a foreground sample image is received. If image data is received via the external interface 238 and is added with the foreground flag, the CPU 231 determines YES and the process transitions to step S1832; otherwise, the CPU 231 determines NO and the process transitions to step S1833.

In step S1832, the CPU 231 records the received foreground sample image in a predetermined area of the storage 235, then the process advances to step S1835.

In step S1833, the CPU 231 determines whether a background sample image is received. If image data is received via the external interface 238 and is added with the background flag, the CPU 231 determines YES and the process transitions to step S1834; otherwise, the CPU 231 determines NO and the process transitions to step S1835.

In step S1834, the CPU 231 records the received background sample image in a predetermined area of the storage 235, then the process advances to step S1835.

In step S1835, the CPU 231 determines whether the processing ends. If the user performs a predetermined operation of ending the sample image reception processing, for example, the user turns off the power of the learning apparatus 102, YES is determined and the processing ends; otherwise, NO is determined and the process returns to step S1831.

<Composite Area Definition Information Generation Processing>

Figure 18C:
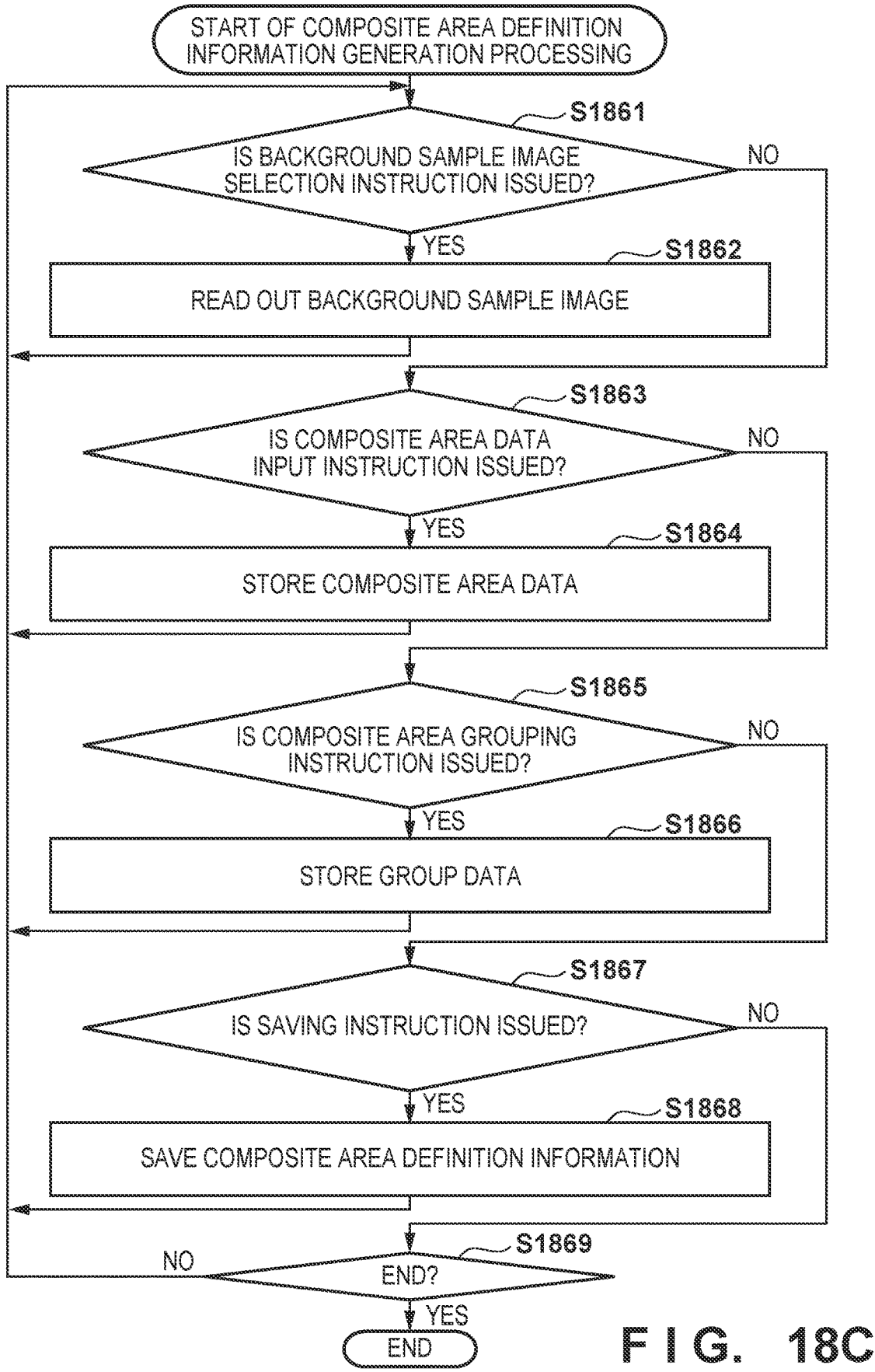
FIG. 18C is a flowchart for describing the procedure of composite area definition information generation processing.

Composite area definition information generation processing by the learning apparatus 102 will be described next. FIG. 18C is a flowchart for describing the composite area definition information generation processing. This processing is implemented by the learning data generation unit 112 of the learning apparatus 102. This starts when the user performs a predetermined operation via the input device 236 of the learning apparatus 102.

In step S1861, the CPU 231 determines whether a background sample image selection instruction is issued. If the user performs, via the input device 236, a predetermined operation (instruction to the image selection button 1652) of selecting a background sample image, YES is determined and the process transitions to step S1862; otherwise, NO is determined and the process transitions to step S1863.

In step S1862, the CPU 231 reads out, from the storage 235, the background sample image selected by the user in step S1861, and outputs it to the user (displays it in the image display area 1651), then the process advances to step S1861.

In step S1863, the CPU 231 determines whether the user issues a composite area data input instruction. If the user performs, via the input device 236, an operation of selecting an area within an input field, as described above, YES is determined and the process transitions to step S1864; otherwise; NO is determined and the process transitions to step S1865.

In step S1864, the CPU 231 temporarily stores, in the RAM 234, the composite area data input by the user, then the process advances to step S1861.

In step S1865, the CPU 231 determines whether the user issues a composite area grouping input instruction. If the user performs a predetermined operation (selection of input composite areas and selection of the integration button 1655) via the input device 236, YES is determined and the process transitions to step S1866; otherwise, NO is determined and the process transitions to step S1867.

In step S1866, the CPU 231 temporarily stores composite area grouping information (information for linking the plurality of selected composite areas with each other) in the RAM 234, then the process advances to step S1861.

In step S1867, the CPU 231 determines whether a composite area data saving instruction is issued. If the user performs, via the input device 236, a predetermined operation (instruction to the save button 1656) of saving the composite area data, YES is determined and the process transitions to step S1868; otherwise, NO is determined and the process transitions to step S1869.

In step S1868, the CPU 231 generates composite area definition information and saves it, then the process advances to step S1861. The CPU 231 generates composite area definition information, as follows. The CPU 231 generates XML data indicating composite area definition information. Then, with reference to the composite area data temporarily stored in the RAM 234 in step S1864, the CPU 231 inserts <area> tags, the number of which corresponds to the number of composite area data. Each <area> tag is added with an x attribute and a y attribute to record x and y coordinate values indicating the pixel position of the corresponding composite area on the background sample image. In addition, a width attribute and a height attribute are added to record the pixel counts of the width and height of the corresponding composite area. Furthermore, with reference to the composite area grouping information temporarily stored in the RAM 234 in step S1866, a group attribute is added to the <area> tag of the corresponding composite area. For each of the composite areas belonging to the same group, the same value (group ID) is recorded in the value of the group attribute. In this way, the composite area definition information exemplified in FIG. 17 is generated. The CPU 231 stores the background sample image, which has been selected in step S1861 and is the current processing target, and the generated composite area definition information in the storage 235 in linkage with each other.

In step S1869, the CPU 231 determines whether the processing ends. If the user performs a predetermined operation of ending the composite area definition information generation processing, YES is determined and the processing ends; otherwise, NO is determined and the process transitions to step S1861.

<Learning Data Generation Processing>

Figure 19A:
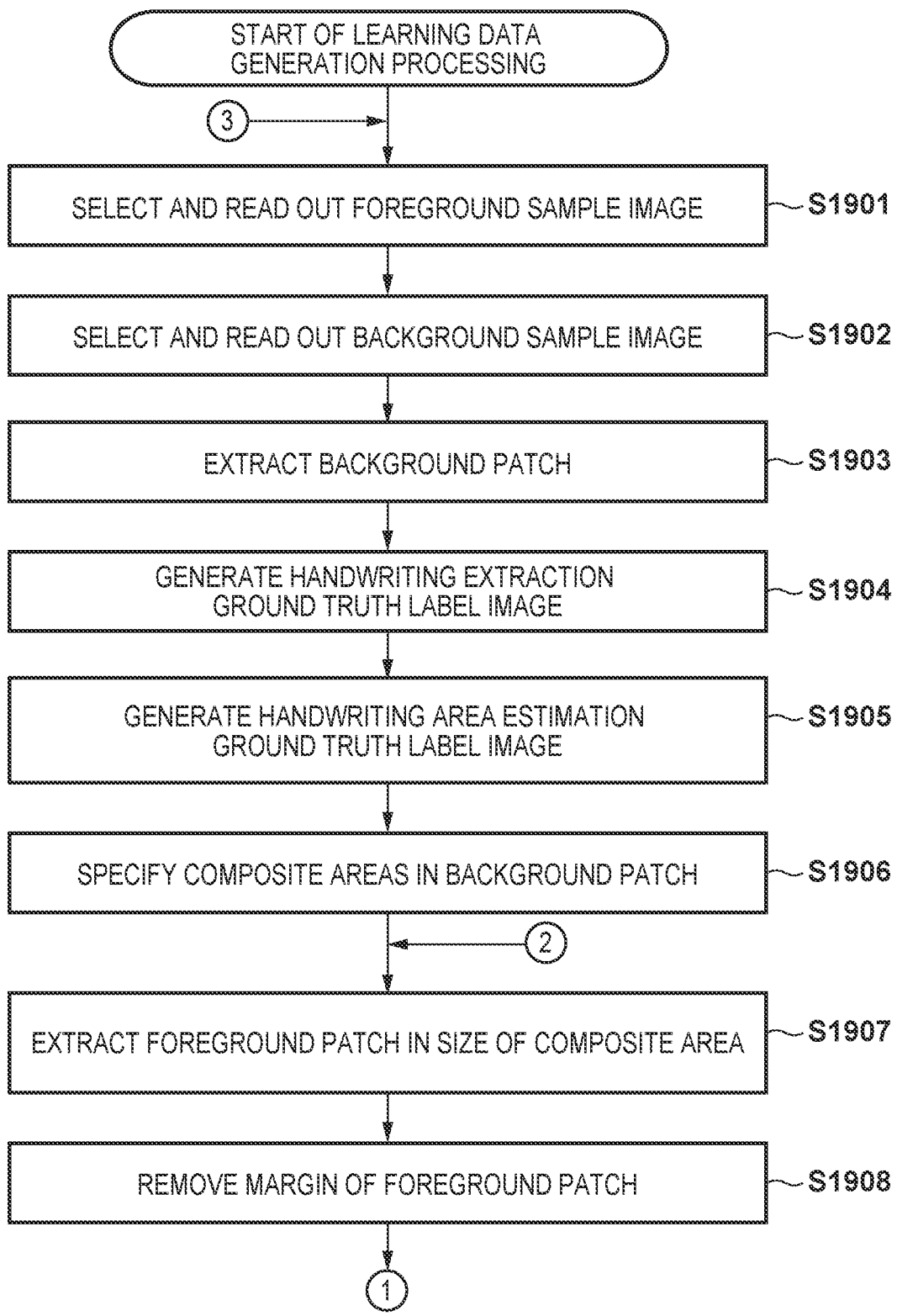
FIGS. 19A and 19B are flowcharts for describing the procedure of learning data generation processing according to the fifth embodiment.
Figure 19B:
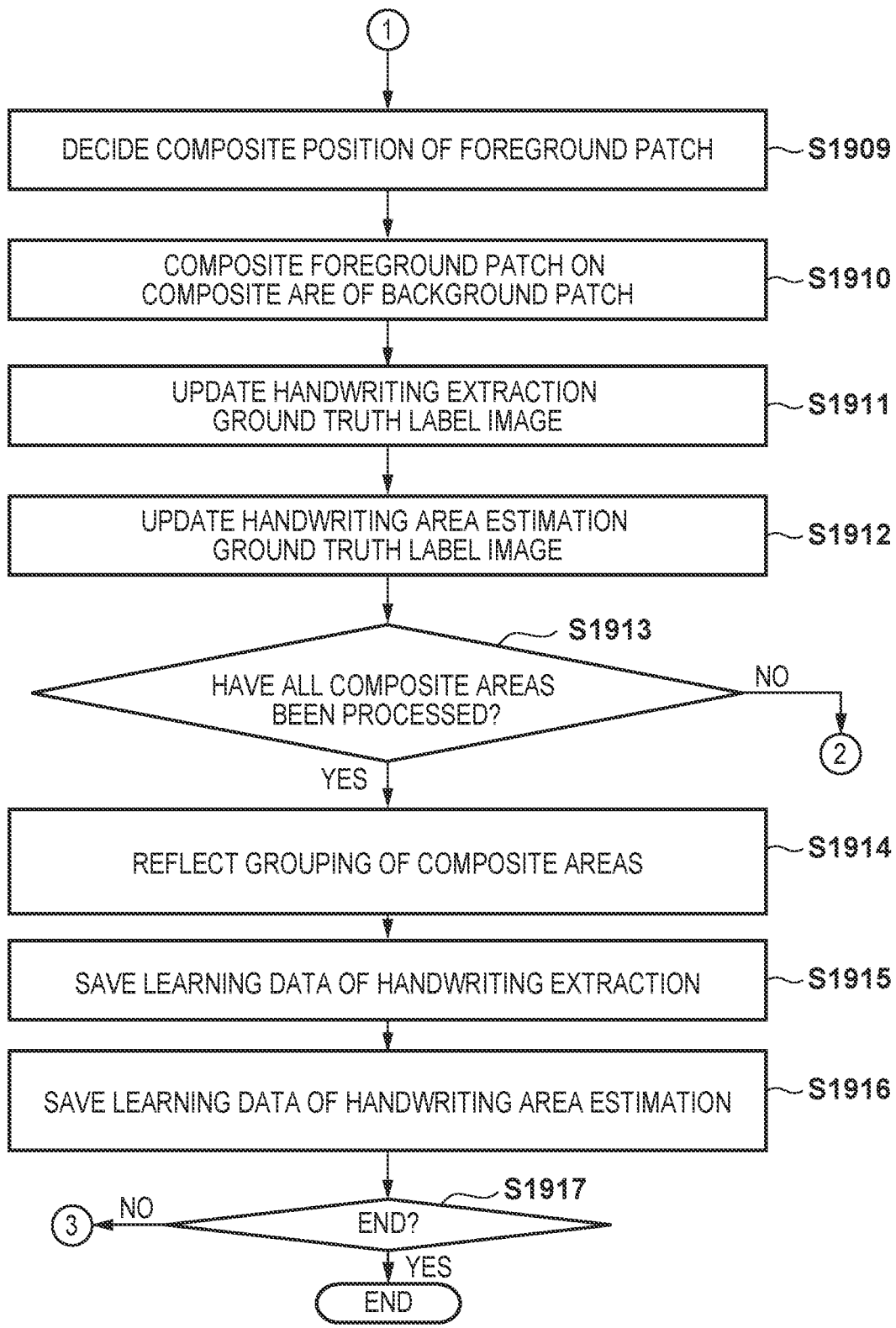
Figure 20A:
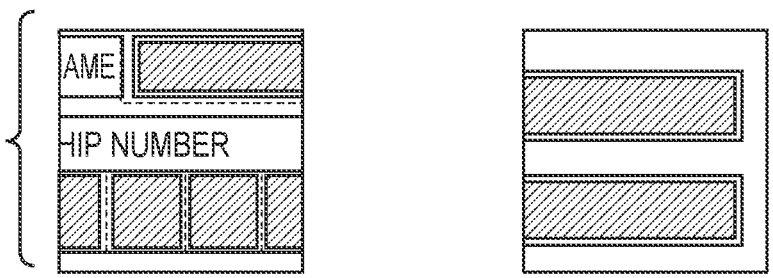
FIG. 20A depicts a view showing examples of a composite area on a background patch.
Figure 20B:
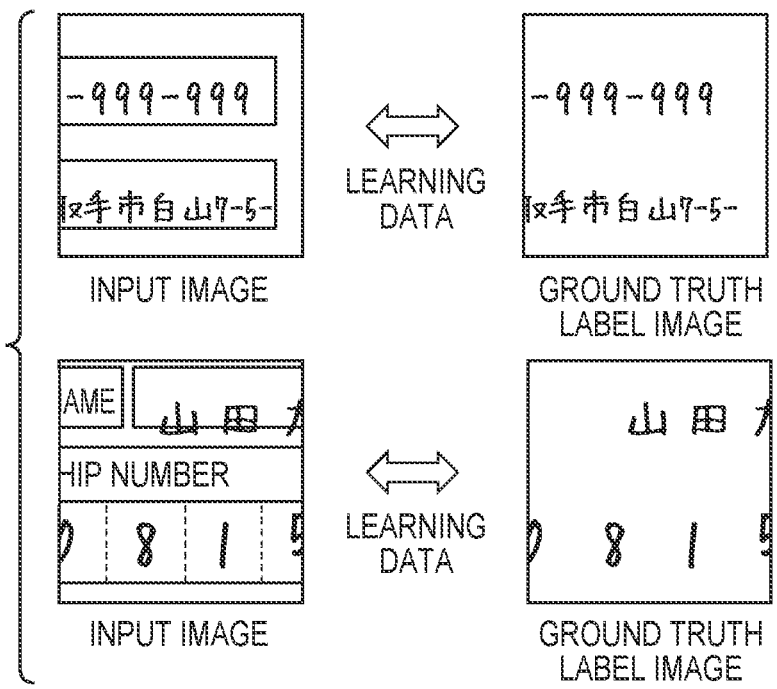
FIG. 20B depicts a view showing examples of learning data of handwriting extraction.
Figure 20C:
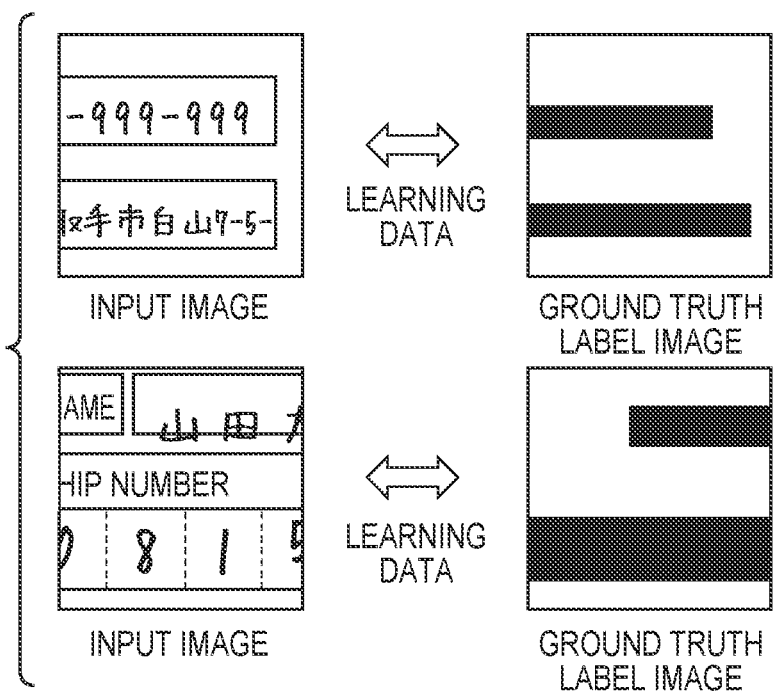
FIG. 20C depicts a view showing examples of learning data of handwriting area estimation.

Learning data generation processing by the learning apparatus 102 according to the fifth embodiment will be described next. FIGS. 19A and 19B are flowcharts for describing the learning data generation processing according to the fifth embodiment. FIG. 20A depicts a view showing examples of composite areas on a background patch. FIG. 20B depicts a view showing an example of the structure of the learning data of handwriting extraction. FIG. 20C depicts a view showing an example of the structure of the learning data of handwriting area estimation. The learning data generation processing is implemented by the learning data generation unit 112 of the learning apparatus 102. This starts when the user performs a predetermined operation via the input device 236 of the learning apparatus 102.

In step S1901, the CPU 231 selects the foreground sample image stored in the storage 235 and reads it out. Since the plurality of foreground sample images are stored in the storage 235 in the processing step in step S1832 of FIG. 18B, the CPU 231 randomly selects one of the foreground sample images.

In step S1902, the CPU 231 selects the background sample image stored in the storage 235 and reads it out. Since the plurality of background sample images are stored in the storage 235 in the processing step in step S1834 of FIG. 18B, the CPU 231 randomly selects one of the background sample images.

In step S1903, the CPU 231 generates image data (to be referred to as a "background patch" hereinafter) by extracting part (for example, vertical size×horizontal size=256×256) of the background sample image. An extraction position is randomly decided. FIG. 20A shows an example of the background patch.

In step S1904, the CPU 231 generates a handwriting extraction ground truth label image. That is, the CPU 231 generates an image of the same size as that of the background patch, and sets the values of all the pixels of the image to a value indicating not handwriting, thereby obtaining the image as a handwriting extraction ground truth label image.

In step S1905, the CPU 231 generates a handwriting area estimation ground truth label image. That is, the CPU 231 generates an image of the same size as that of the background patch, and sets the values of all the pixels of the image to a value indicating not a handwriting area, thereby obtaining the image as a handwriting area estimation ground truth label image.

In step S1906, the CPU 231 specifies composite areas in the background patch. This is processed, as follows. The CPU 231 reads out, from the storage 235, the composite area definition information stored in linkage with the background sample image selected in step S1902. An intersection portion (intersection rectangle) of each composite area (rectangle information) stored as the <area> tag in the composite area definition information and the background patch extraction area (rectangle information) on the background sample image is obtained. Among the intersection portions, an intersection rectangle having a vertical size of 0 or more and a horizontal size of 0 or more is adopted as a composite area in the background patch. The adopted composite area has, as an origin, the upper left end point on the background sample image, and is thus corrected to have, as a reference, the upper left end point of the background patch extraction area. As described above, the composite areas on the background patch are specified. For subsequent processing, the calculated composite areas on the background patch are temporarily stored in the RAM 234. If the group attribute is added to the <area> tag of the composite area definition information which is used to calculate the intersection rectangle, this value (grouping information) is also temporarily stored in the RAM 234 in association with the composite area. FIG. 20A exemplifies, by oblique lines, the composite areas on the background patch. The CPU 231 selects one of the composite areas on the background patch.

In step S1907, the CPU 231 generates image data (to be referred to as a "foreground patch" hereinafter) by extracting part of the foreground sample image. An extraction position is randomly decided. An extraction size is the same as the size of the composite area currently selected as a processing target on the background patch. Note that binarization processing is performed for the foreground patch, and if the number of black pixels does not reach a predetermined number, a foreground patch is extracted again.

In step S1908, the CPU 231 removes the margin of the extracted foreground patch. This is processed, as follows. The CPU 231 performs binarization processing for the foreground patch to generate a binary image. A circumscribed rectangle including all the black pixels in the binary image is obtained. An area corresponding to the circumscribed rectangle is extracted from the foreground patch, and the foreground path is updated by the extracted image.

In step S1909, the CPU 231 decides the composite position of the foreground patch. This is processed, as follows. The CPU 231 decides an area (to be referred to as an "enlarged composite area" hereinafter) obtained by enlarging the composite area with reference to the central point of the composite area. An enlargement ratio is randomly decided between 100% and a predetermined threshold (for example, 105%). Under the condition of falling within the enlarged composite area, the composite position of the foreground patch is randomly decided within the enlarged composite area. Note that if the composite area is in the edge portion of the background patch, the enlarged composite area is not extended toward the edge side. FIG. 20A exemplifies the enlarged composite areas by broken lines. As described above, each composite area is created by selecting an area in an input field in the background sample image. Therefore, by performing processing like in this processing step, a ruled line around the input field and handwriting may intersect each other in processing (to be described later) of compositing the foreground patch on the background patch. That is, learning data of reproducing a case in which handwriting is made to exceed an input field is generated.

In step S1910, the CPU 231 composites the foreground patch at the composite position, decided in step S1909, on the background patch.

In step S1911, the CPU 231 updates the handwriting extraction ground truth label image. This is processed, as follows. The CPU 231 performs binarization processing for the foreground patch. Then, a pixel value smaller than a predetermined threshold indicates handwriting. Other pixel values indicate not handwriting. Then, the image data in which the pixel values are determined as described above is composited on a portion, corresponding to the composite position decided in step S1909, on the handwriting extraction ground truth label image.

In step S1912, the CPU 231 updates the handwriting area estimation ground truth label image. This is processed, as follows. The CPU 231 refers again to the image data which has been generated in step S1909 and includes the values indicating handwriting and values indicating not handwriting. Then, a circumscribed rectangle including all pixels indicating handwriting in the image is calculated. The values of the pixels included in the circumscribed rectangle in the image data are updated to a value indicating a handwriting area. The values of the remaining pixels are updated to a value indicating not a handwriting area. Then, the image data in which the values of the pixels are determined as described above is composited on a portion, corresponding to the composite position decided in step S1909, on the handwriting area estimation ground truth label image.

In step S1913, the CPU 231 determines whether all the composite areas on the background patch as a current processing target have been processed. If the processes in step S1907 to S1912 have been executed for all the composite areas on the background patch, YES is determined and the process transitions to step S1914; otherwise, NO is determined, the process returns to step S1907, and the next composite area on the background patch is processed.

In step S1914, with respect to the composite areas on the background patch specified in step S1906, the CPU 231 updates the handwriting area estimation ground truth label image with reference to the grouping information. This is processed, as follows. In step S1916, the CPU 231 reads out the composite areas and the data concerning grouping, which are temporarily stored in the RAM 234. The composite areas of the same group attribute are selected. A connection rectangle of the rectangles of these composite areas (a minimum rectangle including these composite areas) is obtained. With respect to pixels in an area corresponding to the connection rectangle on the handwriting area estimation ground truth label image, a circumscribed rectangle including all pixels with a value indicating a handwriting area is obtained. Then, the values of all the pixels within the circumscribed rectangle on the handwriting area estimation ground truth label image are changed to a value indicating a handwriting area. This processing generates ground truth data indicating that a plurality of numerical values which have been grouped and divided by digit lines are entered in one input area.

In step S1915, the CPU 231 saves the learning data of handwriting extraction. That is, the background patch on which the foreground patch is composited in step S1910 is used as an input image. This input image and the handwriting extraction ground truth label image created by composition in step S1911 are saved as learning data for learning the neural network for handwriting extraction in a predetermined area of the storage 235 in association with each other. In the fifth embodiment, the learning data of handwriting extraction, as shown in FIG. 20B, is saved.

In step S1916, the CPU 231 saves the learning data of handwriting area estimation. That is, the background patch on which the foreground patch is composited in step S1910 is used as an input image. This input image and the handwriting area estimation ground truth label image created by composition in step S1912 are saved as learning data for learning the neural network for handwriting area estimation in a predetermined area of the storage 235 in association with each other. In the fifth embodiment, the learning data of handwriting area estimation, as shown in FIG. 20C, is saved.

In step S1917, the CPU 231 determines whether the learning data generation processing ends. If a predetermined number (decided by, for example, user designation via the input device 209 of the image processing apparatus 101 at the start of this flowchart) of learning data are generated, the CPU 231 determines YES and the processing ends; otherwise, the CPU 231 determines NO and the process returns to step S1901.

With the above processing, the learning data of the neural network for performing handwriting extraction and the learning data of the neural network for performing handwriting area estimation are generated by image composition from the foreground sample image, the background sample image, and the composite area definition information. To improve the flexibility of each neural network, the learning data may be processed. For example, the foreground patch or the background patch is magnified with a magnification randomly selected and decided within a predetermined range (for example, 50% to 150%). Alternatively, the luminance of each of the pixels of the foreground patch or the background patch may be changed to perform processing. That is, the luminances of these images are changed using gamma correction. A gamma value is randomly selected and decided within a predetermined range (for example, 0.1 to 10.0). Alternatively, the foreground patch or the background patch composited with the foreground patch is rotated by a rotation angle randomly selected and decided within a predetermined range (for example, −10 degree to 10 degree). In consideration of magnification and rotation, the foreground patch or the background patch is extracted in a larger size (for example, twice the size in vertical and horizontal directions of the composite area/vertical size×horizontal size=512×512). Then, extraction is performed from a central portion so as to obtain the final sizes (for example, vertical size×horizontal size=256×256) of the input image and the ground truth label images of handwriting extraction and handwriting area estimation.

Using the thus generated learning data, the learning apparatus 102 can learn the neural network for handwriting extraction and that for handwriting area estimation.

As described above, an image conversion system according to the fifth embodiment can generate, by composition, the learning data of the neural network for handwriting extraction and that of the neural network for handwriting area estimation. The user need only create a foreground sample image obtained by scanning a sheet including only handwriting, a background sample image obtained by scanning a printed unfilled form, and information of composite areas on the background sample. Each of the first, third and fourth embodiments has explained the example of generating the learning data based on an operation instruction by the user. However, when creating a large amount of learning data, the time and cost are required. In the method described in the fifth embodiment, it is only necessary to scan a sheet including only handwriting and a document of an unfilled form. Then, since composite areas are defined as a minimum operation instruction, it is possible to efficiently generate learning data.

Note that in step S1912, pixels with a value indicating a handwriting area in the handwriting area estimation ground truth label image are decided based on the foreground patch. However, these pixels may be decided based on the composite areas. In this case, a ground truth label image similar to that obtained by the method described in the first embodiment is generated.

Sixth Embodiment

In the first embodiment described above, handwriting area estimation is performed by applying the neural network for handwriting area estimation to a scan image. The sixth embodiment will describe an example of performing handwriting area estimation by applying the neural network for handwriting area estimation to a handwriting extracted image. Note that if handwriting area estimation is performed based on a handwriting extracted image, the following problem further arises.

Figure 22A:
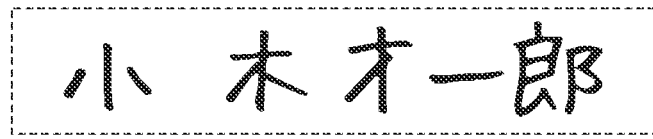
Figure 22C:
Figure 22E:
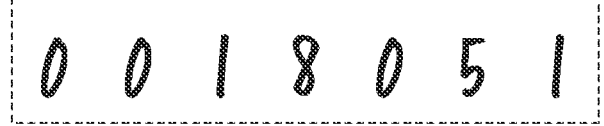

For example, FIG. 22K depicts a view showing a scan image obtained by scanning a form in which handwritten characters are entered, and FIG. 22L depicts a view showing an example of a handwriting extracted image generated by extracting only handwriting pixels from the scan image.

The handwriting OCR engine aims to recognize characters handwritten in a form or the like, and is often configured by assuming that characters (to be referred to as a "character line" hereinafter) are input in one or several lines. However, the handwriting extracted image shown in FIG. 22L has a so-called multi-column arrangement (an arrangement in which a plurality of columns each formed from a plurality of character lines arrayed in the vertical direction are arrayed in the horizontal direction), and the heights and positions in the vertical direction of the character lines vary between the two columns. That is, the left column includes two character lines of "ヤマダタロウ" (katakana character notation) and "山田太郎" (kanji character notation), and the right column includes three character lines of "302-8501", "取手市白山7-5-1" (kanji character notation), and "03-3758-2111". The height and start position in the vertical direction of each character line of the right column do not coincide those of each character line of the left column. This image arrangement will be referred to as a "line position non-coincidence multi-column" hereinafter. If an image of such line position non-coincidence multi-column is input, the handwriting OCR engine may fail to extract character lines, thereby degrading the recognition accuracy.

The sixth embodiment will describe an example of deciding, using the neural network, a handwriting area on a handwriting extracted image input to the handwriting OCR engine. One handwriting area includes one or several handwritten character lines, and one or more character lines included in one handwriting area are formed by a single column.

An image processing system according to the sixth embodiment also has the same configuration as that of the image processing system according to the first embodiment described with reference to FIG. 1.

However, the image processing server 103 extracts (specifies) handwriting pixels (pixel positions) in a processing target image by performing inference by a neural network for handwriting pixel extraction using a learning result (learning model) generated by the learning apparatus 102, thereby obtaining a handwriting extracted image. Then, the image processing server 103 performs handwriting area estimation for the handwriting extracted image. The image processing server 103 estimates (specifies) a handwriting area in the handwriting extracted image by performing inference by the neural network for handwriting area extraction using a learning result (learning model) generated by the learning apparatus 102.

A learning sequence in the image processing system according to the sixth embodiment is the same as that in the first embodiment described with reference to FIG. 3A, and a description thereof will be omitted. However, assume that as a method of instructing to add a ground truth data in S305, a method to be described later is used.

A use sequence in the image processing system according to the sixth embodiment is the same as that in the first embodiment described with reference to FIG. 3B, and only the difference will be described.

The procedure of processes in S351 to S356 is the same as in the first embodiment and a description thereof will be omitted. Note that a document (form) read in S351 is assumed to be, for example, a form 470 shown in FIG. 4E. The form 470 includes a name input field 471, a kana syllables input field 472, and a contact information input field 473, in which a name, kana syllables of the name, and a postal code, an address, and a telephone number as contact information are handwritten, respectively.

In S357, the image conversion unit 114 performs handwriting extraction for the processing target image based on the learning model for handwriting pixel extraction obtained in S356, and also performs handwriting area estimation for the thus obtained handwriting extracted image using the learning model for handwriting area estimation. FIG. 4F shows examples of handwriting areas obtained by the handwriting area estimation.

Referring to FIG. 4F, as indicated by broken line frames, handwriting areas 481 to 485 are obtained as handwriting areas on a handwriting extracted image 480, and each handwriting area includes one handwritten character line.

In S358, the image conversion unit 114 transmits the generated handwriting extracted image and pieces of position information of the handwriting areas to the handwriting OCR unit 116. Processes in S359 to S367 are the same as in the first embodiment and a description thereof will be omitted.

The hardware configurations of apparatuses and servers included in the image processing system according to the sixth embodiment are the same as in the first embodiment (FIGS. 2A to 2D).

Figure 5E:
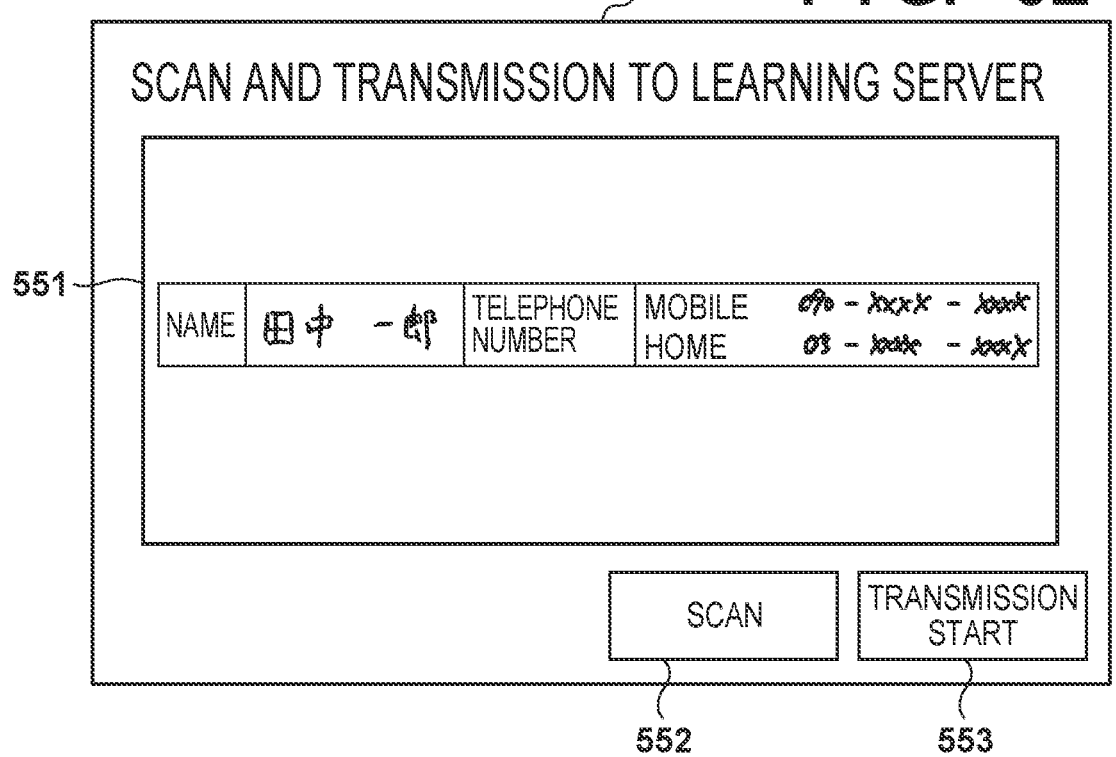
FIGS. 5E to 5G depict views each showing an example of a screen displayed in each apparatus of the image processing system according to the sixth embodiment.
Figure 5F:
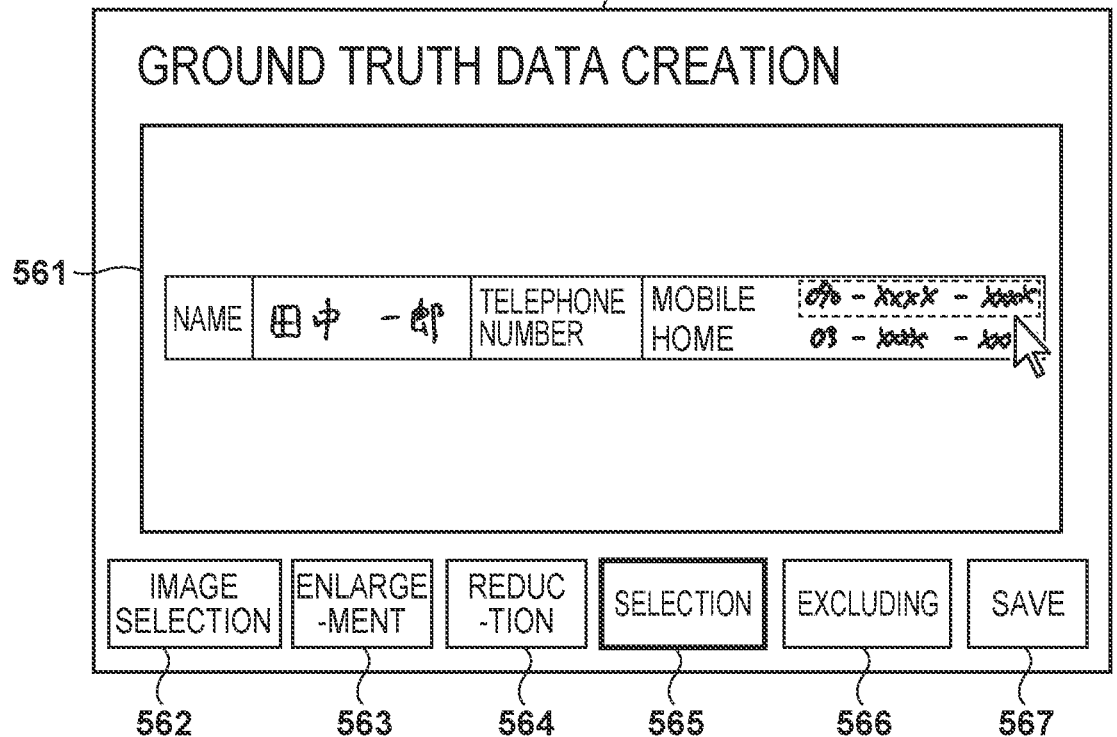
Figure 5G:
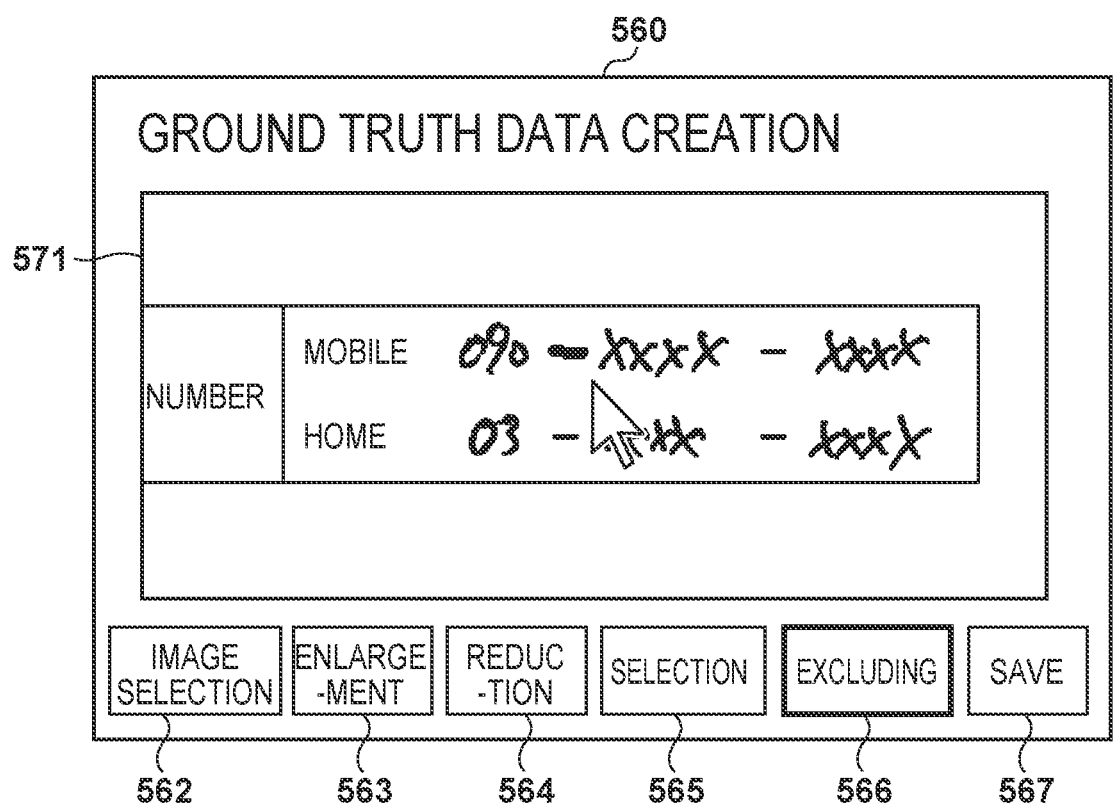

FIGS. 5E to 5G depict views each showing an example of a screen displayed in the image processing system according to the sixth embodiment.

FIG. 5E depicts a view showing an example of a document scan screen 550 displayed on the display device 210 of the image processing apparatus 101.

This document scan screen 550 is an example of a screen displayed on the display device 210 in S301 of FIG. 3A. As shown in FIG. 5E, the document scan screen 550 includes a preview area 551, a scan button 552, and a transmission start button 553.

The scan button 552 is a button for instructing to start reading a document set in the scanner device 206. The read document is, for example, an unfilled form or filled form. Upon completion of the scan of the document, a document image is generated and displayed in the preview area 551. By setting another document in the scanner device 206 and pressing the scan button 552 again, images obtained by reading a plurality of documents can be held together. When the document is read, it is possible to instruct the transmission start button 553. When the transmission start button 553 is instructed, the document image is transmitted to the learning apparatus 102.

FIG. 5F depicts a view showing an example of a ground truth data creation screen 560 displayed on the display device 237 of the learning apparatus 102. Note that the ground truth data creation screen 560 may be configured to be displayed on the display device of another terminal connected to the learning apparatus via the network, and the user may issue an instruction to the learning apparatus via the terminal.

A ground truth data addition instruction by the user in S305 of FIG. 3A is issued via this screen. The user performs an operation based on display contents of the ground truth data creation screen to instruct to create ground truth data. As shown in FIG. 5F, the ground truth data creation screen 560 includes an image display area 561, an image selection button 562, an enlargement button 563, a reduction button 564, a selection button 565, an excluding button 566, and a save button 567.

The image selection button 562 is a button for selecting a sample image received from the image processing apparatus 101 and accumulated in the image accumulation unit 115. If the user instructs the image selection button 562, a selection screen (not shown) is displayed and the user can select a desired sample image from the selection screen. If the sample image is selected, the selected sample image is displayed in the image display area 561. The user operates the sample image displayed in the image display area 561 to create ground truth data. The enlargement button 563 and the reduction button 564 are buttons for enlarging and reducing the image displayed in the image display area 561, respectively. When the enlargement button 563 or the reduction button 564 is instructed, the sample image displayed in the image display area 561 can be enlarged or reduced and displayed so as to readily create ground truth data.

One of the selection button 565 and the excluding button 566 can be selected, and the selected button is highlighted. If the selection button 565 is selected, the user can select part of the sample image displayed in the image display area 561 to create ground truth data. The user creates ground truth data by performing the following operation.

The user operates a cursor via the input device 236, as shown in FIG. 5F, to select an area including handwriting in the sample image displayed in the image display area 561. At this time, the user makes a selection so the handwritten characters included in the selected rectangular area do not have a line position non-coincidence multi-column. That is, the user performs an operation so that the selected rectangular area includes only one character line in one column. Upon receiving this operation, the learning data generation unit 112 records, as ground truth data, the area selected by this operation. That is, the ground truth data includes an area (one-line handwriting area) on the sample image.

On the other hand, if the excluding button 566 is selected, the user can select, as an exclusion target, part of the selected handwriting area, such as a printed character or symbol included in the selected handwriting area. For example, in some forms, a hyphen "–" inserted between an area code and a local number of a telephone number may be pre-printed. In this case, if a handwritten telephone number is selected as a handwriting area, such pre-printed symbol is unwantedly included. To cope with this, the user can operate the excluding button 566 to perform a selection operation for excluding the symbol included in the handwriting area. The thus selected printed character or symbol is executed from the learning data of handwriting extraction, as will be described later.

A practical example when making a selection of a handwriting area and a selection of an exclusion target character will be described. A preview area 571 shown in FIG. 5G is an example obtained by operating the enlargement button 563 to enlarge and display part of the image displayed in the image display area 561 shown in FIG. 5F. The user can operate the mouse cursor via the input device 236 on the enlarged image shown in FIG. 5G or the image shown in FIG. 5F to select an area including handwriting, as shown in FIG. 5F. After that, the user can select the excluding button 566, and selects a character or a symbol in the area to be excluded by tracing it, thereby excluding the selected portion from the handwriting area. In the example shown in FIG. 5G, the user selects the excluding button 566, and then select the pre-printed hyphen as an exclusion target by tracing the position of the pre-printed hyphen by the mouse cursor. Upon receiving this operation, the learning data generation unit 112 records the pixel positions in the sample image selected as the exclusion target by the above operation. That is, as additional information of the ground truth data, the pixel positions of the character or symbol to be excluded are stored.

The save button 567 is a button for saving the created ground truth data. The ground truth data of handwriting extraction is accumulated as the following image in the image accumulation unit 115. The image has the same size (width and height) as that of the sample image, and the pixels of an area other than the handwriting area selected by the user on the image have a value (for example, 0) indicating not handwriting. Furthermore, a pixel at the position selected to be excluded by the above-described estimation button 526 within the handwriting area selected by the user also has a value (0) indicating not handwriting. Pixels which become black pixels when binarizing the image within the handwriting area selected by the user have a value (for example, 255) indicating handwriting. However, as described above, the exclusion target pixel selected by the user is not included. The image as the ground truth data of handwriting extraction will be referred to as a "handwriting extraction ground truth image" hereinafter.

FIG. 4G depicts a view showing an example of the thus extracted handwriting extraction ground truth image.

The ground truth data of handwriting area estimation is accumulated as the following image in the image accumulation unit 115, and has the same size (width and height) as that of the sample image. Pixels corresponding to the handwriting area selected by the user have a value (for example, 255) indicating a handwriting area. The remaining pixels have a value (for example, 0) indicating not a handwriting area. The image as the ground truth data of handwriting area estimation will be referred to as a "handwriting area estimation ground truth image" hereinafter.

FIG. 4H depicts a view showing an example of the handwriting area estimation ground truth image. Referring to FIG. 4H, the ground truth data of handwriting area estimation is set as a rectangular area filled with the value indicating a handwriting area.

Sample image generation processing (FIG. 6A) by the image processing apparatus 101 and sample image reception processing (FIG. 6B) by the learning apparatus 102 are the same as in the first embodiment and a description thereof will be omitted.

Figure 6D:
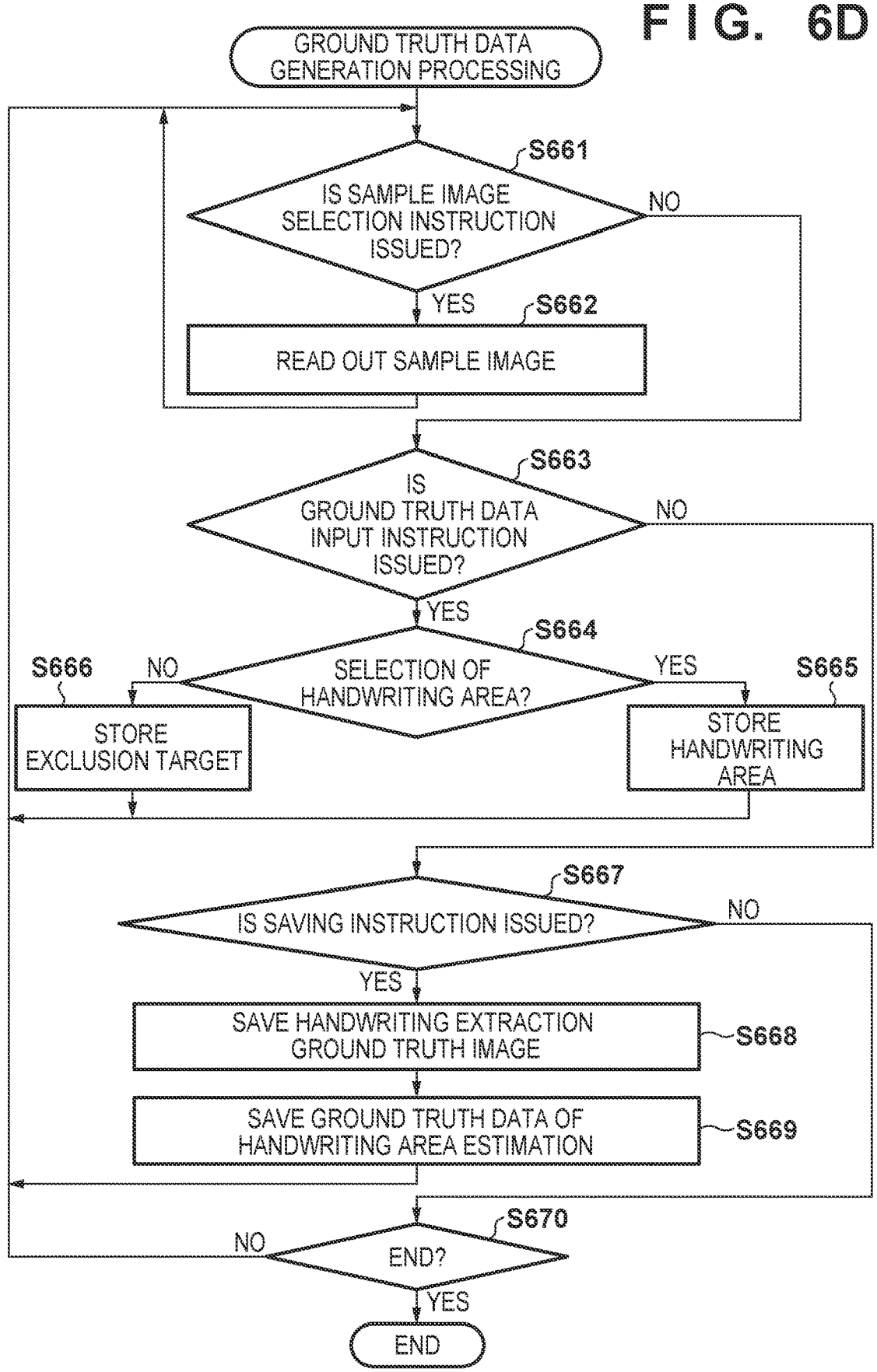
FIG. 6D is a flowchart for explaining ground truth data generation processing by the learning apparatus according the sixth embodiment.

FIG. 6D is a flowchart for explaining ground truth data generation processing by the learning apparatus 102 according to the sixth embodiment. The processing shown in this flowchart is implemented when the CPU 231 deploys, in the RAM 234, the program stored in the storage 235, and executes the deployed program. This function is implemented by the learning data generation unit 112 of the learning apparatus 102. Note that this processing starts when the user performs a predetermined operation via the input device 236 of the learning apparatus 102.

In step S661, the CPU 231 determines whether a sample image selection instruction is issued. If the user performs, via the input device 236, a predetermined operation (instruction to the image selection button 562 of the ground truth data creation screen 560 shown in FIG. 5F) of selecting a sample image, the process transitions to step S662; otherwise, the process transitions to step S663. In step S662, the CPU 231 reads out, from the storage 235, the sample image selected by the user in step S661, and presents it to the user. In this example, the sample image is displayed in the image display area 561 shown in FIG. 5F, and the process returns to step S661.

In step S663, the CPU 231 determines whether the user issues ground truth data input instruction. If the user performs, via the input device 236, an operation of selecting a handwriting area in the sample image or selecting an exclusion target, as described above, YES is determined and the process transitions to step S664; otherwise, the process transitions to step S667. In step S664, the CPU 231 determines whether ground truth data input by the user is a selection of a handwriting area. At this time, if the user performs an operation of instructing a selection of a handwriting area, that is, the user selects the selection button 565 shown in FIG. 5F, the CPU 231 determines YES and the process transitions to step S665; otherwise, that is, the ground truth data input by the user is an operation of selecting an exclusion target or the user selects the excluding button 566 shown in FIG. 5F, the process transitions to step S666. In step S665, the CPU 231 temporarily stores, in the RAM 234, the handwriting area input by the user, and the process returns to step S661. As described above, the handwriting area includes area information including handwritten characters on the sample image. On the other hand, in step S666, the CPU 231 temporarily stores, in the RAM 234, pixel position information of the exclusion target input by the user, and the process returns to step S661.

On the other hand, if the CPU 231 determines in step S663 that the user issues no ground truth data input instruction, the process advances to step S667, and the CPU 231 determines whether a ground truth data saving instruction is issued. If the user performs, via the input device 236, a predetermined operation of saving ground truth data, that is, the user instructs the save button 567 shown in FIG. 5G, the process transitions to step S668; otherwise, the process transitions to step S670. In step S668, the CPU 231 generates and displays, for example, the handwriting extraction ground truth image shown in FIG. 4G, and saves, as the ground truth data of handwriting extraction, image data created by a user operation via the screen.

Handwriting extraction ground truth image generation processing at this time will be described in detail. The CPU 231 generates, as a handwriting extraction ground truth image, an image of the same size as that of the sample image read out in step S662, and sets the values of all the pixels of the image to a value indicating not handwriting. Next, the CPU 231 refers to the information of the handwriting area temporarily stored in the RAM 234 in step S665. Then, the CPU 231 performs binarization processing for the pixel group of the handwriting area on the sample image based on a predetermined threshold. Then, the CPU 231 determines that black pixels (pixels with values smaller than the threshold) on the obtained binary image correspond to the generated ground truth data for handwriting extraction, and pixels at corresponding positions are set to have a value (for example, 255) indicating a handwriting pixel. However, at this time, with reference to the position information of an exclusion target pixel temporarily stored in the RAM 234 in step S646, the corresponding exclusion target pixel is set to have a value (0) indicating not handwriting. The thus generated handwriting extraction ground truth image is saved in a predetermined area of the storage 235 in association with the sample image read out in step S662.

In step S669, the CPU 231 generates a handwriting area estimation ground truth image, and saves it as the ground truth data of handwriting area estimation.

Processing of generating the handwriting area estimation ground truth image will be described in detail.

The CPU 231 generates, as the handwriting area estimation ground truth image, an image of the same size as that of the sample image read out in step S662. Then, the CPU 231 sets all the pixels of the image to have a value (for example, 0) indicating not a handwriting area. Next, with reference to the position information of the handwriting area temporarily stored in the RAM 234 in step S665, the CPU 231 changes the values of the pixels in the corresponding area on the handwriting area estimation ground truth image to a value indicating a handwriting area. The CPU 231 saves the thus generated handwriting area estimation ground truth image in a predetermined area of the storage 235 in association with the sample image read out in step S662.

If it is determined in step S667 that no ground truth data saving instruction is issued, the process advances to step S670 and the CPU 231 determines whether the processing ends. If the user performs a predetermined operation of ending the ground truth data generation processing, the processing ends; otherwise, the process returns to step S661.

As described above, with the above processing, the learning apparatus 102 can obtain the handwriting extraction ground truth image and the handwriting area estimation ground truth image from the pixel group of the handwriting portion extracted as a handwritten character area of the sample image.

Learning data generation processing by the learning apparatus 102 according to the sixth embodiment will be described next with reference to FIG. 7C. FIG. 7C is a flowchart for explaining learning data generation processing by the learning apparatus 102 according to the sixth embodiment.

Processes in S741 to S746 of FIG. 7C according to Example 6 are the same as those in S701 to S706 of FIG. 7A according to the first embodiment and a description thereof will be omitted. In step S747, the CPU 231 generates a handwriting extracted image by extracting only the pixel values of pixels corresponding to handwriting from an input image read out in step S741. That is, a handwriting extraction ground truth label image read out in step S742 is applied, as a mask image, to the input image. This obtains an image in which pixels corresponding to the pixels with a value indicating handwriting on the handwriting extraction ground truth label image have pixel values at the corresponding positions on the input image and pixels corresponding to the pixels with a value indicating not handwriting on the handwriting extraction ground truth label image are white (255). The thus obtained image is set as a handwriting extracted image. In step S748, the CPU 231 saves the input image generated in step S704 and the handwriting extraction ground truth label image generated in step S705 as the learning data of handwriting extraction in a predetermined area of the storage 235 in association with each other. This saves the learning data in which the input image and the handwriting extraction ground truth label image are associated with each other, as shown in FIG. 8A, similar to the first embodiment.

Figure 8C:
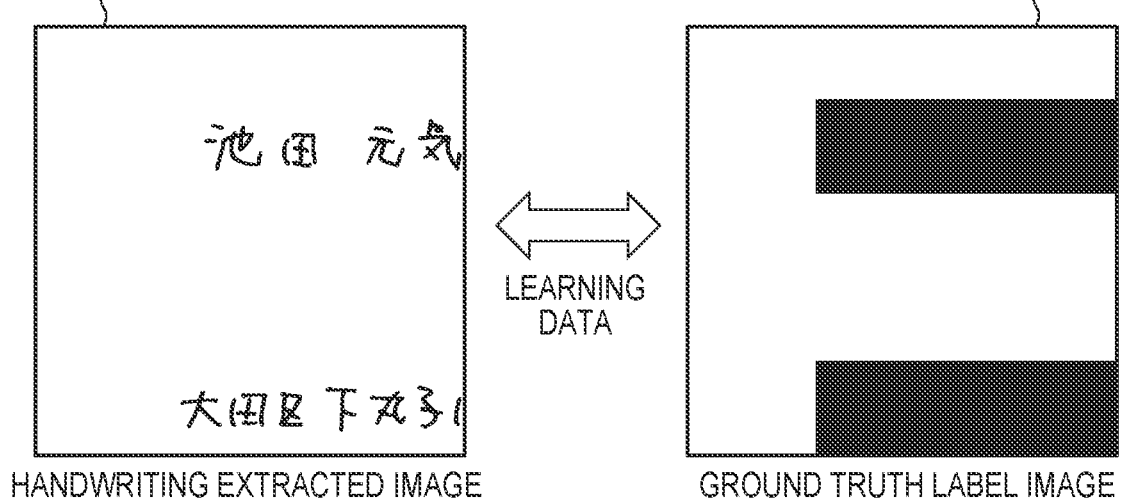
FIG. 8C depicts a view showing an example of the structure of learning data of handwriting area estimation according to the sixth embodiment.

In step S749, the CPU 231 saves, as the learning data of handwriting area estimation, the handwriting extracted image generated in step S747 and a handwriting area estimation ground truth label image generated in step S746 in a predetermined area of the storage 235 in association with each other. These images are saved in association with each other in order to process the handwriting extracted image generated in step S747 as an input image when learning the neural network for handwriting area estimation. This saves the learning data in which the handwriting extracted image and the handwriting extraction ground truth label image are associated with each other, as shown in FIG. 8C.

In S750, the CPU 231 determines whether the learning data generation processing ends. If a predetermined number (decided by, for example, user designation via the input device 236 of the learning apparatus 102 at the start of this flowchart) of learning data are generated, the CPU 231 determines YES and the processing ends; otherwise, the CPU 231 determines NO and the process returns to step S741.

With the above-described processing, the learning data of the neural network for performing handwriting extraction and the learning data of the neural network for performing handwriting area estimation are generated. Note that to improve the flexibility of each neural network, processing such as magnification, rotation, and gamma correction may be performed for the learning data, thereby increasing the learning data, similar to the first embodiment.

The learning processing by the learning apparatus 102 is executed based on the flowchart shown in FIG. 7B, similar to the first embodiment, and a detailed description thereof will be omitted. However, the learning data generation processing in S732 is performed based on the above-described processing shown in FIG. 7C.

Request processing in which the image processing apparatus 101 requests the image processing server 103 to convert a form into text is executed based on the flowchart shown in FIG. 9A, similar to the first embodiment, and a detailed description thereof will be omitted.

Figure 9C:
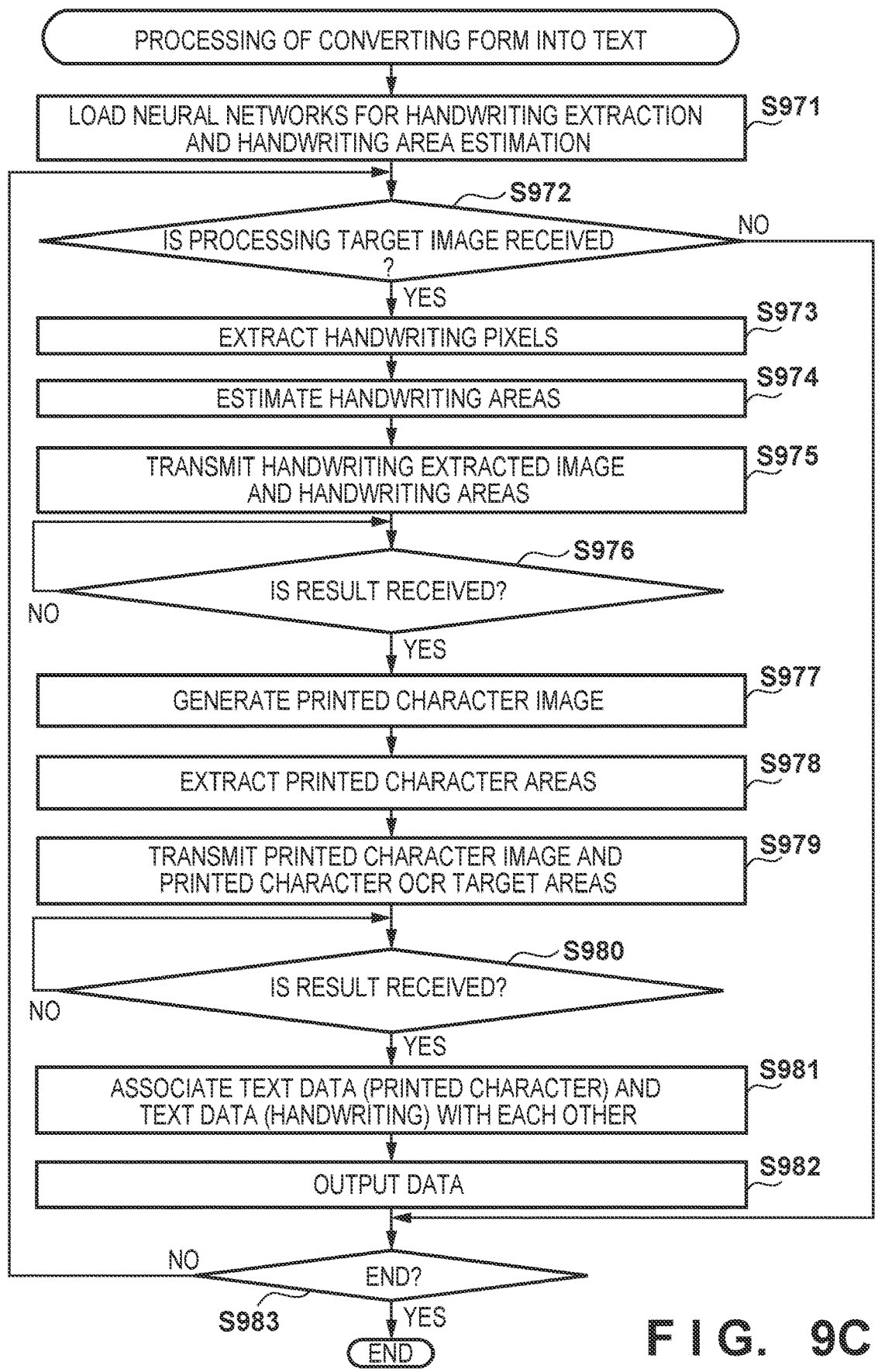
FIG. 9C is a flowchart for explaining processing of converting a form into text by the image processing server according to the sixth embodiment.
Figure 10B:
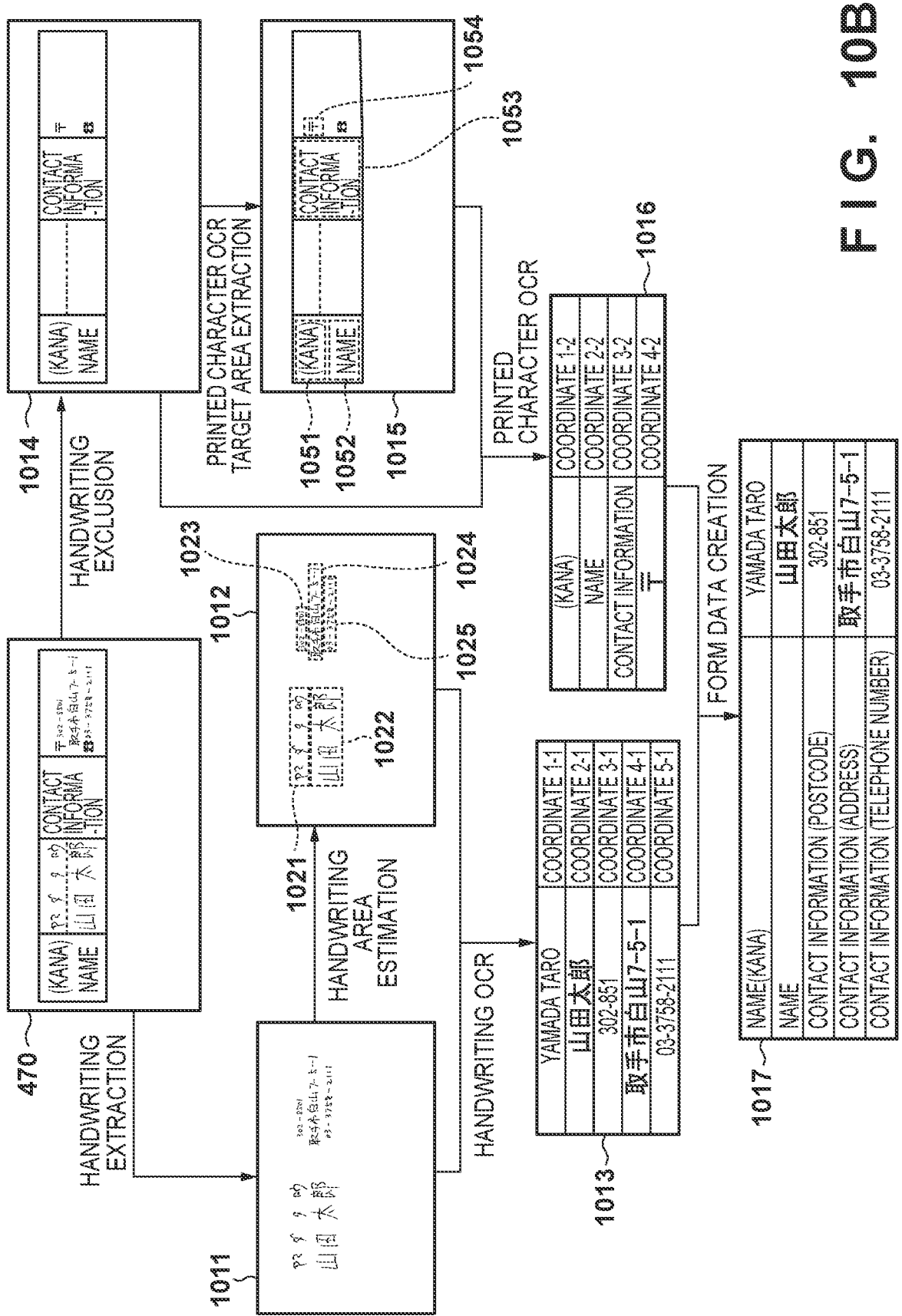
FIG. 10B depicts a view for explaining an overview of data generation processing in the processing of converting a form into text by the image processing server according to the sixth embodiment.

FIG. 9C is a flowchart for explaining processing of converting a form into text, which is executed by the image processing server 103, according to the sixth embodiment. FIG. 10B depicts a view for explaining an overview of data generation processing in the processing of converting the form into text by the image processing server 103 according to the sixth embodiment.

The image processing server 103 functioning as the image conversion unit 114 receives a processing target image from the image processing apparatus 101 and performs OCR of printed characters and handwritten characters included in the processing target image, thereby obtaining text data. The printed character OCR unit 117 executes OCR processing for the printed characters. The handwriting OCR unit 116 executes OCR for the handwritten characters. The processing of converting the form into text is implemented when the CPU 261 reads out the image processing server program stored in the storage 265, deploys it in the RAM 264, and executes it. This starts when the user turns on the power of the image processing server 103.

In step S971, the CPU 261 loads the neural network for performing handwriting extraction and that for performing handwriting area estimation. At this time, the CPU 261 creates the same neural networks as those in step S731 of the flowchart shown in FIG. 7B. In step S738, the learning results (the parameter of the neural network for performing handwriting extraction and the parameter of the neural network for performing handwriting area estimation) transmitted from the learning apparatus 102 are reflected on the created neural networks.

In step S972, the CPU 261 determines whether the processing target image is received from the image processing apparatus 101. If the CPU 261 determines that the processing target image is received via the external interface 268, the process transitions to step S973; otherwise, the process transitions to step S983. As an example, assume that the form 470 shown in FIG. 10B (the form 470 shown in FIG. 4E) is received as the processing target image. In step S973, the CPU 261 extracts handwriting pixels from the processing target image received from the image processing apparatus 101. At this time, the CPU 261 inputs the processing target image to the neural network for performing handwriting extraction, which has been created in step S971, to estimate handwriting pixels.

Thus, as an output from the neural network, the following image data is obtained. That is, image data of the same image size as that of the processing target image, in which a value indicating handwriting is recorded in each pixel determined as handwriting as a prediction result and a value indicating not handwriting is recorded in each pixel determined as not handwriting is obtained. Then, pixels at the corresponding positions as those of the pixels with the value indicating the handwriting in the image data are extracted from the processing target image and a handwriting extracted image is generated. This obtains a handwriting extracted image 1011 shown in FIG. 10B. As shown in FIG. 10B, the handwriting extracted image 1011 is an image including only handwritten characters.

The process advances to step S974 and the CPU 261 estimates a handwriting area from the handwriting extracted image 1011 generated in step S973. That is, the CPU 261 inputs the handwriting extracted image 1011 generated in step S973 to the neural network for performing handwriting area estimation, which has been created in step S971, to estimate a handwriting area. As an output from the neural network, the following image data is obtained. Image data of the same image size as that of the handwriting extracted image, in which a value indicating a handwriting area is recorded in each pixel determined as a handwriting area as a prediction result and a value indicating not a handwriting area is recorded in each pixel determined as not a handwriting area is obtained. In the sixth embodiment, in S305 of FIG. 3A, the user creates ground truth data of handwriting area estimation so that each handwriting area includes one character line. Since the neural network for performing handwriting area estimation learns the ground truth data, a handwriting area for each character line is estimated, and pixels indicating the handwriting area are output. Note that the output from the neural network for handwriting area estimation is a prediction result for each pixel, and the predicted area is not always correctly rectangular, and is thus difficult to process. Therefore, a circumscribed rectangle including this area is set. A known technique can be applied to implement setting of a circumscribed rectangle. Each circumscribed rectangle can be expressed as information formed from the upper left end point on the processing target image and the width and height. The thus obtained rectangle information group is set as a handwriting area. Handwriting areas estimated for the handwriting extracted image 1011 are indicated by dotted line frames (1021 to 1025) in a handwriting area estimation image 1012 shown in FIG. 10B.

The process advances to step S975 and the CPU 261 transmits the handwriting extracted image generated in step S973 and the pieces of position information of the handwriting areas generated in step S974 to the handwriting OCR unit 116 of the OCR server 104 via the external interface 268. Then, the CPU 261 causes the handwriting OCR unit 116 to execute, for each estimated handwriting area, handwriting OCR on the handwriting extracted image including only the handwritten characters. A known technique can be applied to implement handwriting OCR. Handwriting OCR is performed on the handwriting extracted image for each handwriting area. Thus, for example, even if the handwritten characters included in the handwriting extracted image have the line position non-coincidence multi-column arrangement, as in the handwriting extracted image 1011, the handwritten character area can be divided for each character line of one column to execute handwriting OCR, as indicated in 1012 of FIG. 10B. Therefore, the handwriting OCR engine does not fail to extract a character line, thereby making it possible to reduce deterioration in recognition accuracy.

The process advances to step S976 and the CPU 261 determines whether a handwriting OCR result is received from the handwriting OCR unit 116. The handwriting OCR result is text data obtained by recognizing handwritten characters included in the handwriting areas by the handwriting OCR unit 116. If the handwriting OCR result is received from the handwriting OCR unit 116 of the OCR server 104 via the external interface 268, the process transitions to step S977; otherwise, the processing in step S976 is repeated. With the above processing, the CPU 261 can obtain text data by recognizing the pieces of position information (coordinate information) of handwriting areas and handwritten characters included in them. The CPU 261 stores the thus obtained text data as a handwriting information table 1013 shown in FIG. 10B in the RAM 264.

The process advances to step S977 and the CPU 261 generates a printed character image by removing handwriting pixels from the processing target image based on the output from the neural network for handwriting extraction, which has been obtained in step S973. The CPU 261 changes, to white (pixel value of 255), pixels at the corresponding positions as those of pixels, in the processing target image, each having a pixel value indicating handwriting in the image data output from the neural network. This obtains a printed character image 1014 shown in FIG. 10B.

The process advances to step S978 and the CPU 261 extracts a printed character area from the printed character image generated in step S977. The same method (the processing in step S958 of FIG. 10A) as in the first embodiment can be applied as a method of extracting a printed character area from the printed character image. In 1015 of FIG. 10B, printed character areas extracted for the printed character image are exemplified by dotted line frames (1051 to 1054).

The process advances to step S979 and the CPU 261 transmits, to the printed character OCR unit 117 of the OCR server 104 via the external interface 268, the printed character image generated in step S977 and the printed character areas obtained in step S978 to execute printed character OCR. A known technique can be applied to implement printed character OCR.

The process advances to step S980 and the CPU 261 determines whether a printed character OCR result is received from the printed character OCR unit 117. The printed character OCR result is text data obtained by recognizing printed characters included in the printed character areas by the printed character OCR unit 117. If the printed character OCR result is received from the printed character OCR unit 117 via the external interface 268, the process transitions to step S981; otherwise, the processing in step S980 is repeated. With the above processing, text data is obtained by recognizing the pieces of position information (coordinate information) of the printed character areas and printed characters included in them. The CPU 261 stores the text data as a printed character information table 1016 shown in FIG. 10B in the RAM 264.

In step S981, the CPU 261 integrates the handwriting OCR result and the printed character OCR result respectively received from the handwriting OCR unit 116 and the printed character OCR unit 117. The CPU 261 estimates the relationship between the handwriting OCR result and the printed character OCR result by evaluating the positional relationship between the original handwriting areas and printed character areas and the semantic relationship between the text data as the handwriting OCR result and the printed character OCR result. This estimation processing is performed based on the handwriting information table 1013 and the printed character information table 1016. For example, the handwriting area 1021 ("ヤマダタロウ") having the shortest distance to the printed character area 1051 ("フリガナ") is specified. Since a printed character area 1052 ("氏名") exists near the printed character area 1051, the printed character area 1051 is specified as the kana syllables of the name. Similarly, the handwriting area 1022 ("山田太郎" (kanji character notation)) having the shortest distance to the printed character area 1052 and including contents coinciding the "氏名" is specified. The handwriting area 1024 ("取手市白山7-5-1" (kanji character notation)) having the shortest distance to the printed character area 1053 ("連絡先") is specified. Since the handwriting OCR result of the handwriting area 1024 includes the place name, contents of the handwriting area 1024 indicate contact information and an address. The handwriting area 1023 ("302-8501") having the shortest distance to the printed character area 1054 ("〒" (symbol)) is specified. Furthermore, the printed character area 1053 is specified as a printed character area having the second shortest distance. Thus, it is specified that the handwriting OCR result of the handwriting area 1023 indicates a postal code as part of contact information. With respect to the remaining handwriting area 1025 ("03-3758-2111"), since the handwriting OCR result is formed by numbers and hyphens and a printed character area having the shortest distance is the printed character area 1053, the handwriting area 1025 is specified as a telephone number as part of the contact information. In this way, the handwriting OCR result and the printed character OCR result are integrated as one or more pairs of items and values, thereby generating form text data 1017.

In step S982, the CPU 261 transmits the generated form text data to the image obtaining unit 111. Then, the process advances to step S983 and the CPU 261 determines whether the processing ends. If the user performs a predetermined operation of, for example, turning off the power of the image processing server 103, the processing ends; otherwise, the process returns to step S972.

As described above, according to the sixth embodiment, a handwriting extracted image including only handwriting is generated from the scan image of a form including handwriting, and handwriting areas each including one handwritten character line are estimated from the handwriting extracted image. By applying handwriting OCR processing to each handwriting area, handwritten characters in the handwriting extracted image can be recognized and converted into text.

This can prevent the recognition accuracy of handwriting OCR from deteriorating due to the fact that the target of handwriting OCR includes printed characters and marks. Since handwritten characters included in a handwriting portion are configured not to have the line position non-coincidence multi-column arrangement, the handwriting OCR engine does not fail to extract a character line, thereby obtaining the effect that it is possible to prevent deterioration in accuracy of handwritten character recognition.

Note that in the sixth embodiment, the handwriting extracted image and the pieces of position information of the handwriting areas are transmitted to the handwriting OCR unit. The present disclosure, however, is not limited to this. A handwriting extracted image may be extracted for each handwriting area to generate a plurality of partial images, and the partial images may be transmitted to the handwriting OCR unit.

In the sixth embodiment, the ground truth data for learning the neural network for handwriting area estimation is created so that each handwriting area includes one character line. The present disclosure, however, is not limited to this. For example, an area including a plurality of character lines in one column may be created as ground truth data as long as the character lines have no line position non-coincidence multi-column arrangement.

Seventh Embodiment

In the sixth embodiment described above, the user designates a handwriting area or exclusion of printed characters on the scanned sample image (FIGS. 5F and 5G), a handwriting extraction ground truth image and a handwriting area estimation ground truth image are generated based on the designation (FIG. 6D), and the learning data of handwriting extraction and that of handwriting area estimation are generated (FIG. 7C). The seventh embodiment will describe a case of generating a composite image by compositing a foreground sample image and a background sample image, similar to the fifth embodiment, and generating learning data usable in the sixth embodiment.

A learning sequence in an image processing system according to the seventh embodiment is the same as that (FIG. 15A) according to the fifth embodiment and a detailed description thereof will be omitted.

Figure 15B:
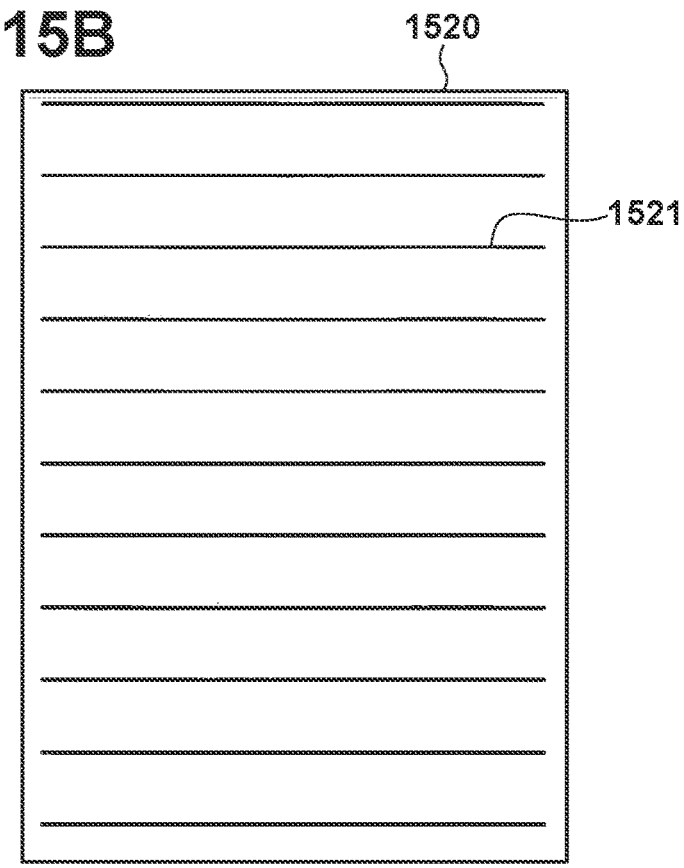
FIG. 15B depicts a view showing an example of an unfilled document.
Figure 15C:
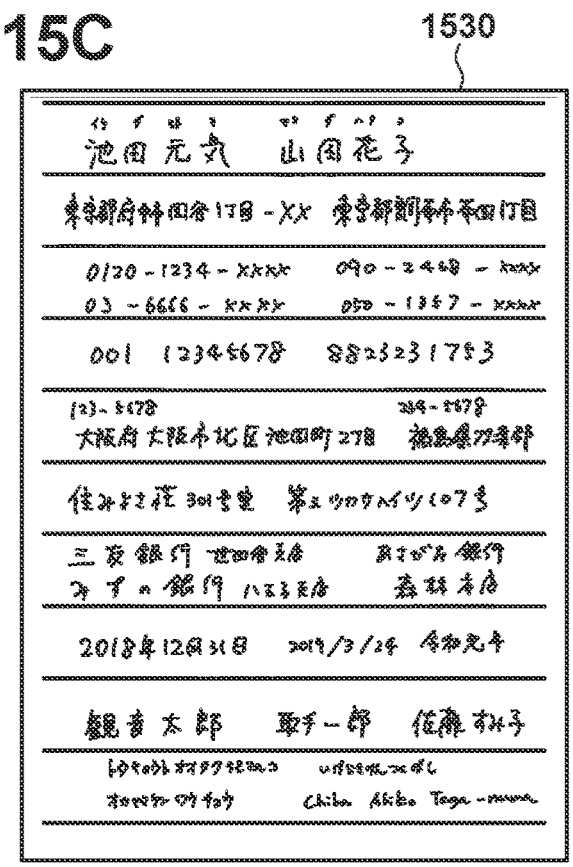
FIG. 15C depicts a view showing an example of a filled document.

Note that in S1502 of FIG. 15A, a foreground sample image is generated by scanning a document in which only handwriting is made on a white sheet. The present disclosure, however, is not limited to this. For example, as shown in FIG. 15B, a document 1520 on which segmenting lines 1521 (or ruled lines) are printed is prepared. Furthermore, the user prepares a filled document 1530 shown in FIG. 15C by handwriting characters in areas between the ruled lines 1521. For example, the user enters contents such as the name, address, and telephone number which are entered in a form, and does not handwrite characters across the ruled lines. At this time, the user does not handwrite characters to have the line position non-coincidence multi-column arrangement.

In S1502 of FIG. 15A, the unfilled document 1520 and the filled document 1530 may be scanned to extract the difference between the image of the filled document and that of the unfilled document, thereby generating a foreground sample image.

Figure 20D:
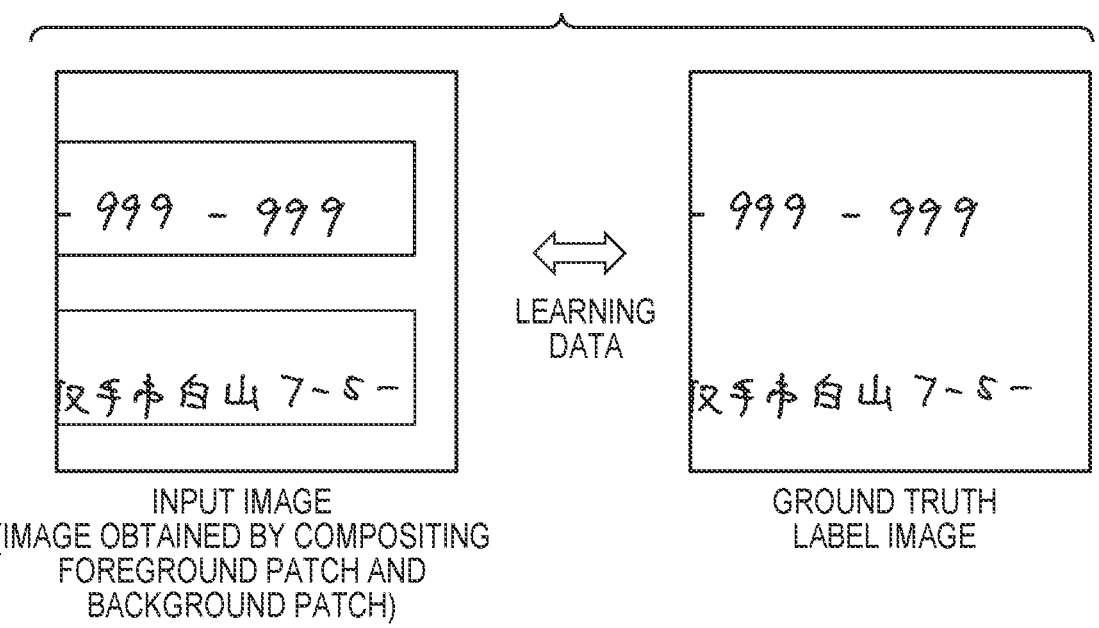
FIG. 20D depicts a view showing an example of learning data of handwriting extraction.
Figure 20E:
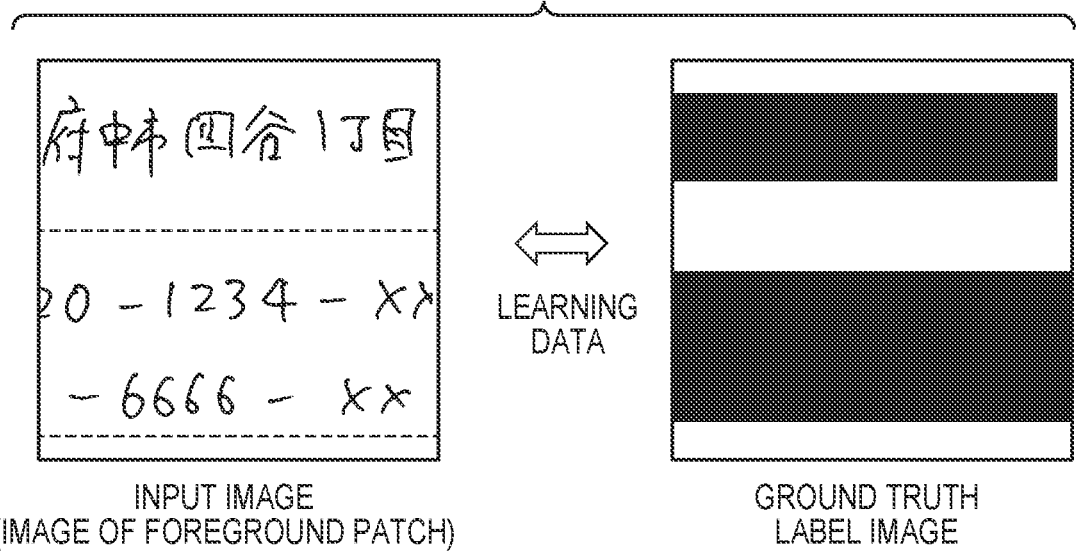
FIG. 20E depicts a view showing an example of learning data of handwriting area estimation.

Learning data generation processing by the learning apparatus 102 according to the seventh embodiment is almost the same as that (FIGS. 19A and 19B) according to the fifth embodiment, and the difference will be described. The learning data of handwriting extraction saved in S1915 is data obtained by associating a composite input image of a foreground patch and a background patch with a handwriting pixel ground truth image (an image of the foreground patch), similar to the fifth embodiment (see FIG. 20D). On the other hand, the learning data of handwriting area estimation saved in S1915 is data obtained by associating the image of the foreground patch with a handwriting area estimation ground truth label image generated in S1912, unlike the fifth embodiment (see FIG. 20E).

As described above, according to the seventh embodiment, the learning data of the neural network for performing handwriting extraction and the neural network for performing handwriting area estimation can be generated by compositing the foreground sample image and the background sample image. Since operation instructions by the user can be reduced, as compared with the sixth embodiment, it is possible to efficiently generate learning data.

Eighth Embodiment

In a form in which the user makes handwriting, input fields are often densely arranged so that the user readily notices an omission. Since a form in which input fields are arrayed in the vertical direction often has an arrangement with an item name on the left side and an input field on the right side, there is highly probably an item on the left side of entered handwriting. On the other hand, since a form in which input fields are arranged in the horizontal direction often has an arrangement with an item name on the upper side and an input field on the lower side, there is highly probably an item above entered handwriting.

In the first embodiment described above, when associating the handwriting OCR result and the printed character OCR result with each other in step S961 of FIG. 9B, the distance and positional relationship between a handwriting area and a printed character area are considered. The ninth embodiment will describe a case of limiting the search direction of a printed character area in accordance with the positional relationship between handwriting areas using the tendency of the layout of input fields in the form. The configuration of an image processing system according to this example is the same as that according to the first embodiment except for characteristic portions. Therefore, the same reference numerals denote similar components and a detailed description thereof will be omitted.

<Processing of Converting Form into Text>

Figure 23A:
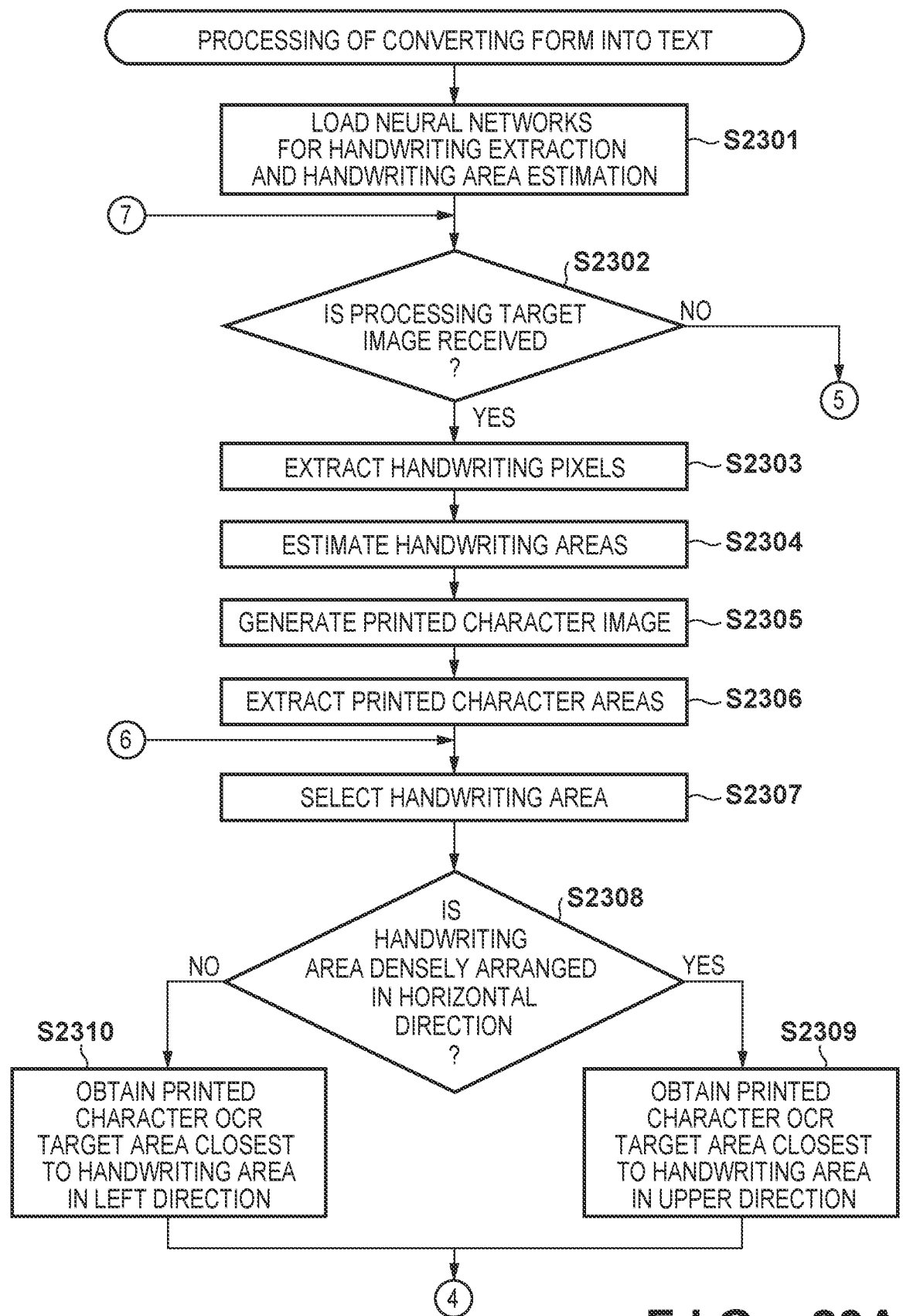
FIGS. 23A and 23B are flowcharts for describing the procedure of processing of converting a form into text according to the eighth embodiment.
Figure 23B:
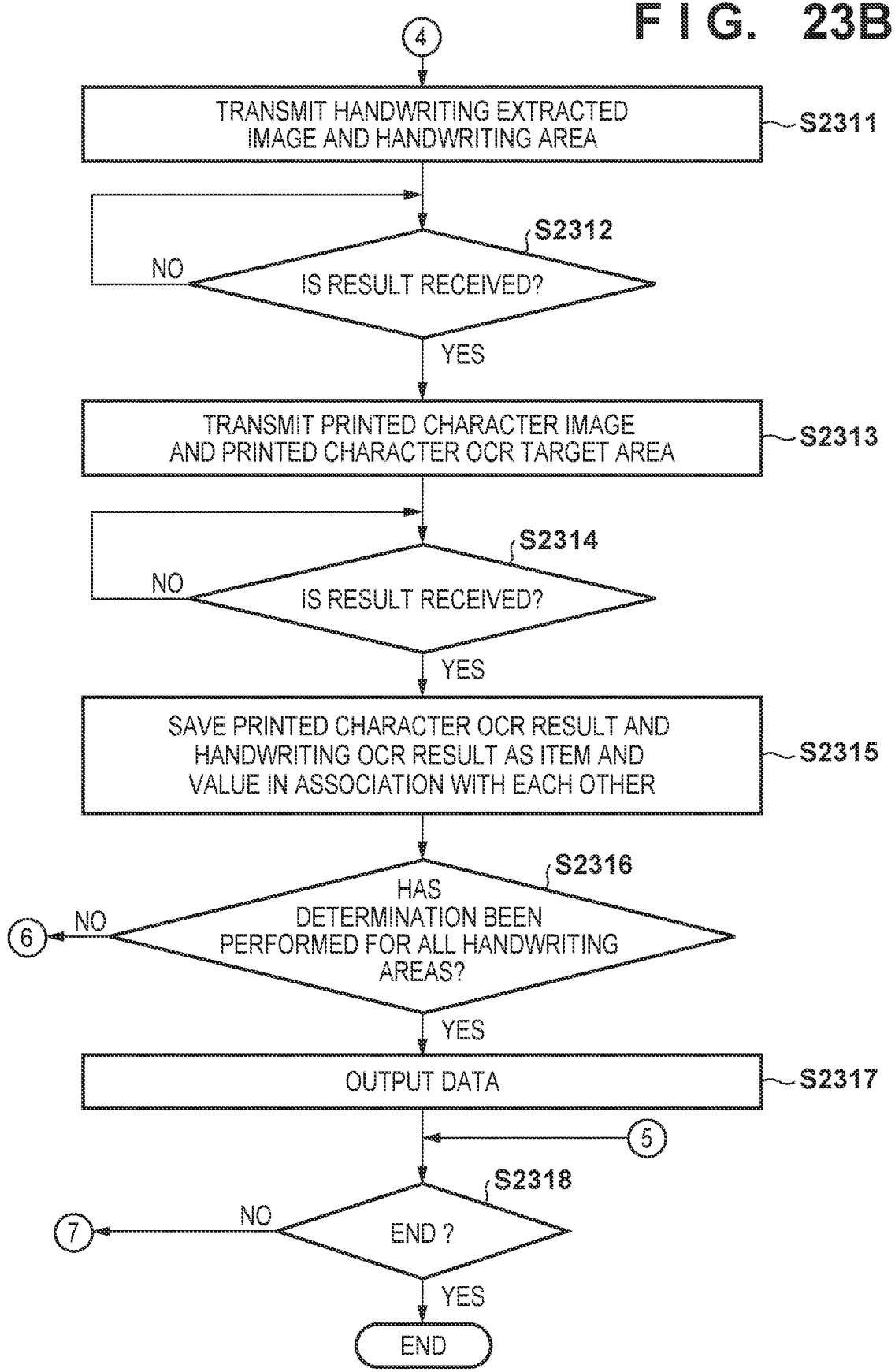

Processing of converting a form into text according to the eighth embodiment will be described with reference to FIGS. 23A and 23B. Processes in steps S2301 to S2304 are the same as those in steps S951 to S954 according to the first embodiment. Furthermore, processes in steps S2305 and S2306 are the same as those in steps S957 and S958 according to the first embodiment.

In step S2307, the CPU 261 selects one of handwriting areas estimated in step S2304.

In step S2308, the CPU 261 determines whether the handwriting area selected in step S2307 is densely arranged in the horizontal or vertical direction. More specifically, if another handwriting area closest to the handwriting area selected in step S2307 exists on the left or right side, the selected handwriting area is determined to be densely arranged in the horizontal direction, and if another closest handwriting area exists on the upper or lower side, the selected handwriting area is determined to be densely arranged in the vertical direction. A form 2400 shown in FIG. 24 will be exemplified. Assume that the form 2400 is received in step S2302, areas 2401 to 2404 are estimated as handwriting areas (indicated by long dotted lines) in step S2304, and areas 2405 to 2411 are extracted as printed character areas (indicated by short dotted lines) in step S2306. Since the handwriting area closest to the handwriting area 2401 is the area 2402 on the lower side, the handwriting area 2401 is determined to be densely arranged in the vertical direction. On the other hand, since the handwriting area closest to the handwriting area 2403 is the area 2404 on the right side, the handwriting area 2403 is determined to be densely arranged in the horizontal direction. If the handwriting area is densely arranged in the horizontal direction, YES is determined and the process transitions to step S2309; otherwise, NO is determined and the process transitions to step S2310.

In step S2309, the CPU 261 obtains a printed character area closest, in the upper direction, to the handwriting area selected in step S2307. In the form 2400 shown in FIG. 24, the handwriting area 2403 is densely arranged in the horizontal direction, and the printed character area closest to the handwriting area 2403 in the upper direction is the area 2410. Therefore, the area 2410 is obtained as the printed character area corresponding to the handwriting area 2403.

In step S2310, the CPU 261 obtains the printed character area closest, in the left direction, to the handwriting area selected in step S2307. In the form 2400 shown in FIG. 24, the handwriting area 2401 is densely arranged in the vertical direction, and the printed character area closest to the handwriting area 2401 in the left direction is the area 2407.

Therefore, the area 2407 is obtained as the printed character area corresponding to the handwriting area 2401.

In step S2311, the CPU 261 transmits a handwriting extracted image generated in step S2303 and the handwriting area selected in step S2307 to the handwriting OCR unit 116 to execute handwriting OCR. In step S2312, it is determined whether a handwriting OCR result is received.

In step S2313, the CPU 261 transmits the printed character area obtained in step S2309 or S2310 and a printed character image generated in step S2305 to the printed character OCR unit 117 to execute printed character OCR. In step S2314, it is determined whether a printed character OCR result is received.

Then, in step S2315, the CPU 261 saves the printed character OCR result received in step S2314 and the handwriting OCR result received in step S2312 as an item and a value in association with each other. In step S2316, it is determined whether all the handwriting areas have been processed. If there is an unprocessed handwriting area, the process returns to step S2307; otherwise, the process advances to step S2317. In step S2317, all the printed character OCR results and handwriting OCR results which have been saved as items and values in association with each other in step S2315 are transmitted to the image obtaining unit 111. In step S2318, it is determined whether the processing ends. If the processing does not end, the process returns to step S2302.

According to the eighth embodiment, the layout of the handwriting areas (=input fields of the form) is analyzed, and an item is searched for by narrowing the search to a direction in which an item corresponding to each handwritten value highly probably exists. This makes it easy to associate a more appropriate item with a handwritten value.

Note that although not described in this example, if no printed character area is found in the upper or left direction of the handwriting area in step S2309 or S2310, a printed character area may be searched for again in the left or upper direction. Furthermore, a threshold may be provided for the distance between a handwriting area and a printed character area, and then control may be executed not to associate, with a handwriting area, a printed character area away from the handwriting area by the threshold or more.

Other Embodiment

The present disclosure may be applied to a system formed by a plurality of devices, or an apparatus formed by a single device. For example, in the examples, the learning data generation unit 112 and the learning unit 113 are implemented in the learning apparatus 102 but may be implemented in separate apparatuses. In this case, an apparatus for implementing the learning data generation unit 112 transmits learning data generated by the learning data generation unit 112 to an apparatus for implementing the learning unit 113. Then, the learning unit 113 learns a neural network based on the received learning data. The image processing apparatus 101 and the image processing server 103 have been described as separate apparatuses. However, the image processing apparatus 101 may have the function of the image processing server 103. The image processing server 103 and the OCR server 104 have been described as separate apparatuses. However, the image processing server 103 may have the function of the OCR server 104.

The present disclosure is not limited to the above-described examples, various modifications (including organic combinations of the examples) can be made based on the gist of the present disclosure, and these are not excluded from the scope of the present disclosure. That is, all configurations that combine the above-described examples and its modifications are also incorporated in the present disclosure.

The above-described examples have explained the method of discriminating extraction of a printed character area based on the connectivity of the pixels. However, similar to handwriting area estimation, estimation may be performed using the neural network. In the same manner as that of creating a handwriting area estimation ground truth image, the user selects a printed character area, ground truth data is created based on the printed character area, and a neural network for performing printed character OCR area estimation is newly configured to perform learning with reference to the ground truth data.

In the above-described examples, learning data is generated by the learning data generation processing at the time of learning processing. However, a large amount of learning data may be generated in advance by the learning data generation processing, and learning data of a mini-batch size may be sampled appropriately from the generated learning data at the time of learning processing.

In the above-described examples, an input image is generated as a grayscale image. However, an input image may be generated in another format such as a full-color image.

Embodiments of the present disclosure can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2019-152169, filed Aug. 22, 2019, 2019-183923, filed Oct. 4, 2019 and 2020-027618, filed Feb. 20, 2020 which are hereby incorporated by reference herein in their entirety.

What is claimed is:

1. An image processing apparatus comprising:
at least one processor and at least one memory configured to perform:
obtaining a read image of a document including a handwritten character;
generating a first image formed by pixels of the handwritten character by extracting the pixels of the handwritten character from pixels of the read image using a first learning model for extracting the pixels of the handwritten character;

estimating a handwriting area including the handwritten character using a second learning model for estimating the handwriting area; and performing handwriting OCR processing based on the generated first image and the estimated handwriting area.

2. The apparatus according to claim 1, wherein the handwriting area is estimated using the second learning model for the read image.

3. The apparatus according to claim 1, wherein the second learning model is generated by performing learning based on ground truth data in which an area within an input field of a sample image is set as a handwriting area.

4. The apparatus according to claim 1, wherein the second learning model is generated by performing learning based on ground truth data in which an area including a handwritten character entered in an input field of a sample image is set as a handwriting area.

5. The apparatus according to claim 1, wherein the second learning model is generated by performing learning based on ground truth data in which an area including a plurality of handwritten characters separated by a digit line is set as a handwriting area.

6. The apparatus according to claim 1, wherein the at least one processor and the at least one memory are configured to further perform:

generating composite image data by compositing an image of the document including the handwritten character and an image of a document including not a handwritten character but only a background, wherein the first learning model is learned based on the generated composite image data.

7. The apparatus according to claim 1, wherein the handwriting area is estimated using the second learning model for the generated first image.

8. The apparatus according to claim 1, wherein the second learning model is a learning model for estimating, as a handwriting area, an area including at least one handwritten character line in one column.

9. The apparatus according to claim 1, wherein the at least one processor and the at least one memory are configured to further perform:

generating a second image by erasing the pixels of the handwritten character from the read image and extracting a printed character area including pixels of a printed character from the second image; and performing printed character OCR processing based on the second image and the printed character area.

10. The apparatus according to claim 9, wherein the at least one processor and the at least one memory are configured to further perform:

converting the read image into text based on a result of performing the handwriting OCR processing and a result of performing the printed character OCR processing.

11. The apparatus according to claim 10, wherein in the converting, the printed character area having a predetermined positional relationship with the handwriting area is specified, and a character recognition result of the handwriting area and a character recognition result of the specified printed character area are saved in association with each other.

12. The apparatus according to claim 11, wherein the printed character area having the predetermined positional relationship with the handwriting area is a printed character area at a closest position in a left direction or an upper direction with respect to the handwriting area.

13. The apparatus according to claim 11, wherein the printed character area having the predetermined positional relationship with the handwriting area is a printed character area at a closest position in a left direction with respect to the handwriting area if the handwriting area is close to another handwriting area in a vertical direction, and is a printed character area at a closest position in an upper direction with respect to the handwriting area if the handwriting area is close to another handwriting area in a horizontal direction.

14. The apparatus according to claim 1, wherein the first learning model is a learning model of a first neural network for extracting pixels of a handwritten character.

15. The apparatus according to claim 1, wherein the second learning model is a learning model of a second neural network for estimating a handwriting area.

16. The apparatus according to claim 14, wherein the at least one processor and the at least one memory are configured to further perform:

obtaining, based on a handwriting area instructed by a user in a sample image obtained by reading a document, ground truth data of pixels of a handwritten character to be used in learning of the first neural network; and obtaining the first learning model by performing learning processing of the first neural network based on the sample image and the obtained ground truth data.

17. The apparatus according to claim 1, wherein the at least one processor and the at least one memory are configured to further perform:

generating composite image data by compositing a handwriting image generated by reading a document obtained by entering only a handwritten character in a white sheet and a background image generated by reading a document including only a background, wherein the first learning model is obtained by performing learning based on the generated composite image data.

18. The apparatus according to claim 1, wherein the at least one processor and the at least one memory are configured to further perform:

generating learning data from a handwriting image generated by reading a document obtained by entering only a handwritten character in a white sheet, wherein the second learning model is obtained by performing learning based on the generated image data.

19. An image processing method comprising:

obtaining a read image of a document including a handwritten character;

generating a first image formed by pixels of the handwritten character by extracting the pixels of the handwritten character from pixels of the read image using a first learning model for extracting the pixels of the handwritten character;

estimating a handwriting area including the handwritten character using a second learning model for estimating the handwriting area; and performing handwriting OCR processing based on the generated first image and the estimated handwriting area.

20. A non-transitory computer-readable storage medium storing a program that causes a computer to perform:

obtaining a read image of a document including a handwritten character;

generating a first image formed by pixels of the handwritten character by extracting the pixels of the handwritten character from pixels of the read image using a first learning model for extracting the pixels of the handwritten character;

estimating a handwriting area including the handwritten character using a second learning model for estimating the handwriting area; and performing handwriting OCR processing based on the generated first image and the estimated handwriting area.

\* \* \* \* \*